(12) United States Patent
Carrigan et al.

(10) Patent No.: US 10,867,608 B1
(45) Date of Patent: *Dec. 15, 2020

(54) MULTI-USER CONFIGURATION

(71) Applicant: Apple Inc., Cupertino, CA (US)

(72) Inventors: Taylor G. Carrigan, San Francisco, CA (US); Patrick L. Coffman, San Francisco, CA (US); David Chance Graham, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,347

(22) Filed: Sep. 26, 2019

Related U.S. Application Data

(60) Provisional application No. 62/855,903, filed on May 31, 2019.

(51) Int. Cl.
| | | |
|---|---|---|
| *G10L 17/04* | (2013.01) | |
| *G10L 15/22* | (2006.01) | |
| *G10L 15/07* | (2013.01) | |
| *G10L 15/06* | (2013.01) | |
| *G10L 17/00* | (2013.01) | |

(52) U.S. Cl.
CPC ............ *G10L 15/22* (2013.01); *G10L 15/063* (2013.01); *G10L 15/07* (2013.01); *G10L 17/00* (2013.01); *G10L 2015/0638* (2013.01); *G10L 2015/223* (2013.01); *G10L 2015/225* (2013.01)

(58) Field of Classification Search
CPC ......... G10L 15/22; G10L 15/30; G10L 15/16; G10L 15/187; G10L 15/26; G10L 15/32; G10L 17/22; G10L 15/183; G10L 17/06; G10L 17/24; G10L 25/60; G06F 21/35; G06F 21/10; G06F 21/32; G06F 16/2365; G06F 16/9535; G06F 21/31;
(Continued)

(56) References Cited

U.S. PATENT DOCUMENTS 8,060,571 B2 * 11/2011 Rao .................... H04L 65/1069
                                                          348/553
9,812,128 B2 * 11/2017 Mixter .................... G10L 15/32
(Continued)

OTHER PUBLICATIONS

Applicant-Initiated Interview Summary received for U.S. Appl. No. 16/584,321, dated Apr. 8, 2020, 5 pages.
(Continued)

*Primary Examiner* — Vijay B Chawan
(74) *Attorney, Agent, or Firm* — Dentons US LLP

(57) ABSTRACT

Examples of multi-user configuration are disclosed. An example method includes, at an electronic device: receiving a request; and in response to the request: if the voice input does not match a voice profile associated with an account associated with the electronic device: causing output of first information based on the request using a first account associated with the electronic device; if a setting of the electronic device has a first state, causing update of account data of the first account based on the request; and if the setting has a second state, forgoing causing update of the account data; and if the voice input matches a voice profile associated with an account associated with the electronic device: causing output of the first information using the account associated with the matching voice profile; and causing update of account data of the account based on the request.

21 Claims, 83 Drawing Sheets

(58) Field of Classification Search
CPC ...... G06F 3/0482; G06F 3/0484; G06F 9/451; G06L 63/0861; G06L 63/08; G06L 63/083; G06L 63/168
USPC ............ 704/270, 270.1, 275, 246; 707/736; 725/143, 63, 86; 726/28, 4
See application file for complete search history.

(56) References Cited

U.S. PATENT DOCUMENTS

| | | | | |
|---|---|---|---|---|
| 9,826,083 | B2* | 11/2017 | Kanevsky | H04M 1/72577 |
| 9,847,999 | B2* | 12/2017 | Van Os | H04L 67/141 |
| 10,089,983 | B1* | 10/2018 | Gella | G10L 15/183 |
| 10,304,463 | B2* | 5/2019 | Mixter | G10L 15/08 |
| 10,412,206 | B1* | 9/2019 | Liang | H04M 3/42263 |
| 2013/0272511 | A1 | 10/2013 | Bouzid et al. | |
| 2014/0181104 | A1* | 6/2014 | Chin | H04L 67/306 707/736 |
| 2014/0315163 | A1 | 10/2014 | Ingrassia, Jr. et al. | |
| 2014/0333414 | A1* | 11/2014 | Kursun | G06K 9/00926 340/5.82 |
| 2015/0317977 | A1* | 11/2015 | Manjunath | G10L 25/48 704/270 |
| 2016/0026779 | A1* | 1/2016 | Grigg | G06F 21/31 726/4 |
| 2017/0025124 | A1* | 1/2017 | Mixter | G10L 15/22 |
| 2017/0094049 | A1* | 3/2017 | Kanevsky | H04M 1/72577 |
| 2017/0242653 | A1* | 8/2017 | Lang | H04R 3/00 |
| 2017/0242657 | A1 | 8/2017 | Jarvis et al. | |
| 2017/0263249 | A1 | 9/2017 | Akbacak et al. | |
| 2017/0339151 | A1* | 11/2017 | Van Os | G06Q 20/322 |
| 2017/0357478 | A1 | 12/2017 | Piersol et al. | |
| 2018/0040322 | A1* | 2/2018 | Mixter | G10L 15/32 |
| 2018/0061421 | A1* | 3/2018 | Sarikaya | G10L 17/06 |
| 2018/0067528 | A1* | 3/2018 | Wang | H01M 2/1077 |
| 2018/0082682 | A1 | 3/2018 | Erickson et al. | |
| 2018/0096690 | A1* | 4/2018 | Mixter | G06F 3/167 |
| 2018/0096696 | A1* | 4/2018 | Mixter | G10L 25/51 |
| 2018/0182389 | A1 | 6/2018 | Devaraj et al. | |
| 2018/0330589 | A1 | 11/2018 | Horling | |
| 2018/0335903 | A1 | 11/2018 | Coffman et al. | |
| 2018/0336904 | A1 | 11/2018 | Piercy et al. | |
| 2018/0336905 | A1* | 11/2018 | Kim | G10L 15/16 |
| 2019/0043508 | A1 | 2/2019 | Sak et al. | |
| 2019/0102145 | A1* | 4/2019 | Wilberding | H04N 21/4394 |
| 2019/0172467 | A1* | 6/2019 | Kim | G10L 15/16 |
| 2019/0221227 | A1* | 7/2019 | Mixter | G10L 15/20 |
| 2019/0370781 | A1* | 12/2019 | Van Os | G06F 21/35 |
| 2019/0370805 | A1* | 12/2019 | Van Os | G06F 3/0484 |
| 2020/0151601 | A1* | 5/2020 | Niewczas | H04L 67/18 |

OTHER PUBLICATIONS

Non-Final Office Action received for U.S. Appl. No. 16/584,321, dated Jan. 7, 2020, 19 pages.

Invitation to Pay Additional Fees received for PCT Patent Application No. PCT/US2020/025526, dated Jun. 15, 2020, 12 pages.

International Search Report and written Opinion received for PCT Patent Application No. PCT/US2020/025526, dated Aug. 11, 2020, 18 pages.

* cited by examiner

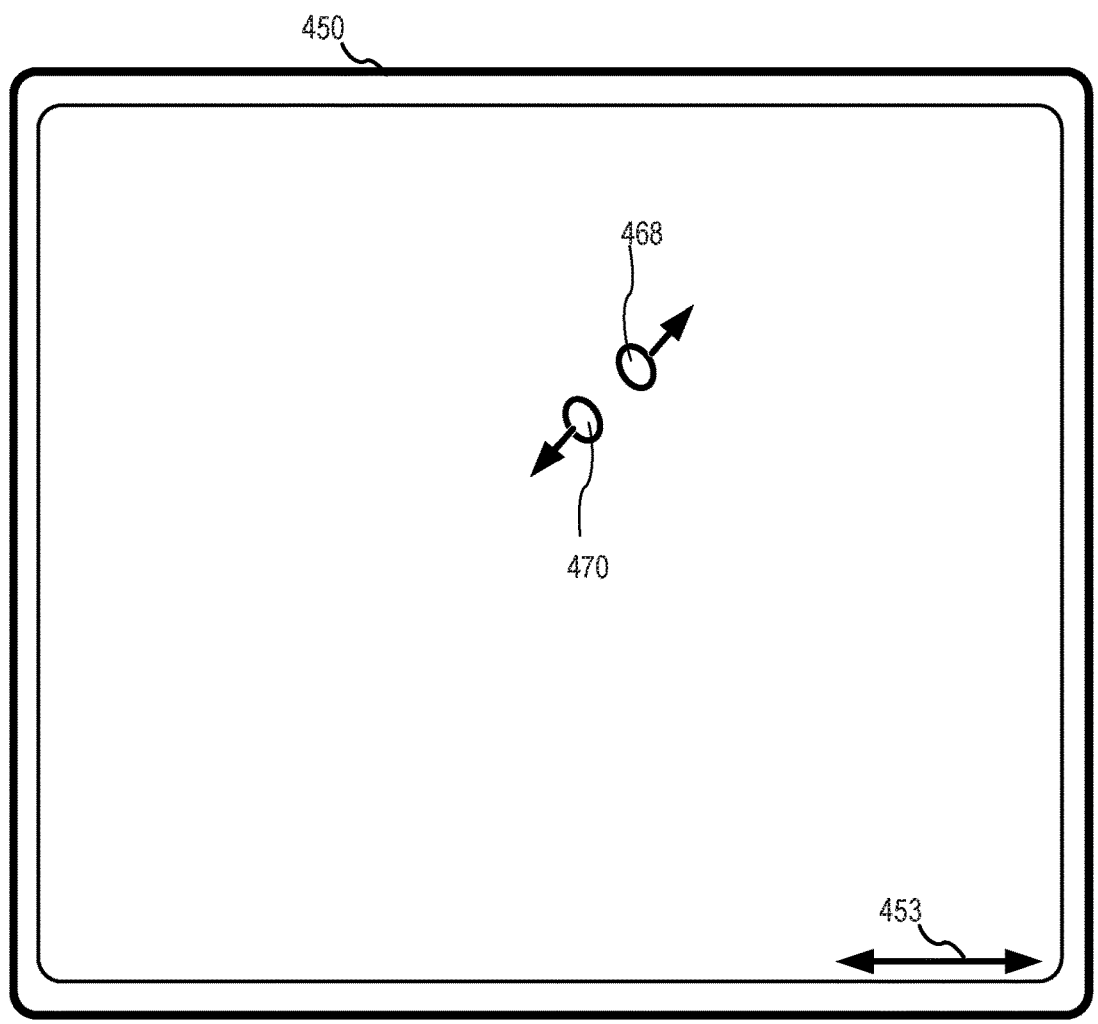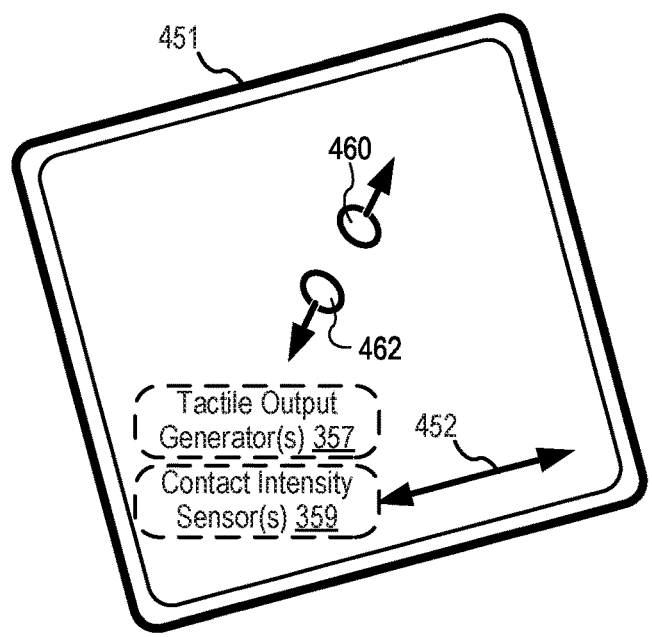
FIG. 4B

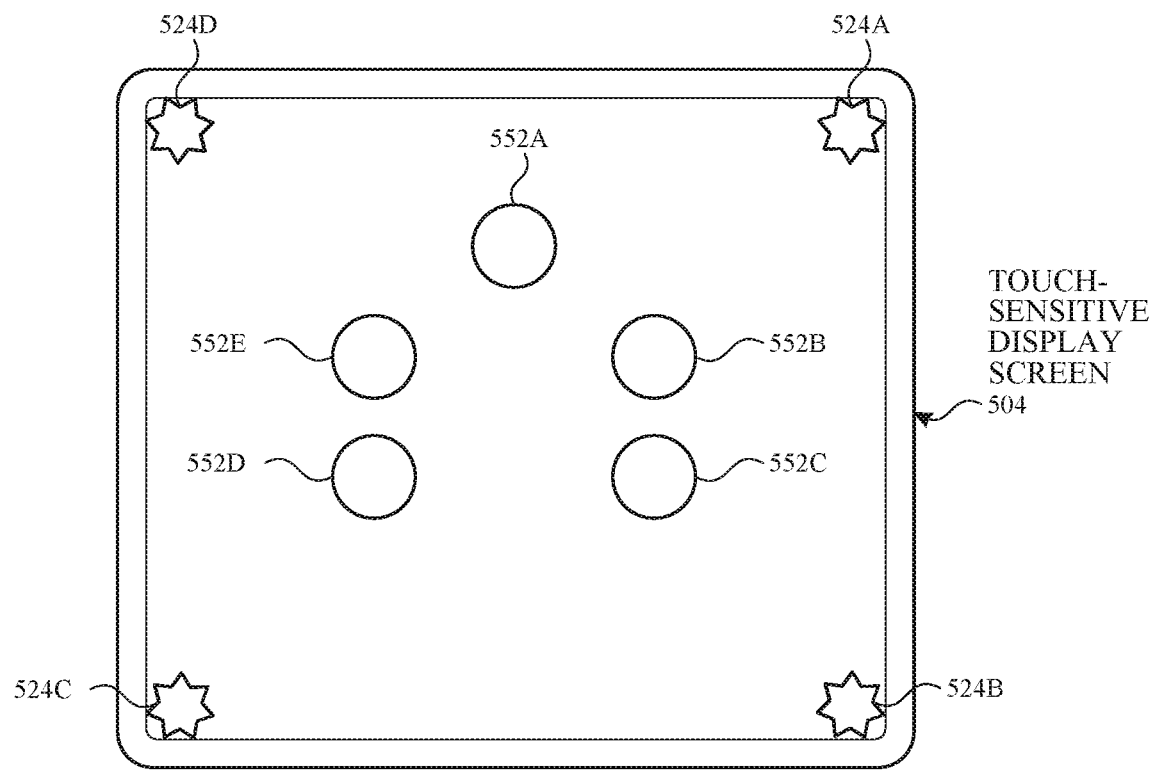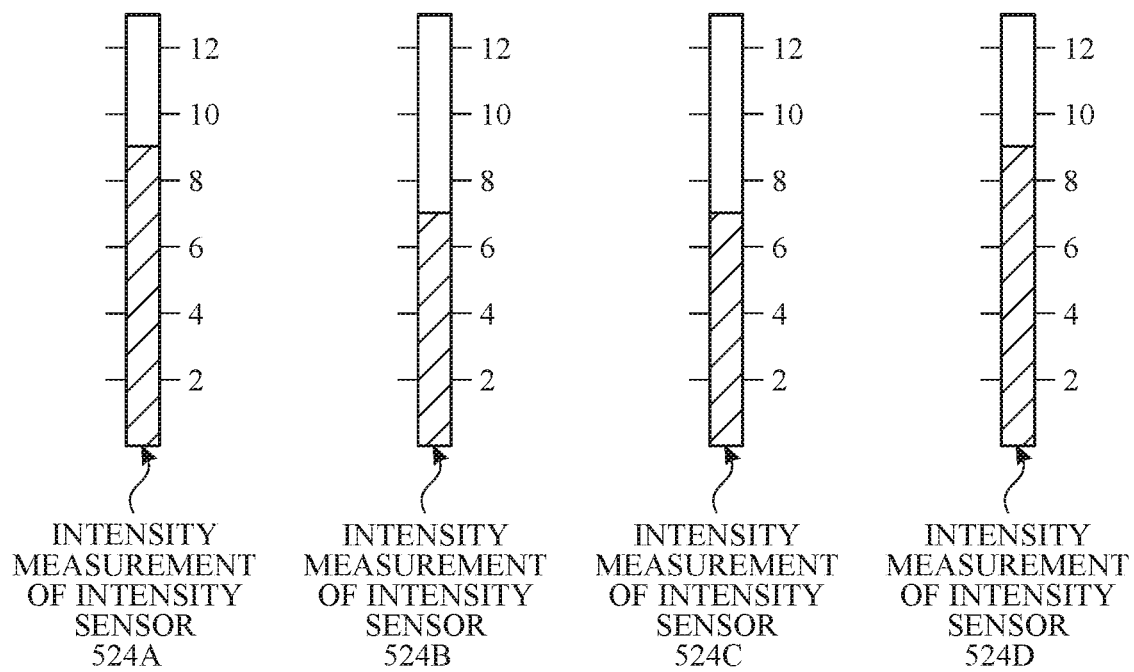
FIG. 5C

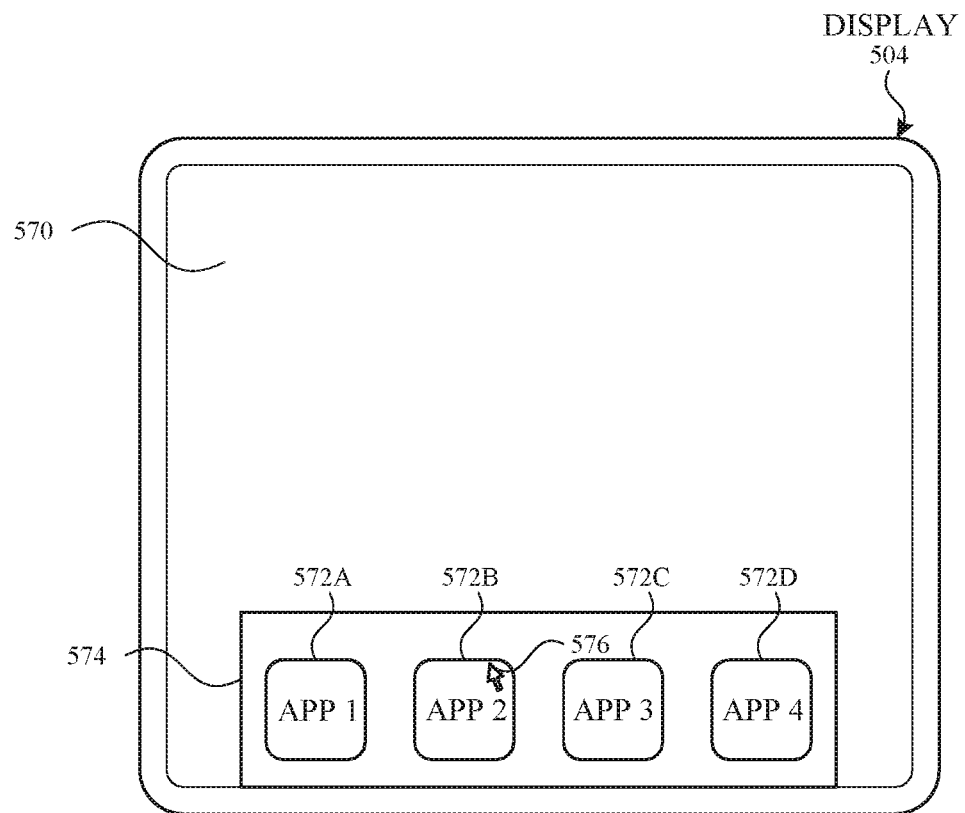
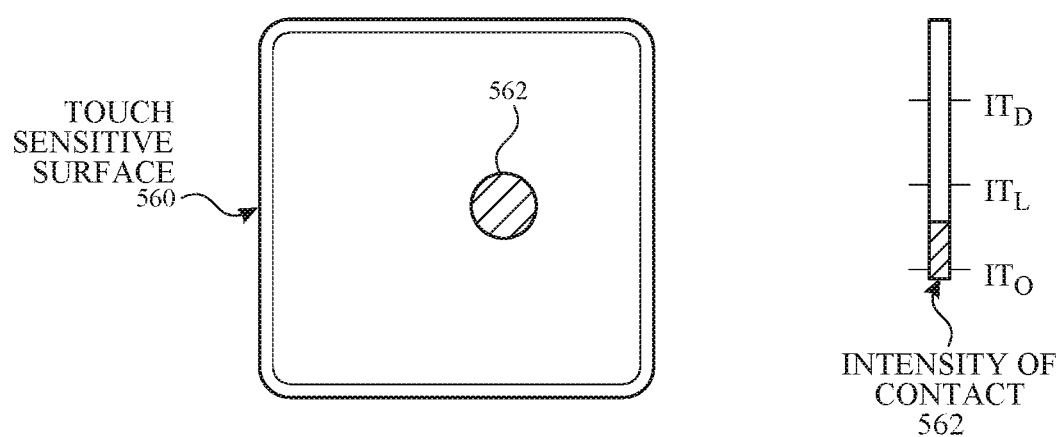
FIG. 5E

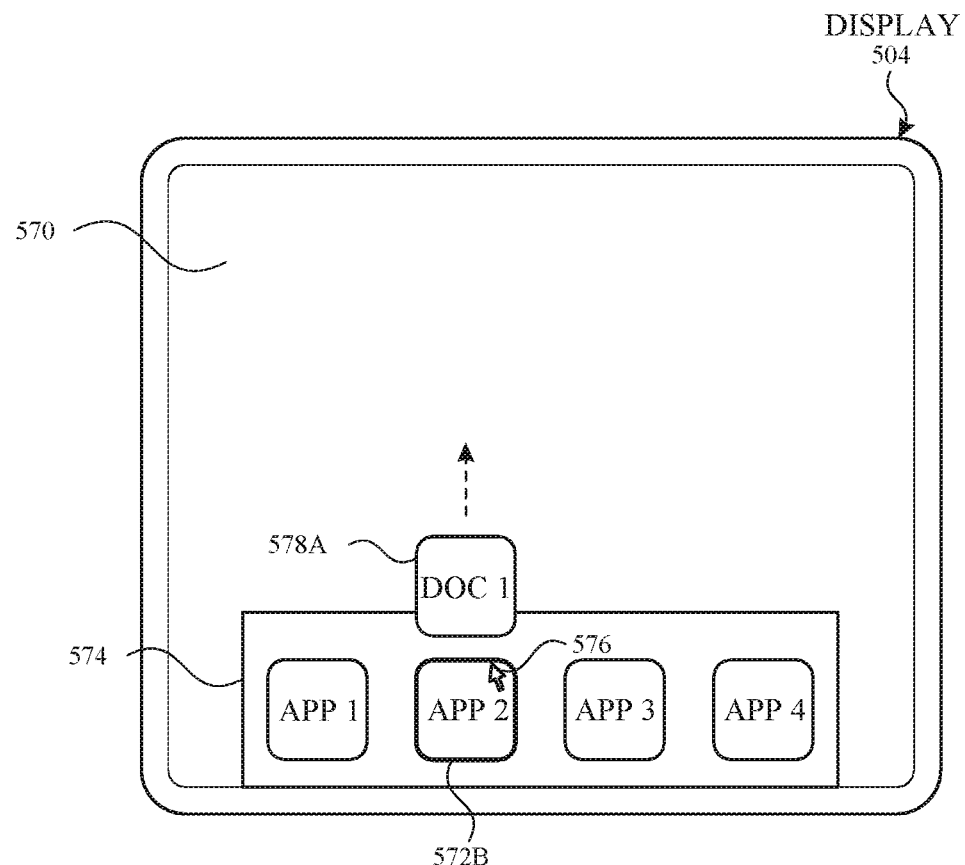
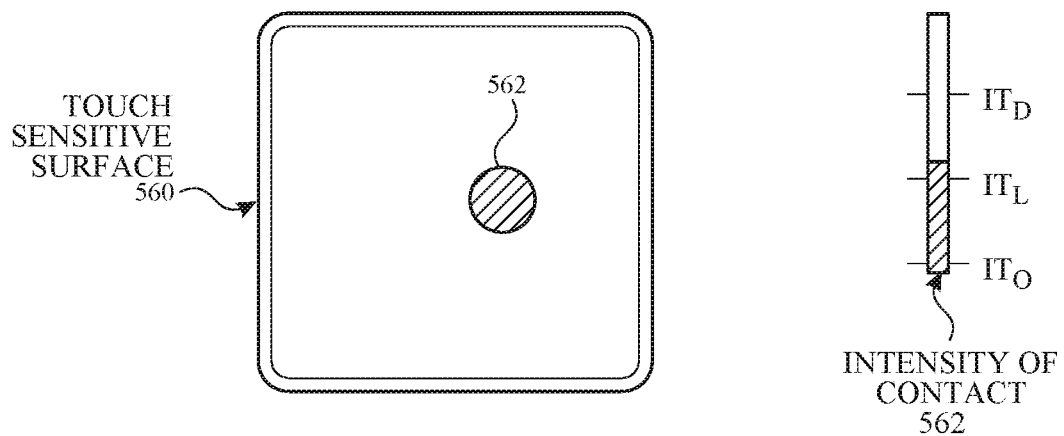
FIG. 5F

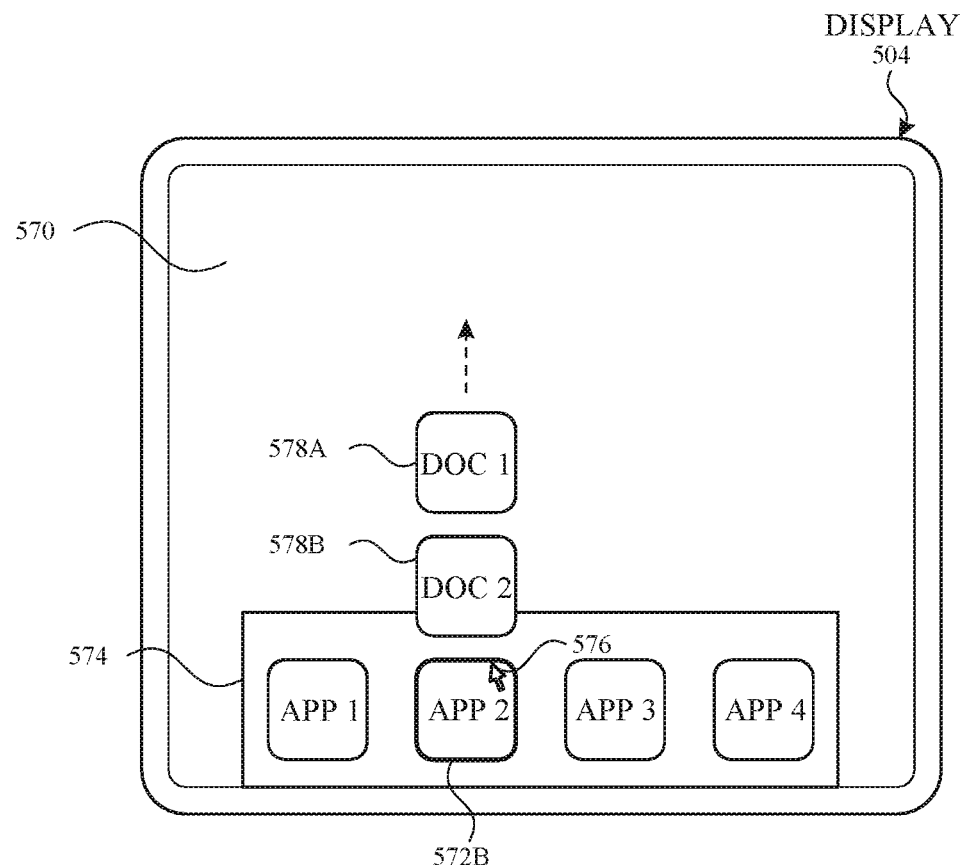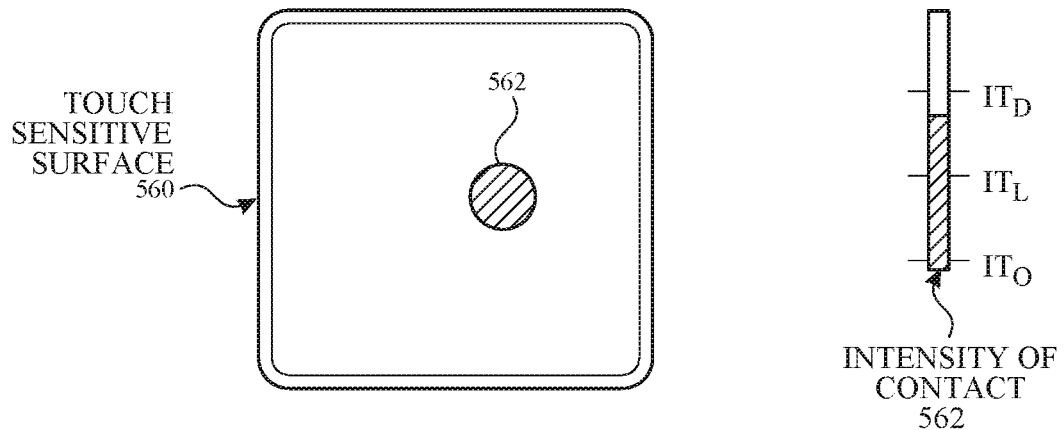
FIG. 5G

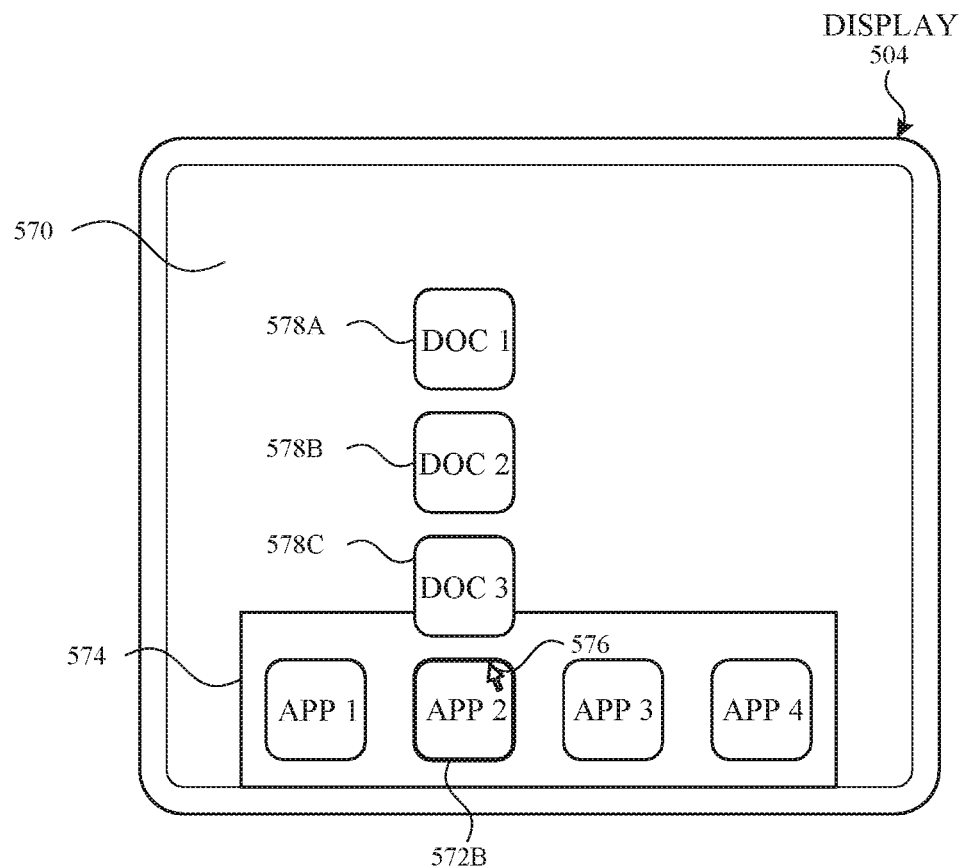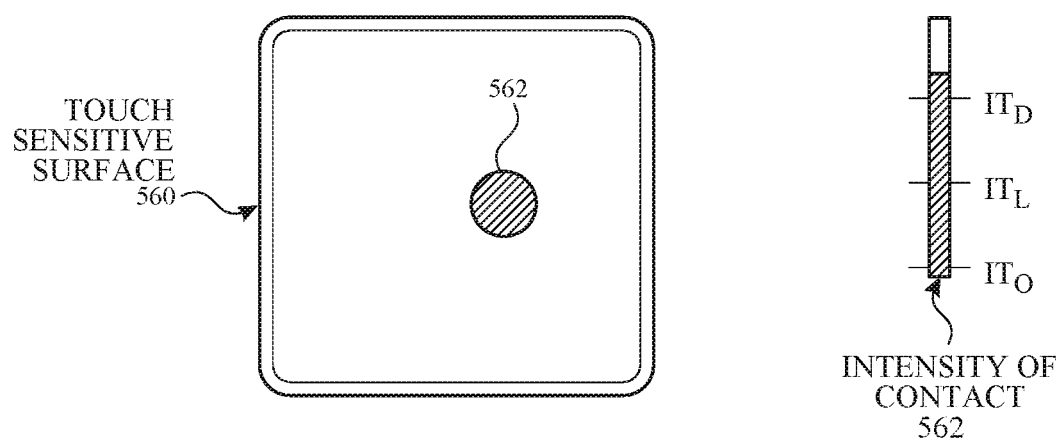
FIG. 5H

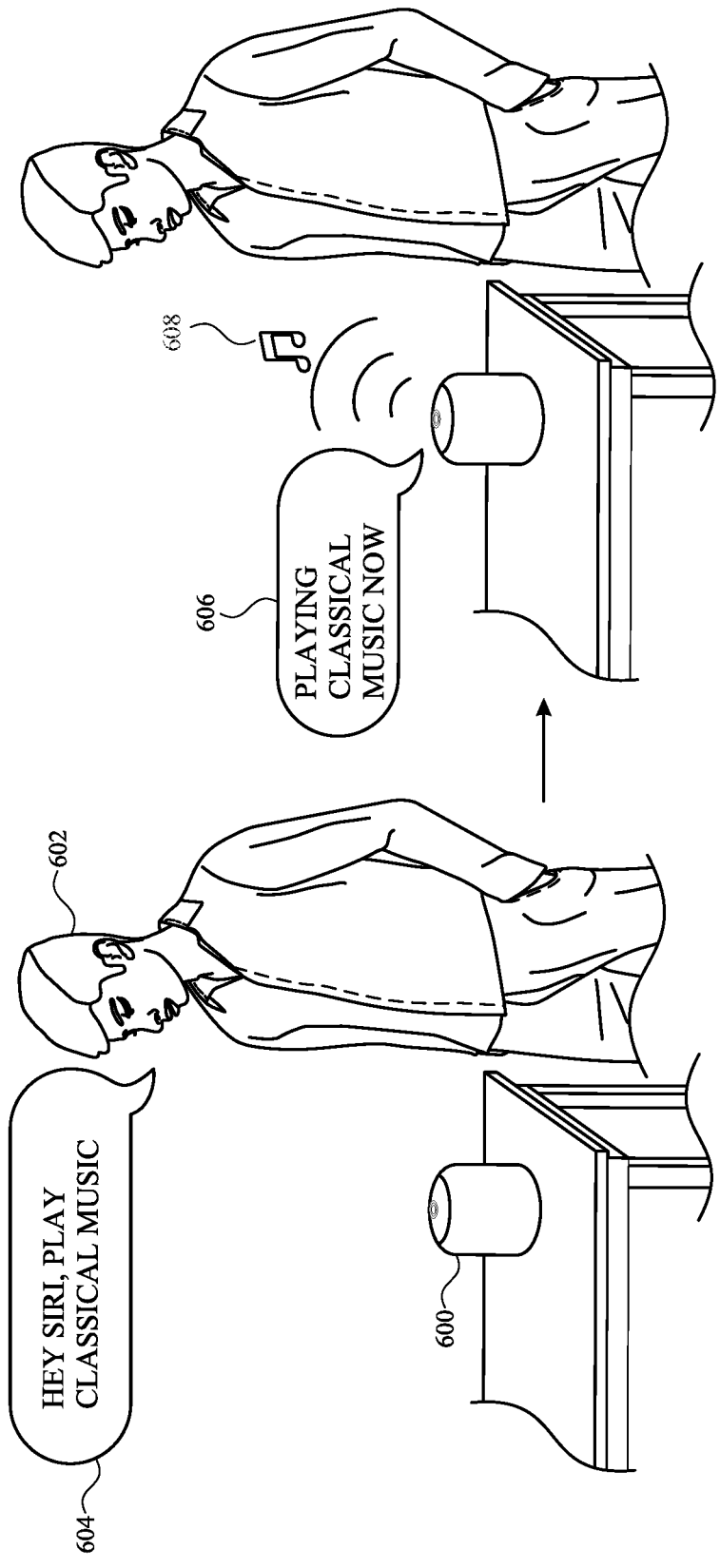

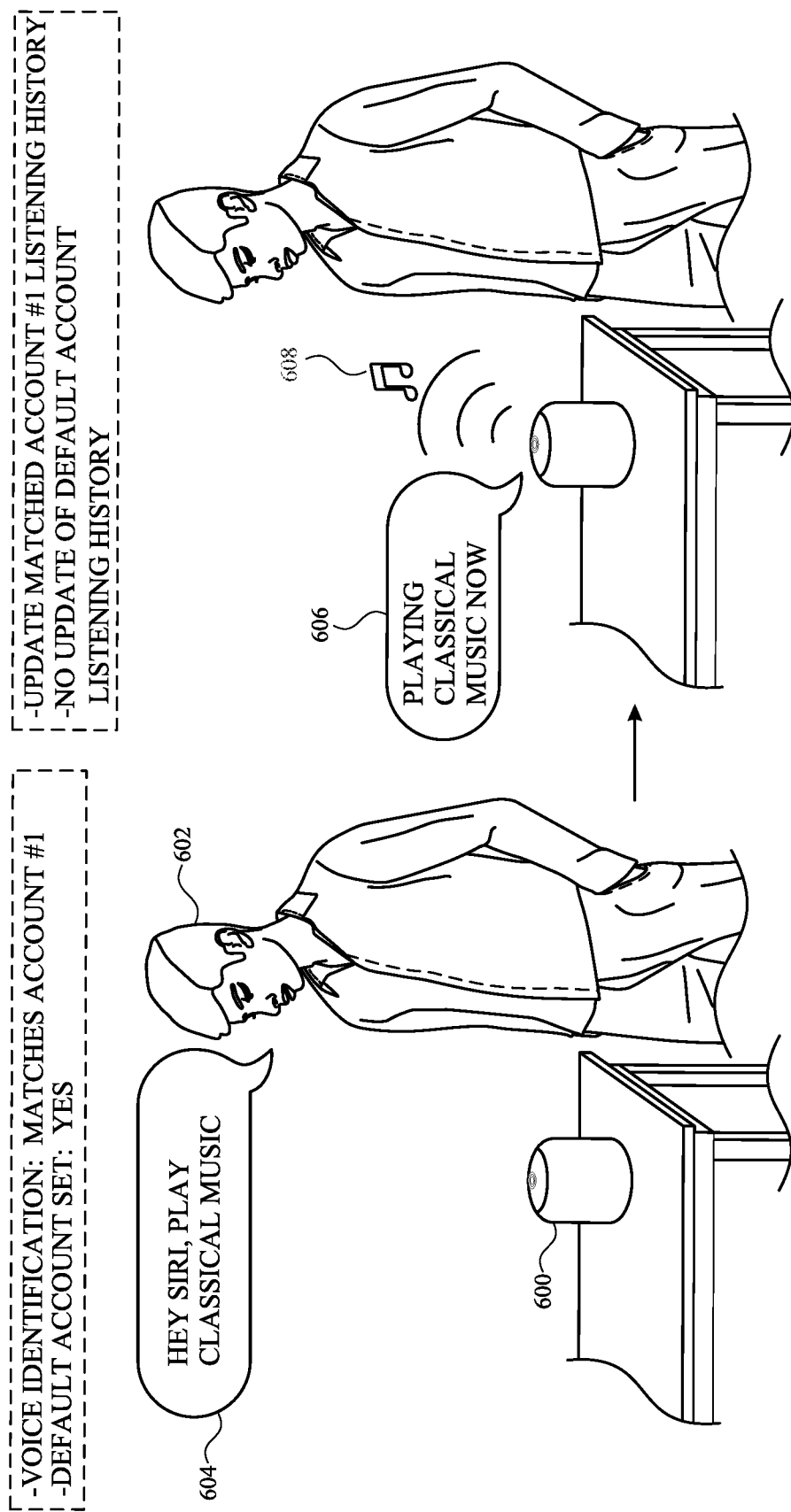

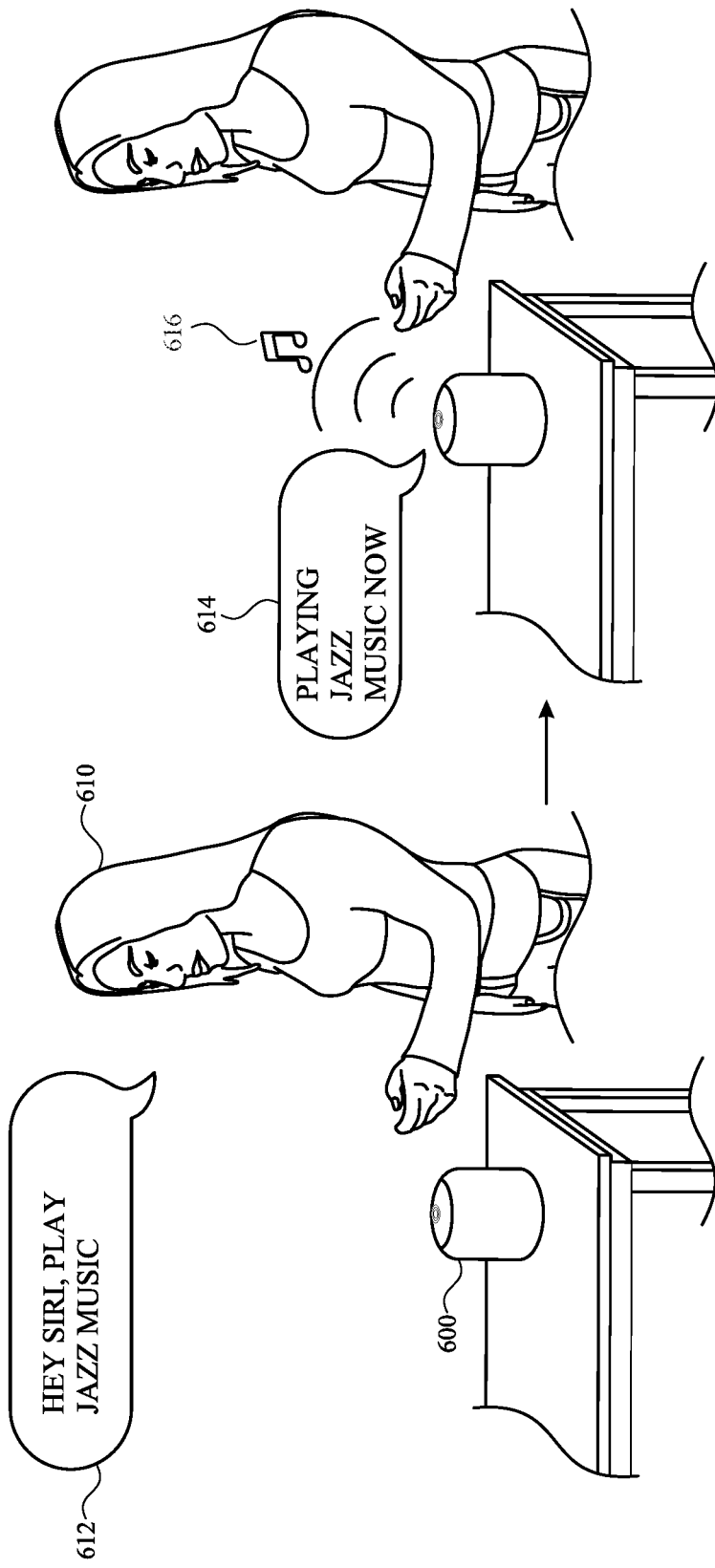

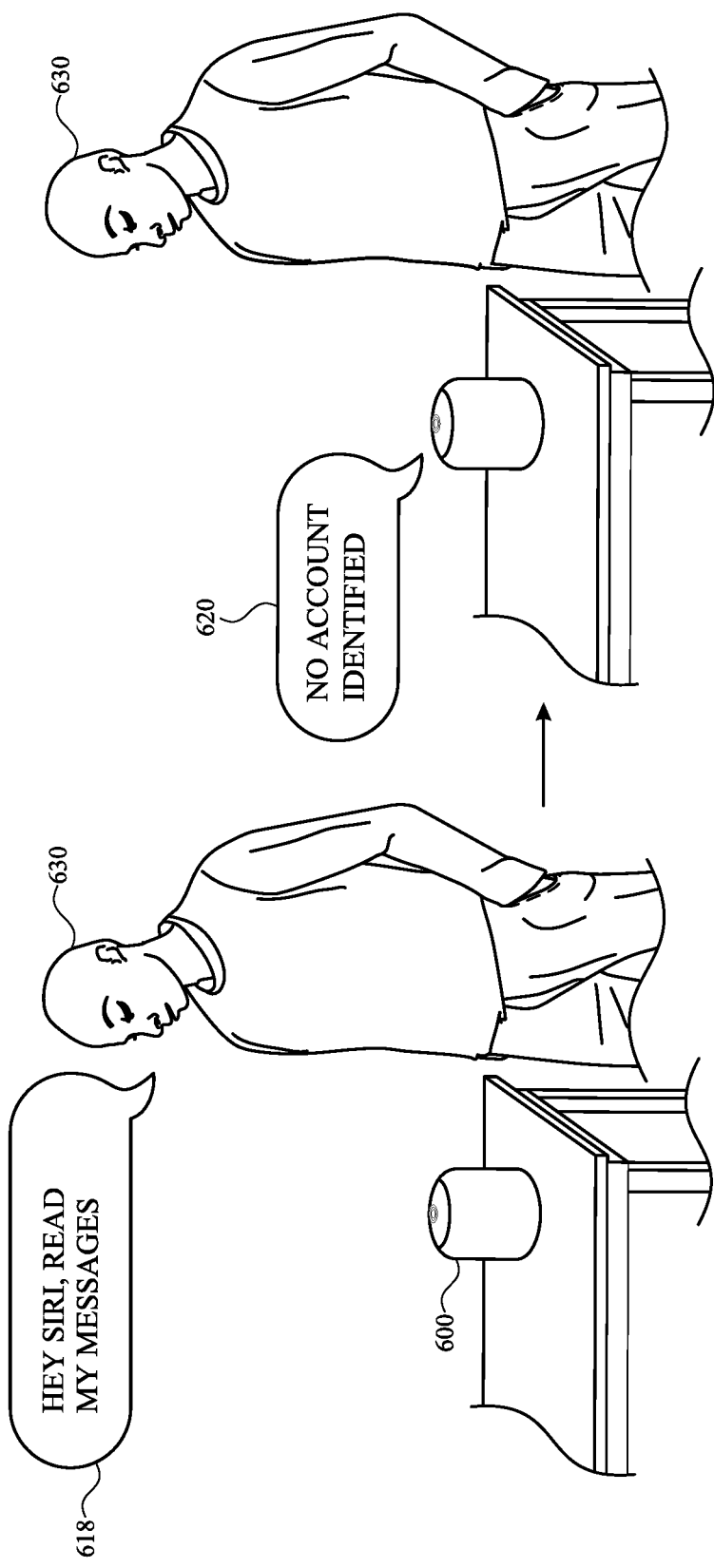

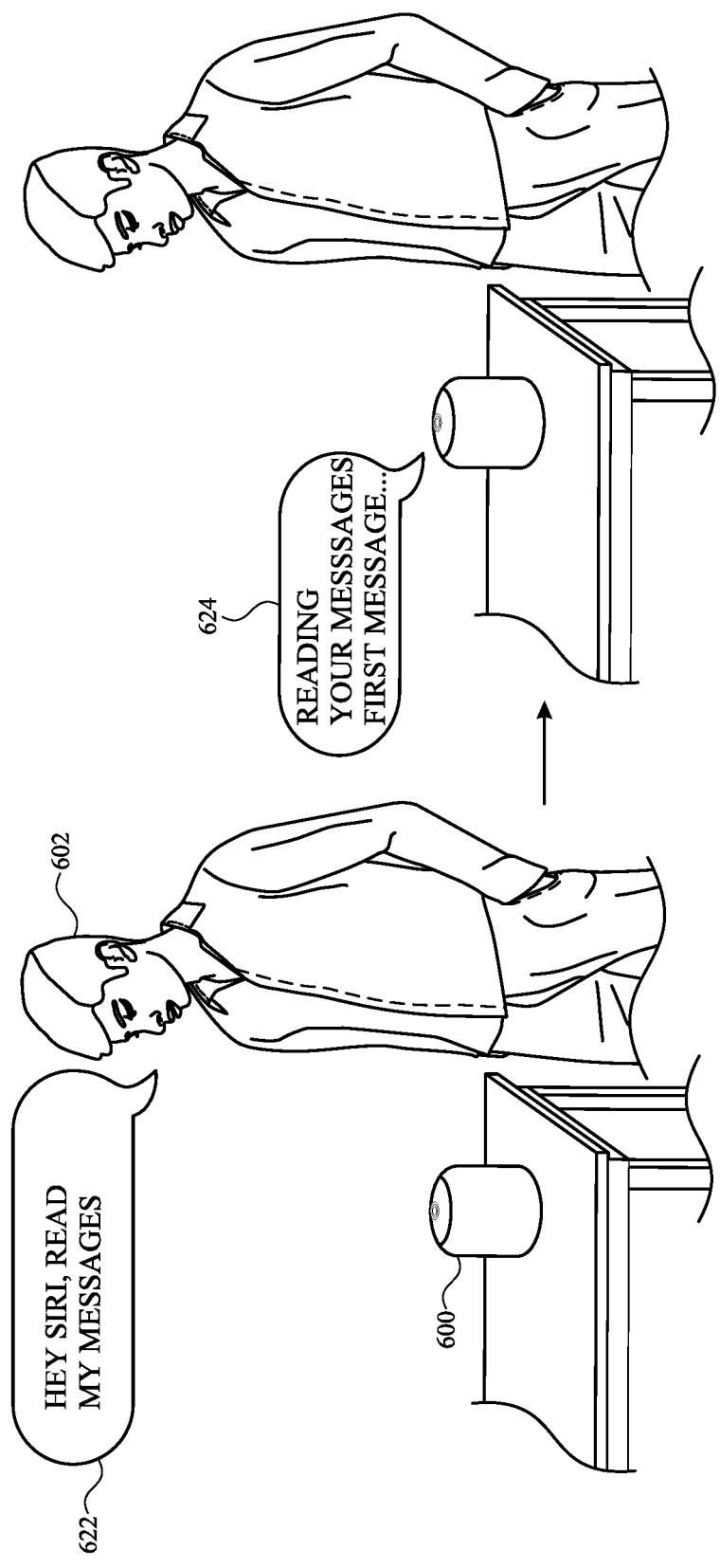

MULTI-USER CONFIGURATION

CROSS REFERENCE TO RELATED APPLICATIONS

This application claims priority of U.S. Provisional Patent Application No. 62/855,903, entitled "MULTI-USER CONFIGURATION," filed May 31, 2019, the content of which is hereby incorporated by reference in its entirety for all purposes.

FIELD

The present disclosure relates generally to computer user interfaces, and more specifically to techniques for multi-user configuration of electronic devices.

BACKGROUND

The number of electronic devices, and particularly smart devices, in users' homes continues to increase. These devices are required to perform increasingly complex tasks, including user-specific tasks in multi-user environments.

SUMMARY

Some techniques for multi-user configuration using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for multi-user configuration. Such methods and interfaces optionally complement or replace other methods for multi-user configuration. Such methods and interfaces reduce the cognitive burden on a user and produce a more efficient human-machine interface. For battery-operated computing devices, such methods and interfaces conserve power and increase the time between battery charges.

Example methods are described herein. An example method includes, at an electronic device with a media output device: receiving a request determined based on a voice input; and in response to receiving the request: in accordance with a determination that the voice input does not match a voice profile associated with an account that is associated with the electronic device: causing output, by the media output device, of first information based on the request using a first account associated with the electronic device; in accordance with a setting of the electronic device being set to a first state, causing update of account data of the first account based on the request; and in accordance with the setting of the electronic device being set to a second state, forgoing causing update of the account data of the first account based on the request; and in accordance with a determination that the voice input matches a voice profile associated with an account that is associated with the electronic device: causing output, by the media output device, of the first information based on the request using the account associated with the matching voice profile; and causing update of account data of the account associated with the matching voice profile based on the request.

Example non-transitory computer-readable storage media are described herein. An example non-transitory computer-readable storage medium stores one or more programs configured to be executed by one or more processors of an electronic device with a media output device, the one or more programs including instructions for: receiving a request determined based on a voice input; and in response to receiving the request: in accordance with a determination that the voice input does not match a voice profile associated with an account that is associated with the electronic device: causing output, by the media output device, of first information based on the request using a first account associated with the electronic device; in accordance with a setting of the electronic device being set to a first state, causing update of account data of the first account based on the request; and in accordance with the setting of the electronic device being set to a second state, forgoing causing update of the account data of the first account based on the request; and in accordance with a determination that the voice input matches a voice profile associated with an account that is associated with the electronic device: causing output, by the media output device, of the first information based on the request using the account associated with the matching voice profile; and causing update of account data of the account associated with the matching voice profile based on the request.

Example transitory computer-readable storage media are described herein. An example transitory computer-readable storage medium stores one or more programs configured to be executed by one or more processors of an electronic device with a media output device, the one or more programs including instructions for: receiving a request determined based on a voice input; and in response to receiving the request: in accordance with a determination that the voice input does not match a voice profile associated with an account that is associated with the electronic device: causing output, by the media output device, of first information based on the request using a first account associated with the electronic device; in accordance with a setting of the electronic device being set to a first state, causing update of account data of the first account based on the request; and in accordance with the setting of the electronic device being set to a second state, forgoing causing update of the account data of the first account based on the request; and in accordance with a determination that the voice input matches a voice profile associated with an account that is associated with the electronic device: causing output, by the media output device, of the first information based on the request using the account associated with the matching voice profile; and causing update of account data of the account associated with the matching voice profile based on the request.

Example electronic devices are described herein. An example electronic device includes a media output device; one or more processors; and memory storing one or more programs configured to be executed by the one or more processors, the one or more programs including instructions for: receiving a request determined based on a voice input; and in response to receiving the request: in accordance with a determination that the voice input does not match a voice profile associated with an account that is associated with the electronic device: causing output, by the media output device, of first information based on the request using a first account associated with the electronic device; in accordance with a setting of the electronic device being set to a first state, causing update of account data of the first account based on the request; and in accordance with the setting of the electronic device being set to a second state, forgoing causing update of the account data of the first account based on the request; and in accordance with a determination that the voice input matches a voice profile associated with an account that is associated with the electronic device: causing output, by the media output device, of the first information based on the request using the account associated with the matching voice profile; and causing update of account data of the account associated with the matching voice profile based on the request.

An example electronic device includes a media output device; means for receiving a request determined based on a voice input; and means for, in response to receiving the request: in accordance with a determination that the voice input does not match a voice profile associated with an account that is associated with the electronic device: causing output, by the media output device, of first information based on the request using a first account associated with the electronic device; in accordance with a setting of the electronic device being set to a first state, causing update of account data of the first account based on the request; and in accordance with the setting of the electronic device being set to a second state, forgoing causing update of the account data of the first account based on the request; and in accordance with a determination that the voice input matches a voice profile associated with an account that is associated with the electronic device: causing output, by the media output device, of the first information based on the request using the account associated with the matching voice profile; and causing update of account data of the account associated with the matching voice profile based on the request.

An example method includes, at a first device with a display device and one or more input devices: detecting that one or more devices associated with the first device support a respective feature; in accordance with a determination that a set of criteria are met, the set of criteria including a criterion that is met when the one or more devices support the respective feature: displaying, on the display device, a prompt to configure the respective feature of the one or more devices; while displaying the prompt to configure the respective feature of the one or more devices, receiving, via the one or more input devices, a set of one or more inputs; and in response to receiving the set of one or more inputs, performing a configuration operation associated with the respective feature; and in accordance with a determination that the one or more devices do not support the respective feature, forgoing display of, on the display device, the prompt to configure the respective feature of the one or more devices.

An example non-transitory computer-readable storage medium stores one or more programs configured to be executed by one or more processors of an electronic device with a display device and one or more input devices, the one or more programs including instructions for: detecting that one or more devices associated with the first device support a respective feature; in accordance with a determination that a set of criteria are met, the set of criteria including a criterion that is met when the one or more devices support the respective feature: displaying, on the display device, a prompt to configure the respective feature of the one or more devices; while displaying the prompt to configure the respective feature of the one or more devices, receiving, via the one or more input devices, a set of one or more inputs; and in response to receiving the set of one or more inputs, performing a configuration operation associated with the respective feature; and in accordance with a determination that the one or more devices do not support the respective feature, forgoing display of, on the display device, the prompt to configure the respective feature of the one or more devices.

An example transitory computer-readable storage medium stores one or more programs configured to be executed by one or more processors of an electronic device with a display device and one or more input devices, the one or more programs including instructions for: detecting that one or more devices associated with the first device support a respective feature; in accordance with a determination that a set of criteria are met, the set of criteria including a criterion that is met when the one or more devices support the respective feature: displaying, on the display device, a prompt to configure the respective feature of the one or more devices; while displaying the prompt to configure the respective feature of the one or more devices, receiving, via the one or more input devices, a set of one or more inputs; and in response to receiving the set of one or more inputs, performing a configuration operation associated with the respective feature; and in accordance with a determination that the one or more devices do not support the respective feature, forgoing display of, on the display device, the prompt to configure the respective feature of the one or more devices.

An example electronic device includes a display device; one or more input devices; one or more processors; and memory storing one or more programs configured to be executed by the one or more processors, the one or more programs including instructions for: detecting that one or more devices associated with the first device support a respective feature; in accordance with a determination that a set of criteria are met, the set of criteria including a criterion that is met when the one or more devices support the respective feature: displaying, on the display device, a prompt to configure the respective feature of the one or more devices; while displaying the prompt to configure the respective feature of the one or more devices, receiving, via the one or more input devices, a set of one or more inputs; and in response to receiving the set of one or more inputs, performing a configuration operation associated with the respective feature; and in accordance with a determination that the one or more devices do not support the respective feature, forgoing display of, on the display device, the prompt to configure the respective feature of the one or more devices.

An example electronic device includes a display device; one or more input devices; means for detecting that one or more devices associated with the first device support a respective feature; means for, in accordance with a determination that a set of criteria are met, the set of criteria including a criterion that is met when the one or more devices support the respective feature: displaying, on the display device, a prompt to configure the respective feature of the one or more devices; while displaying the prompt to configure the respective feature of the one or more devices, receiving, via the one or more input devices, a set of one or more inputs; and in response to receiving the set of one or more inputs, performing a configuration operation associated with the respective feature; and means for, in accordance with a determination that the one or more devices do not support the respective feature, forgoing display of, on the display device, the prompt to configure the respective feature of the one or more devices.

An example method includes, at an electronic device with a display device and one or more input devices: receiving, via the one or more input devices, an input; and in response to receiving the input, displaying, on the display device, a settings interface for a plurality of devices associated with a plurality of accounts that include one or more administrator accounts and one or more non-administrator accounts, wherein the electronic device is associated with a first account of the plurality of accounts, and wherein: in accordance with the first account being an administrator account of the plurality of accounts, and in accordance with the settings interface being a settings interface for a second account different than the first account: the settings interface includes one or more settings of a first type and one or more settings of a second type, the one or more settings of the first type are editable via the settings interface, and the one or more settings of the second type are not editable via the settings interface; in accordance with the first account being a non-administrator account of the plurality of accounts, and in accordance with the settings interface being a settings interface for the first account: the settings interface includes one or more settings of the second type, and the one or more settings of the second type are editable via the settings interface.

An example non-transitory computer-readable storage medium stores one or more programs configured to be executed by one or more processors of an electronic device with a display device and one or more input devices, the one or more programs including instructions for: receiving, via the one or more input devices, an input; and in response to receiving the input, displaying, on the display device, a settings interface for a plurality of devices associated with a plurality of accounts that include one or more administrator accounts and one or more non-administrator accounts, wherein the electronic device is associated with a first account of the plurality of accounts, and wherein: in accordance with the first account being an administrator account of the plurality of accounts, and in accordance with the settings interface being a settings interface for a second account different than the first account: the settings interface includes one or more settings of a first type and one or more settings of a second type, the one or more settings of the first type are editable via the settings interface, and the one or more settings of the second type are not editable via the settings interface; in accordance with the first account being a non-administrator account of the plurality of accounts, and in accordance with the settings interface being a settings interface for the first account: the settings interface includes one or more settings of the second type, and the one or more settings of the second type are editable via the settings interface.

An example transitory computer-readable storage medium stores one or more programs configured to be executed by one or more processors of an electronic device with a display device and one or more input devices, the one or more programs including instructions for: receiving, via the one or more input devices, an input; and in response to receiving the input, displaying, on the display device, a settings interface for a plurality of devices associated with a plurality of accounts that include one or more administrator accounts and one or more non-administrator accounts, wherein the electronic device is associated with a first account of the plurality of accounts, and wherein: in accordance with the first account being an administrator account of the plurality of accounts, and in accordance with the settings interface being a settings interface for a second account different than the first account: the settings interface includes one or more settings of a first type and one or more settings of a second type, the one or more settings of the first type are editable via the settings interface, and the one or more settings of the second type are not editable via the settings interface; in accordance with the first account being a non-administrator account of the plurality of accounts, and in accordance with the settings interface being a settings interface for the first account: the settings interface includes one or more settings of the second type, and the one or more settings of the second type are editable via the settings interface.

An example electronic device includes a display device; one or more input devices; one or more processors; and memory storing one or more programs configured to be executed by the one or more processors, the one or more programs including instructions for: receiving, via the one or more input devices, an input; and in response to receiving the input, displaying, on the display device, a settings interface for a plurality of devices associated with a plurality of accounts that include one or more administrator accounts and one or more non-administrator accounts, wherein the electronic device is associated with a first account of the plurality of accounts, and wherein: in accordance with the first account being an administrator account of the plurality of accounts, and in accordance with the settings interface being a settings interface for a second account different than the first account: the settings interface includes one or more settings of a first type and one or more settings of a second type, the one or more settings of the first type are editable via the settings interface, and the one or more settings of the second type are not editable via the settings interface; in accordance with the first account being a non-administrator account of the plurality of accounts, and in accordance with the settings interface being a settings interface for the first account: the settings interface includes one or more settings of the second type, and the one or more settings of the second type are editable via the settings interface.

An example electronic device includes a display device; one or more input devices; means for receiving, via the one or more input devices, an input; and means for, in response to receiving the input, displaying, on the display device, a settings interface for a plurality of devices associated with a plurality of accounts that include one or more administrator accounts and one or more non-administrator accounts, wherein the electronic device is associated with a first account of the plurality of accounts, and wherein: in accordance with the first account being an administrator account of the plurality of accounts, and in accordance with the settings interface being a settings interface for a second account different than the first account: the settings interface includes one or more settings of a first type and one or more settings of a second type, the one or more settings of the first type are editable via the settings interface, and the one or more settings of the second type are not editable via the settings interface; in accordance with the first account being a non-administrator account of the plurality of accounts, and in accordance with the settings interface being a settings interface for the first account: the settings interface includes one or more settings of the second type, and the one or more settings of the second type are editable via the settings interface.

An example method includes, at an electronic device with a display device and one or more input devices: displaying, via the display device, a device access configuration user interface including at least a first set of device access affordances; while displaying the device access configuration user interface, receiving, via the one or more input devices, a set of one or more inputs that includes an input designating one or more users; and in response to receiving the set of one or more inputs: in accordance with the set of one or more inputs including an input corresponding to a selection of a first permission setting, sending an invitation that, when accepted, provides access to the one or more users that includes access to a set of devices based on the first permission setting that includes a first permission; and in accordance with the set of one or more inputs not including an input corresponding to selection of the first permission setting, sending an invitation that, when accepted, provides access to the one or more users that includes access to the set of devices based on the first permission setting that does not include the first permission.

An example non-transitory computer-readable storage medium stores one or more programs configured to be executed by one or more processors of an electronic device with a display device and one or more input devices, the one or more programs including instructions for: displaying, via the display device, a device access configuration user interface including at least a first set of device access affordances; while displaying the device access configuration user interface, receiving, via the one or more input devices, a set of one or more inputs that includes an input designating one or more users; and in response to receiving the set of one or more inputs: in accordance with the set of one or more inputs including an input corresponding to a selection of a first permission setting, sending an invitation that, when accepted, provides access to the one or more users that includes access to a set of devices based on the first permission setting that includes a first permission; and in accordance with the set of one or more inputs not including an input corresponding to selection of the first permission setting, sending an invitation that, when accepted, provides access to the one or more users that includes access to the set of devices based on the first permission setting that does not include the first permission.

An example transitory computer-readable storage medium stores one or more programs configured to be executed by one or more processors of an electronic device with a display device and one or more input devices, the one or more programs including instructions for: displaying, via the display device, a device access configuration user interface including at least a first set of device access affordances; while displaying the device access configuration user interface, receiving, via the one or more input devices, a set of one or more inputs that includes an input designating one or more users; and in response to receiving the set of one or more inputs: in accordance with the set of one or more inputs including an input corresponding to a selection of a first permission setting, sending an invitation that, when accepted, provides access to the one or more users that includes access to a set of devices based on the first permission setting that includes a first permission; and in accordance with the set of one or more inputs not including an input corresponding to selection of the first permission setting, sending an invitation that, when accepted, provides access to the one or more users that includes access to the set of devices based on the first permission setting that does not include the first permission.

An example electronic device includes a display device; one or more input devices; one or more processors; and memory storing one or more programs configured to be executed by the one or more processors, the one or more programs including instructions for: displaying, via the display device, a device access configuration user interface including at least a first set of device access affordances; while displaying the device access configuration user interface, receiving, via the one or more input devices, a set of one or more inputs that includes an input designating one or more users; and in response to receiving the set of one or more inputs: in accordance with the set of one or more inputs including an input corresponding to a selection of a first permission setting, sending an invitation that, when accepted, provides access to the one or more users that includes access to a set of devices based on the first permission setting that includes a first permission; and in accordance with the set of one or more inputs not including an input corresponding to selection of the first permission setting, sending an invitation that, when accepted, provides access to the one or more users that includes access to the set of devices based on the first permission setting that does not include the first permission.

An example electronic device includes a display device; one or more input devices; means for displaying, via the display device, a device access configuration user interface including at least a first set of device access affordances; means for, while displaying the device access configuration user interface, receiving, via the one or more input devices, a set of one or more inputs that includes an input designating one or more users; and means for, in response to receiving the set of one or more inputs: in accordance with the set of one or more inputs including an input corresponding to a selection of a first permission setting, sending an invitation that, when accepted, provides access to the one or more users that includes access to a set of devices based on the first permission setting that includes a first permission; and in accordance with the set of one or more inputs not including an input corresponding to selection of the first permission setting, sending an invitation that, when accepted, provides access to the one or more users that includes access to the set of devices based on the first permission setting that does not include the first permission.

An example method includes, at an electronic device with a display device and one or more input devices, and that is associated with a first account of a first set of accounts: in accordance with a determination that the first set of accounts includes at least one account that is not included in a second set of accounts that includes the first account: displaying, on the display device, a prompt to invite the at least one account to the second set of accounts; and subsequent to displaying the prompt: receiving, via the one or more input devices, a set of one or more inputs; and in response to receiving the set of one or more inputs, sending an invitation, to a selection of the at least one account that is not included in the second set of accounts, to join the second set of accounts; and in accordance with a determination that the first set of accounts does not include at least one account that is not included in the second set of accounts, forgoing display of, on the display device, the prompt to invite the at least one account to the second set of accounts.

An example non-transitory computer-readable storage medium stores one or more programs configured to be executed by one or more processors of an electronic device with a display device and one or more input devices, the electronic device associated with a first account of a first set of accounts and the one or more programs including instructions for: in accordance with a determination that the first set of accounts includes at least one account that is not included in a second set of accounts that includes the first account: displaying, on the display device, a prompt to invite the at least one account to the second set of accounts; and subsequent to displaying the prompt: receiving, via the one or more input devices, a set of one or more inputs; and in response to receiving the set of one or more inputs, sending an invitation, to a selection of the at least one account that is not included in the second set of accounts, to join the second set of accounts; and in accordance with a determination that the first set of accounts does not include at least one account that is not included in the second set of accounts, forgoing display of, on the display device, the prompt to invite the at least one account to the second set of accounts.

An example transitory computer-readable storage medium stores one or more programs configured to be executed by one or more processors of an electronic device with a display device and one or more input devices, the electronic device associated with a first account of a first set of accounts and the one or more programs including instructions for: in accordance with a determination that the first set of accounts includes at least one account that is not included in a second set of accounts that includes the first account: displaying, on the display device, a prompt to invite the at least one account to the second set of accounts; and subsequent to displaying the prompt: receiving, via the one or more input devices, a set of one or more inputs; and in response to receiving the set of one or more inputs, sending an invitation, to a selection of the at least one account that is not included in the second set of accounts, to join the second set of accounts; and in accordance with a determination that the first set of accounts does not include at least one account that is not included in the second set of accounts, forgoing display of, on the display device, the prompt to invite the at least one account to the second set of accounts.

An example electronic device associated with a first account of a first set of accounts, includes a display device; one or more input devices; one or more processors; and memory storing one or more programs configured to be executed by the one or more processors, the one or more programs including instructions for: in accordance with a determination that the first set of accounts includes at least one account that is not included in a second set of accounts that includes the first account: displaying, on the display device, a prompt to invite the at least one account to the second set of accounts; and subsequent to displaying the prompt: receiving, via the one or more input devices, a set of one or more inputs; and in response to receiving the set of one or more inputs, sending an invitation, to a selection of the at least one account that is not included in the second set of accounts, to join the second set of accounts; and in accordance with a determination that the first set of accounts does not include at least one account that is not included in the second set of accounts, forgoing display of, on the display device, the prompt to invite the at least one account to the second set of accounts.

An example electronic device associated with a first account of a first set of accounts, includes: a display device; one or more input devices; means for, in accordance with a determination that the first set of accounts includes at least one account that is not included in a second set of accounts that includes the first account: displaying, on the display device, a prompt to invite the at least one account to the second set of accounts; and subsequent to displaying the prompt: receiving, via the one or more input devices, a set of one or more inputs; and in response to receiving the set of one or more inputs, sending an invitation, to a selection of the at least one account that is not included in the second set of accounts, to join the second set of accounts; and means for, in accordance with a determination that the first set of accounts does not include at least one account that is not included in the second set of accounts, forgoing display of, on the display device, the prompt to invite the at least one account to the second set of accounts.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for multi-user configuration, thereby increasing the effectiveness, efficiency, and user satisfaction with such devices. Such methods and interfaces can complement or replace other methods for multi-user configuration.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 5I illustrates an electronic device in accordance with some embodiments.

FIGS. 6A-6L illustrate exemplary techniques for processing user requests, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for multi-user configuration. Such techniques can reduce the cognitive burden on a user who configures one or more devices for multi-user applications, thereby enhancing productivity. Further, such techniques can reduce processor and battery power otherwise wasted on redundant user inputs.

Figure 7A:
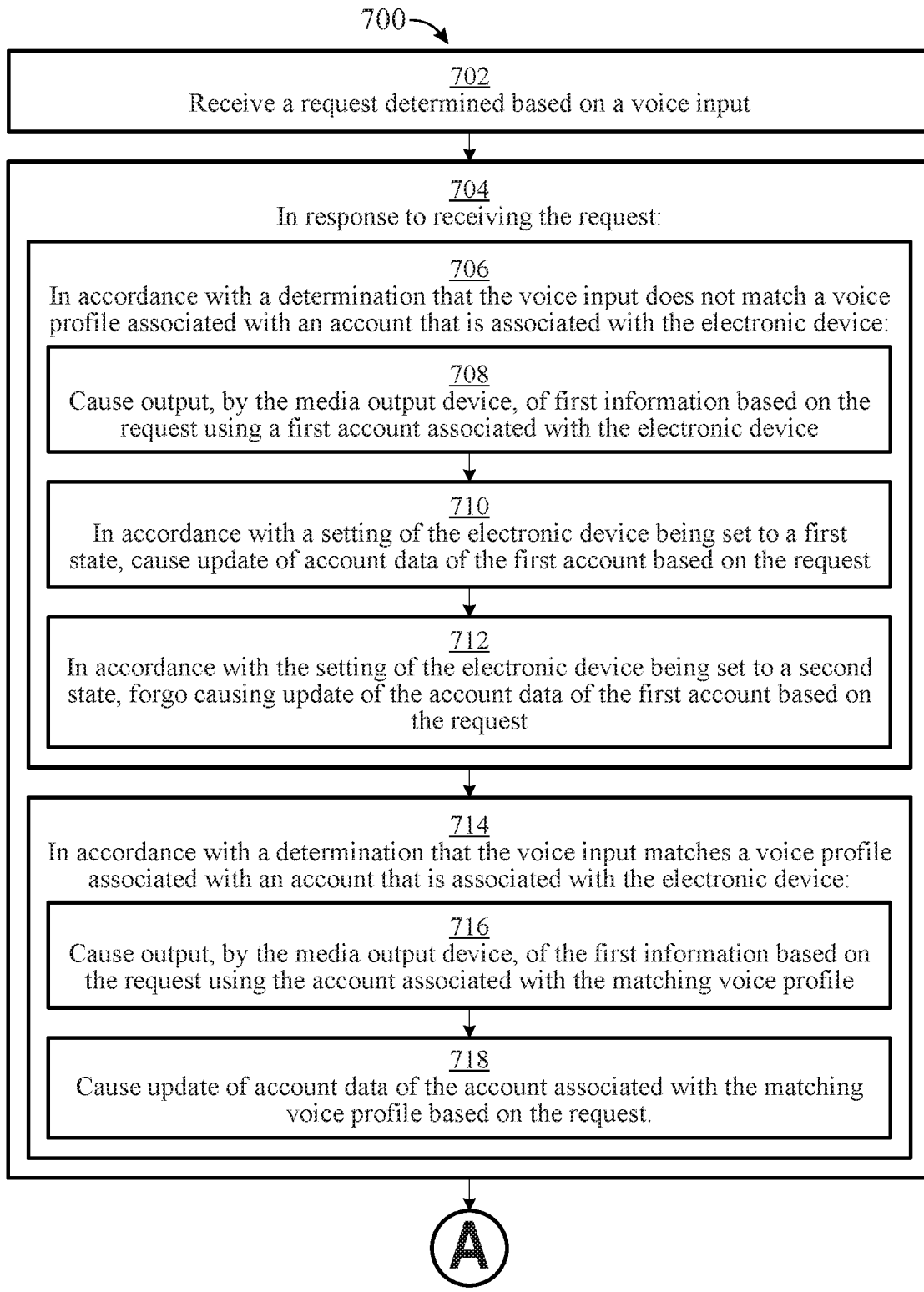
FIGS. 7A-7C is a flow diagram illustrating a process for processing user requests, in accordance with some embodiments.
Figure 7B:
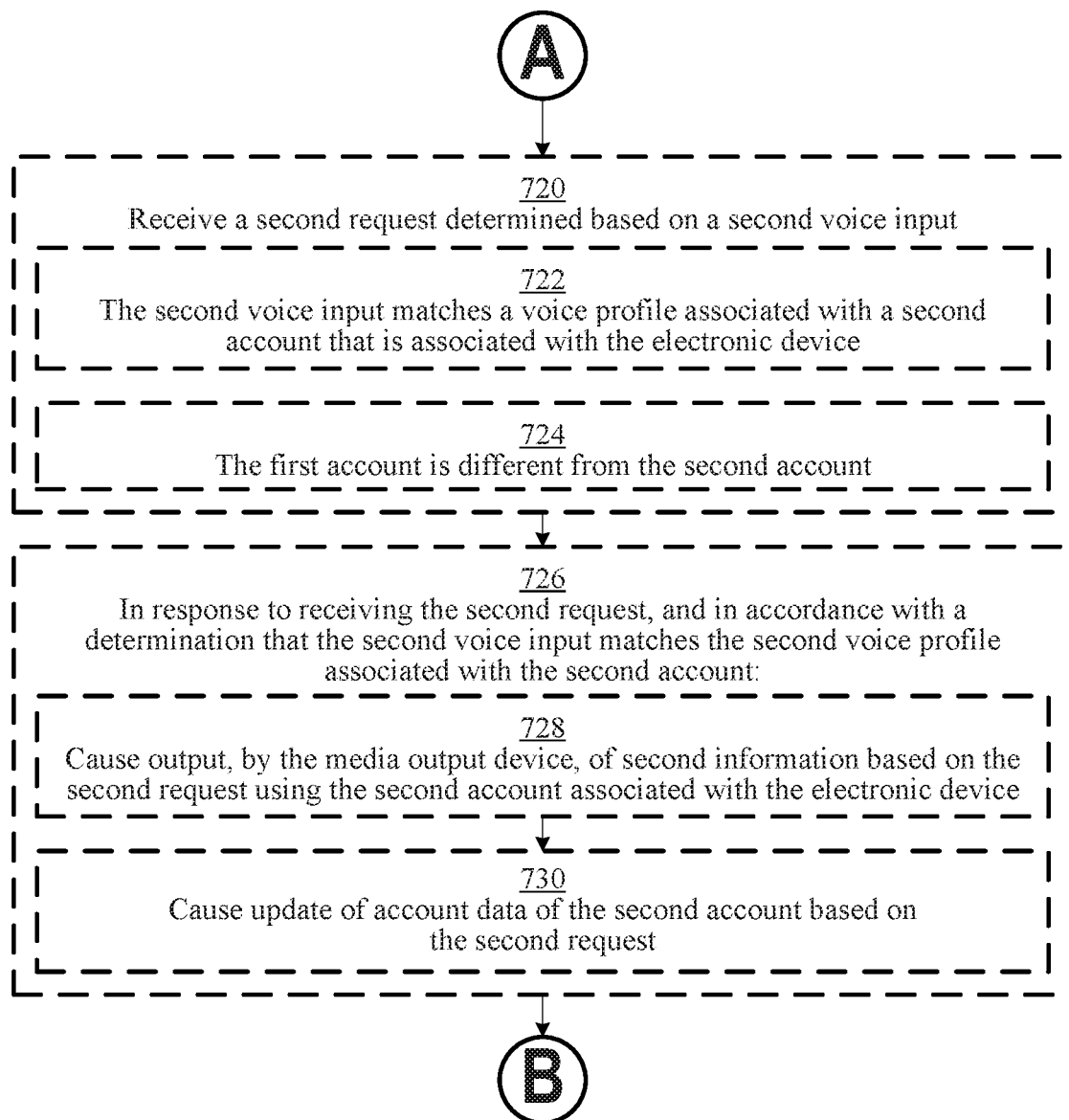
Figure 7C:
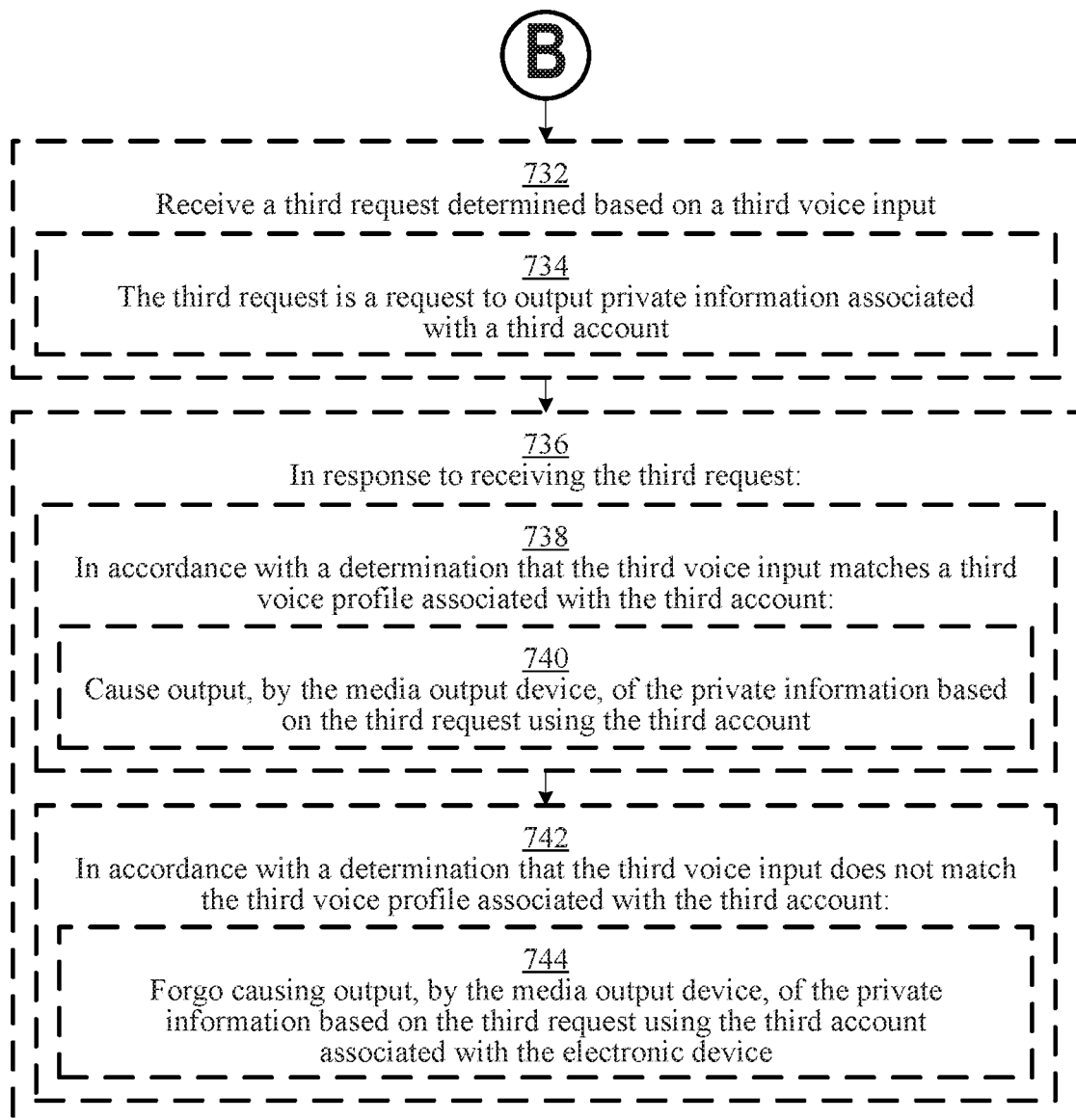
Figure 8A:
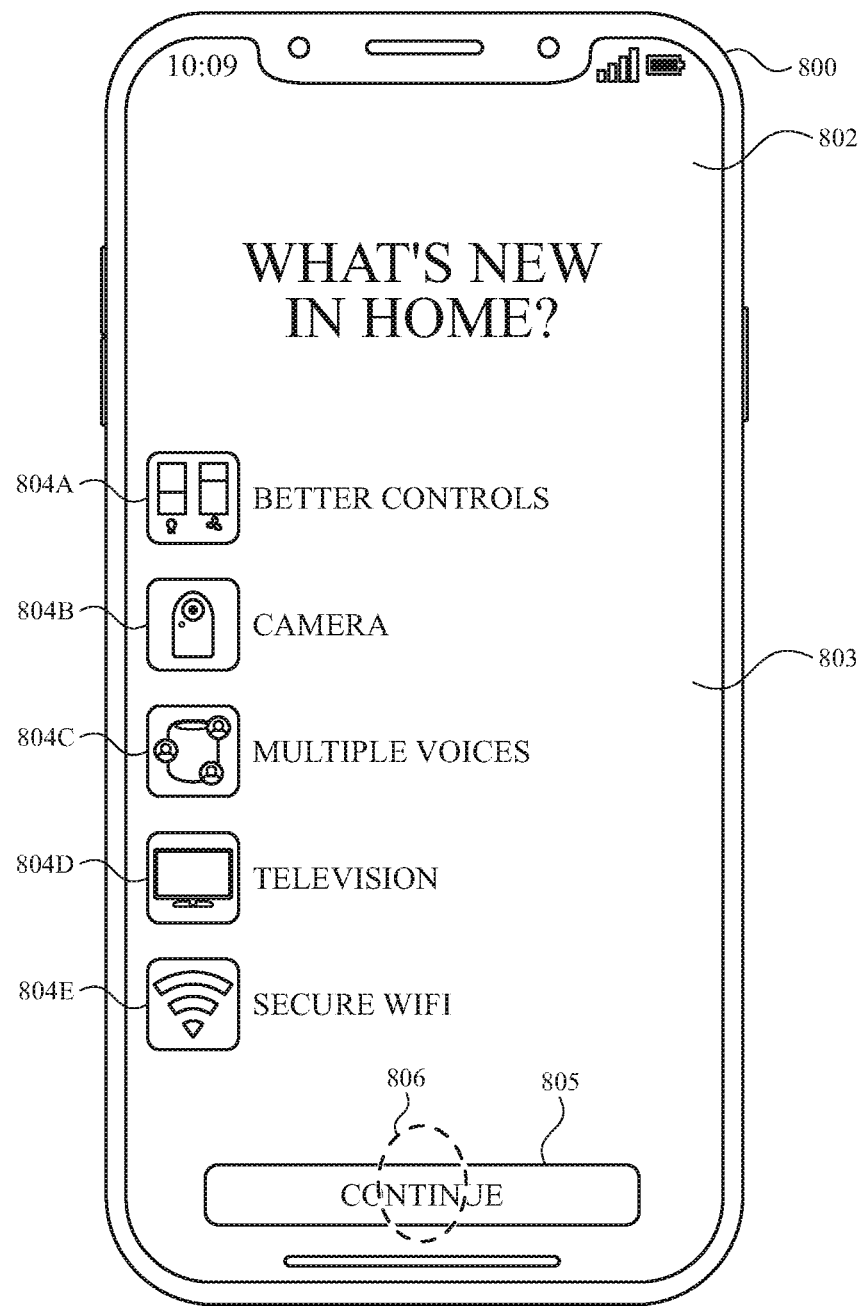
FIGS. 8A-8AB illustrate exemplary user interfaces for configuring user accounts, in accordance with some embodiments.
Figure 9:
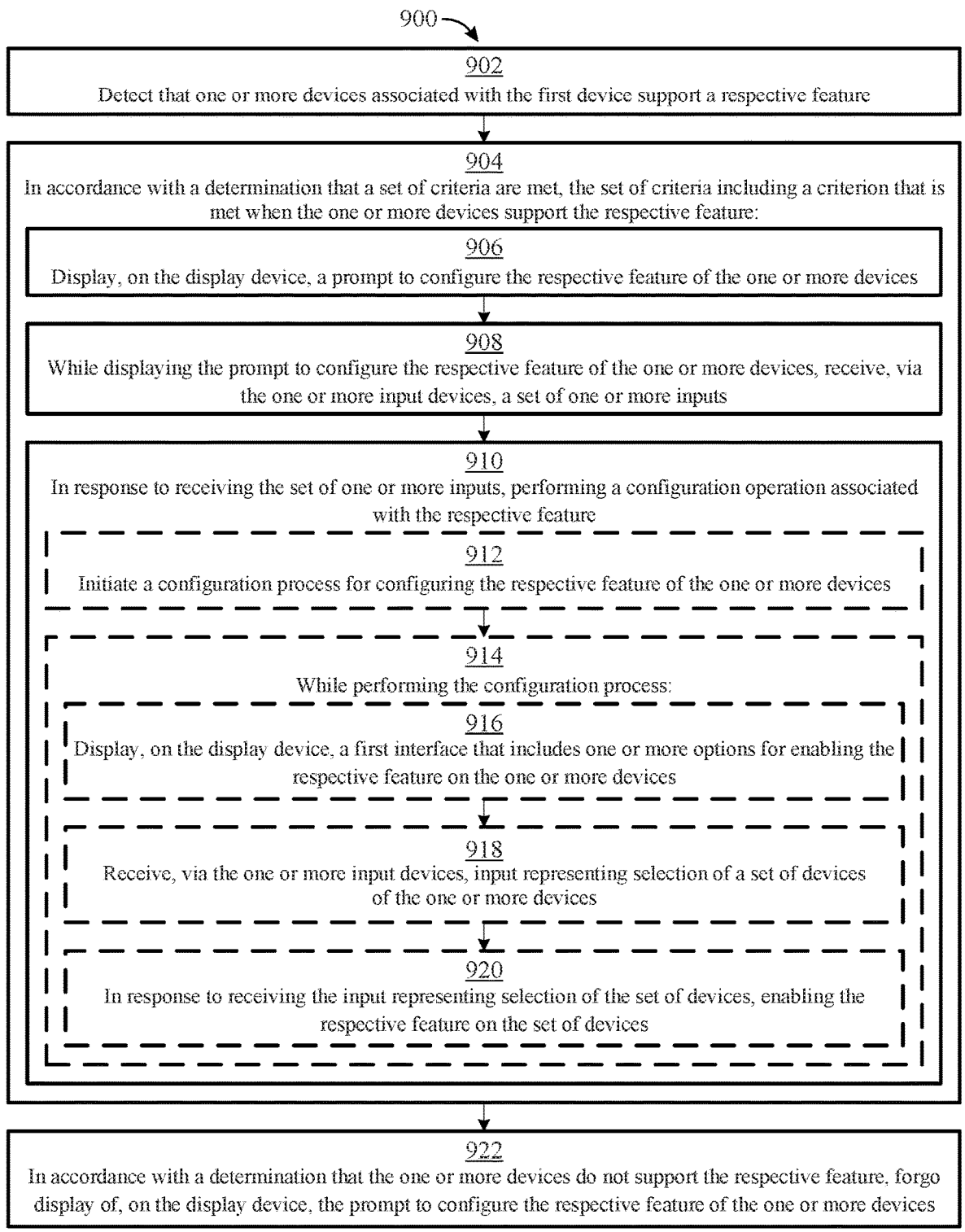
FIG. 9 is a flow diagram illustrating a process for configuring user accounts, in accordance with some embodiments.

Below, FIGS. 1A-1B, 2, 3, 4A-4B, and 5A-5H provide a description of exemplary devices for performing the techniques for managing event notifications. FIGS. 6A-6L illustrate exemplary user interfaces for processing user requests. FIGS. 7A-7C illustrate a flow diagram illustrating methods of processing user requests in accordance with some embodiments. The user interfaces in FIGS. 6A-6L are used to illustrate the processes described below, including the processes in FIGS. 7A-7C. FIGS. 8A-8AB illustrate exemplary user interfaces for configuring user accounts. FIG. 9 is a flow diagram illustrating methods of configuring user accounts in accordance with some embodiments. The user interfaces in FIGS. 8A-8AB are used to illustrate the processes described below, including the processes in FIG. 9. FIGS. 10A-10M illustrate exemplary user interfaces for configuring user accounts. FIG. 11 is a flow diagram illustrating methods of configuring user accounts in accordance with some embodiments. The user interfaces in FIGS. 10A-10M are used to illustrate the processes described below, including the processes in FIG. 11. FIGS. 12A-12G illustrate exemplary user interfaces for adding users to a location profile. FIG. 13 is a flow diagram illustrating methods of adding users to a location profile in accordance with some embodiments. The user interfaces in FIGS. 12A-12G are used to illustrate the processes described below, including the processes in FIG. 13. FIGS. 14A-14F illustrate exemplary user interfaces for adding users to a location profile. FIG. 15 is a flow diagram illustrating methods of adding users to a location profile in accordance with some embodiments. The user interfaces in FIGS. 14A-14F are used to illustrate the processes described below, including the processes in FIG. 15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
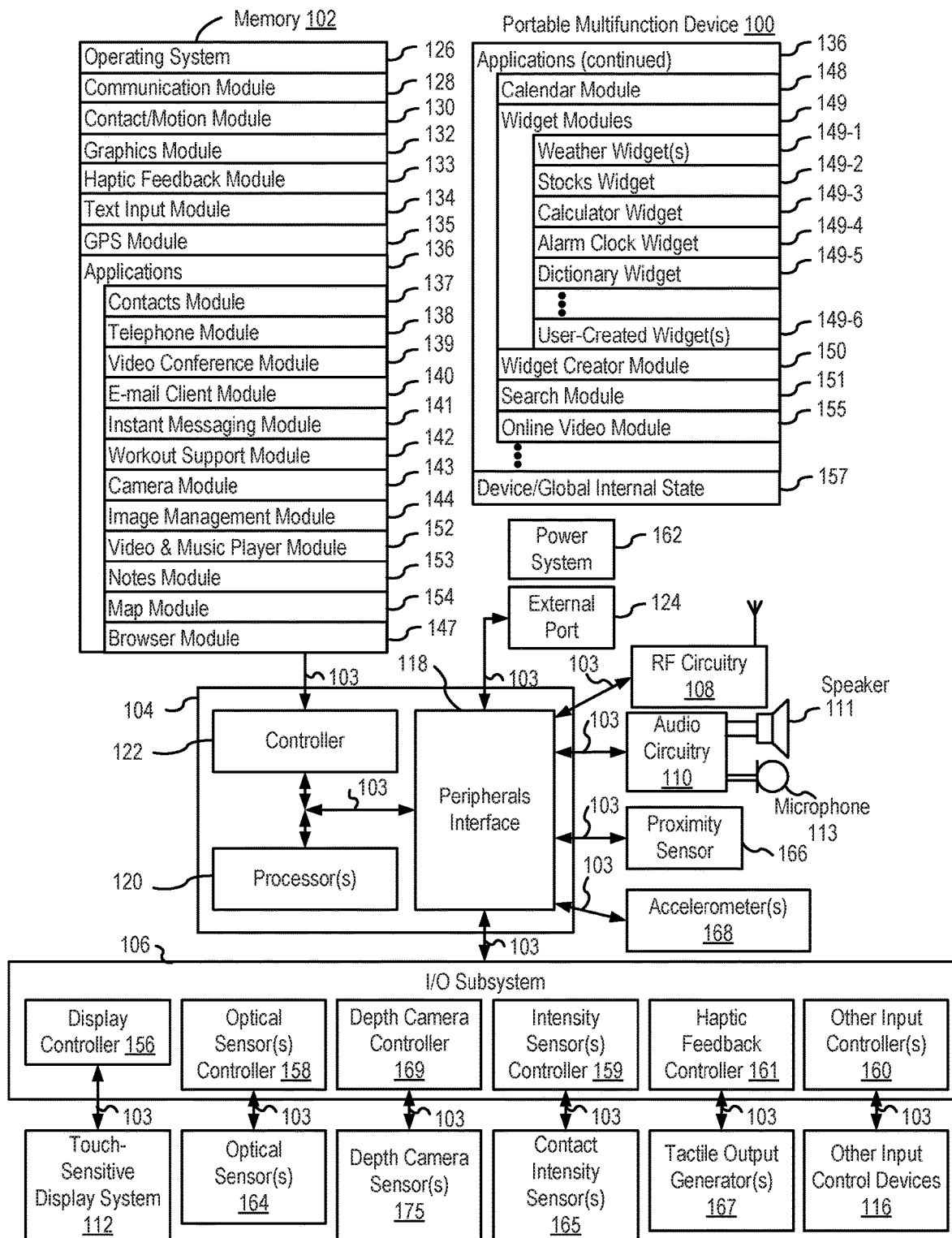
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
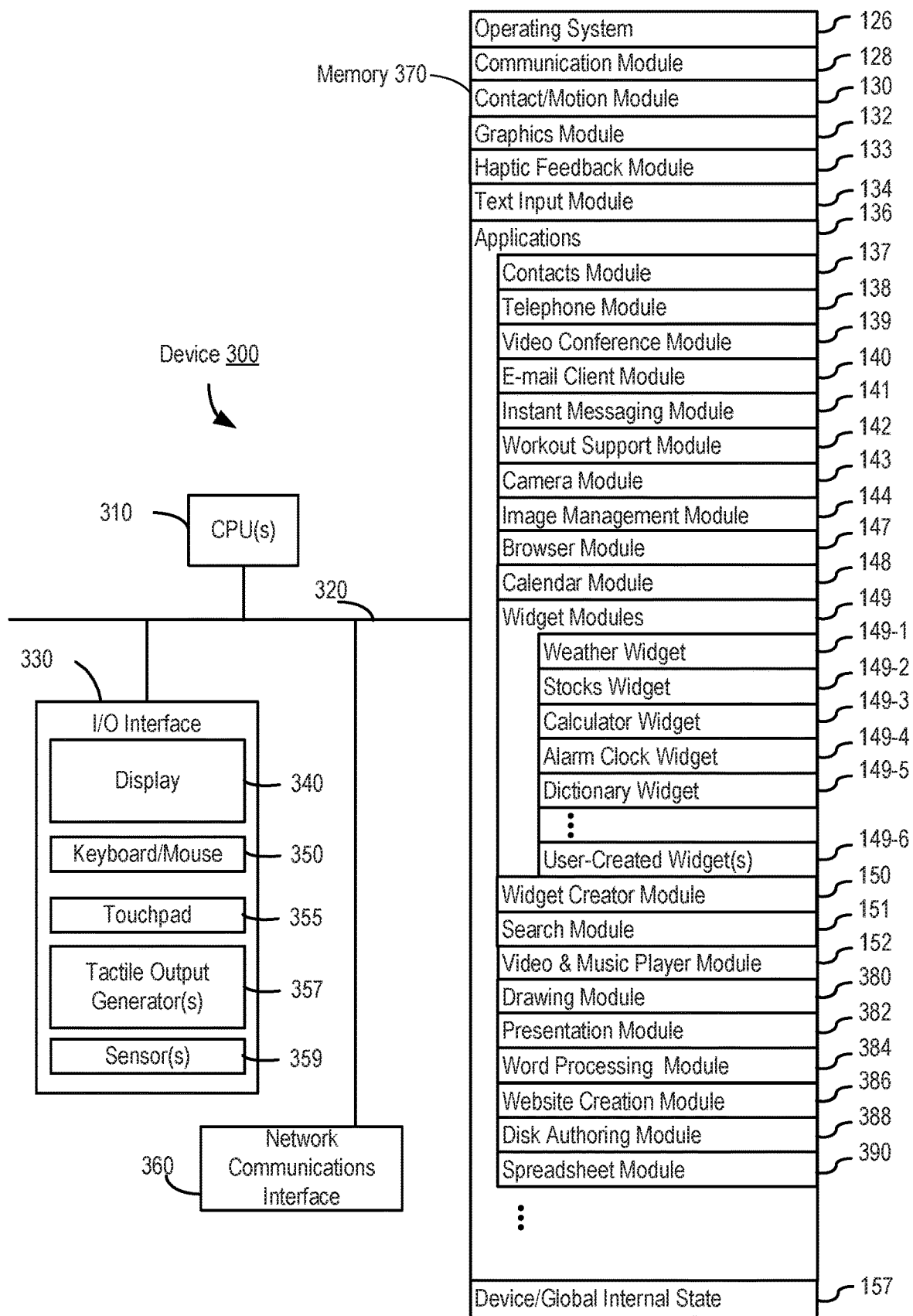
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
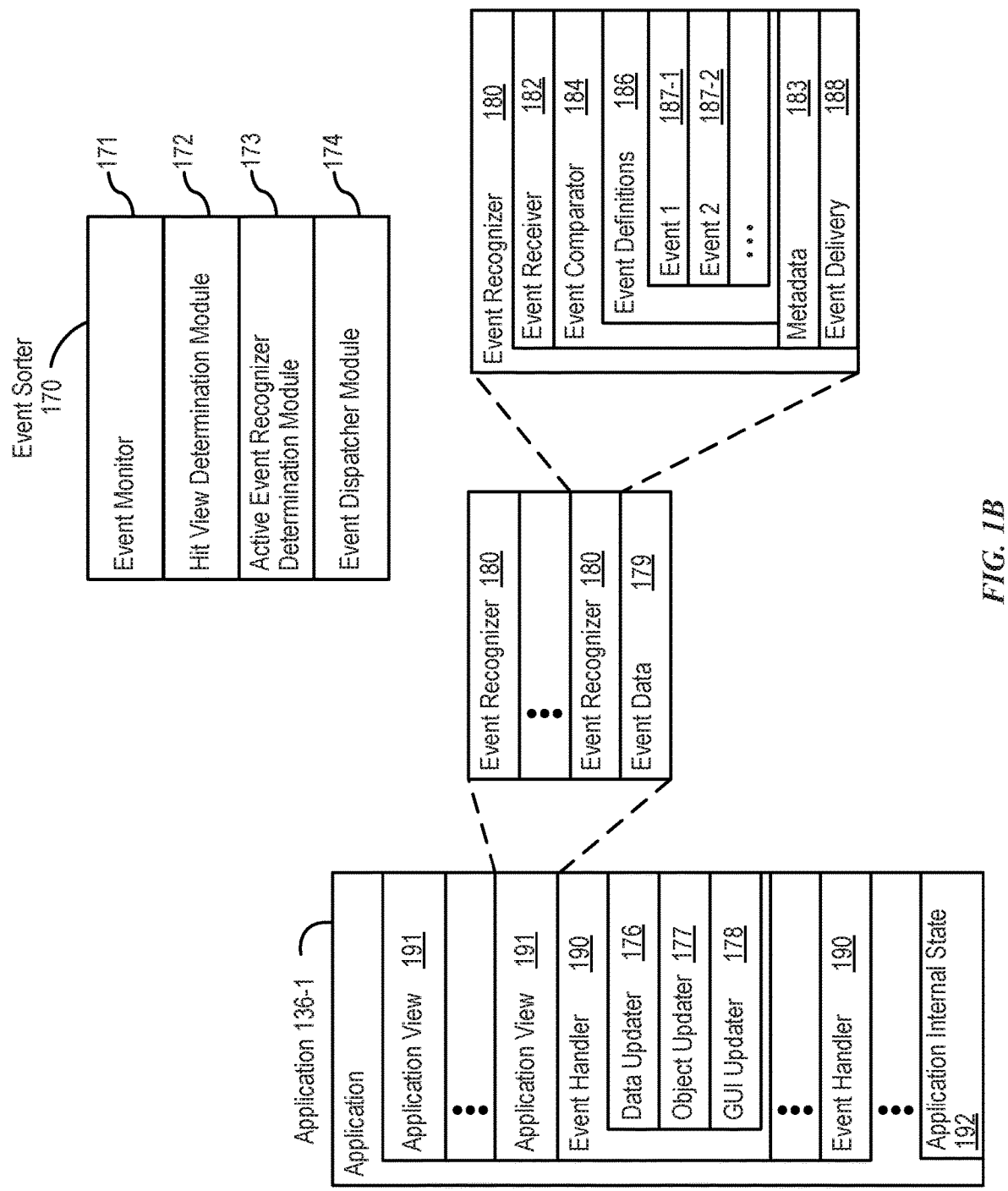
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
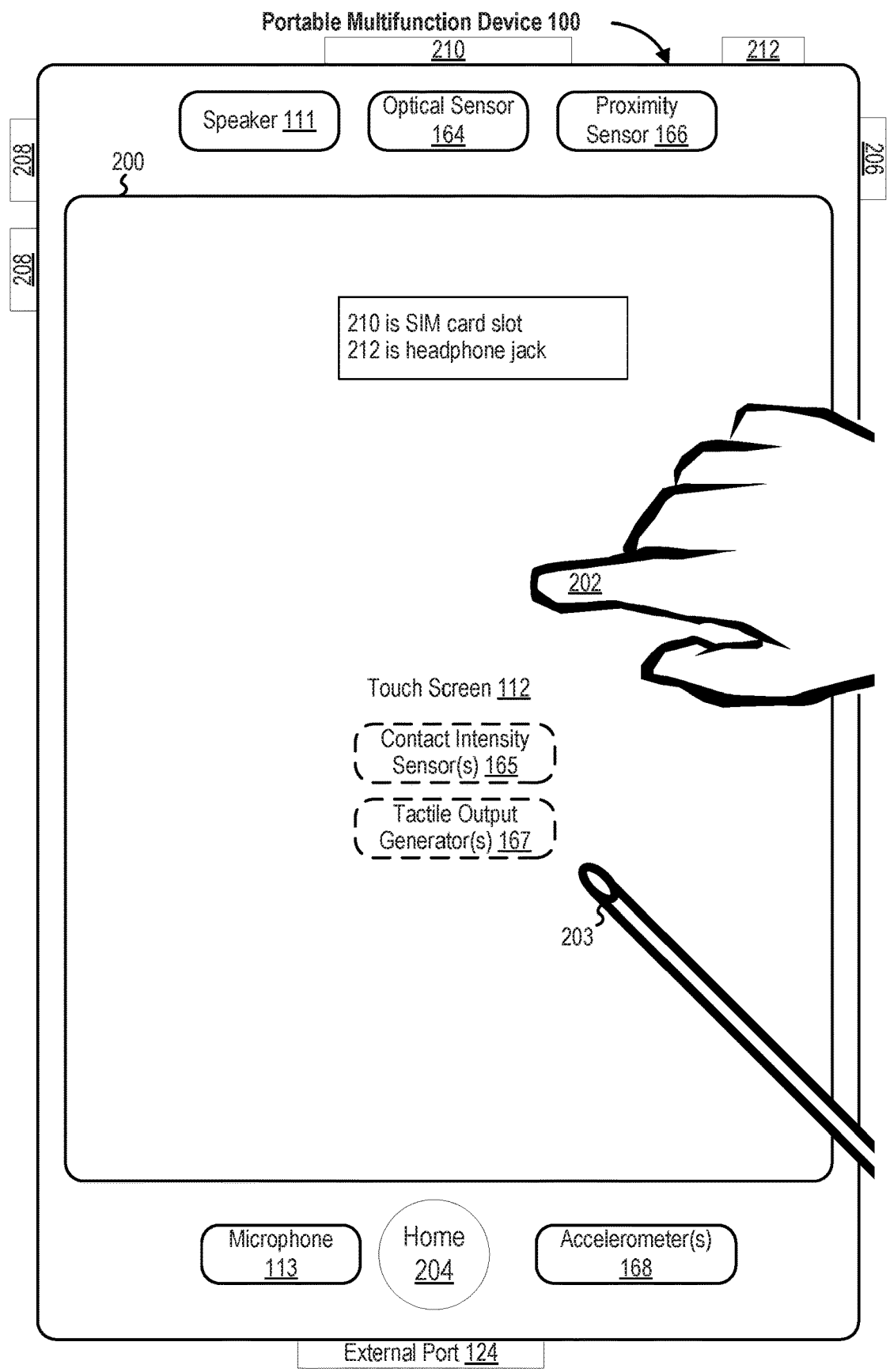
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
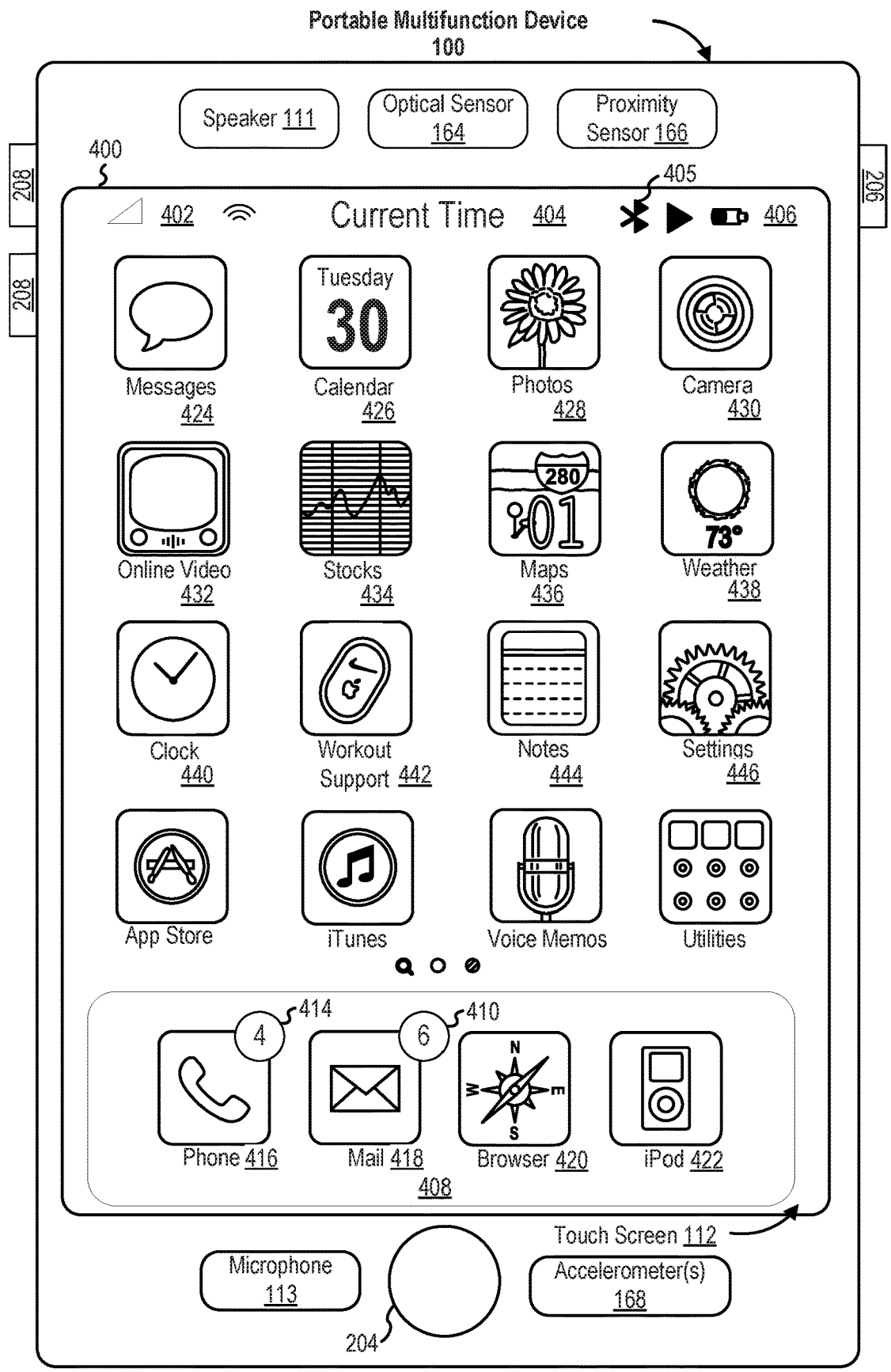
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
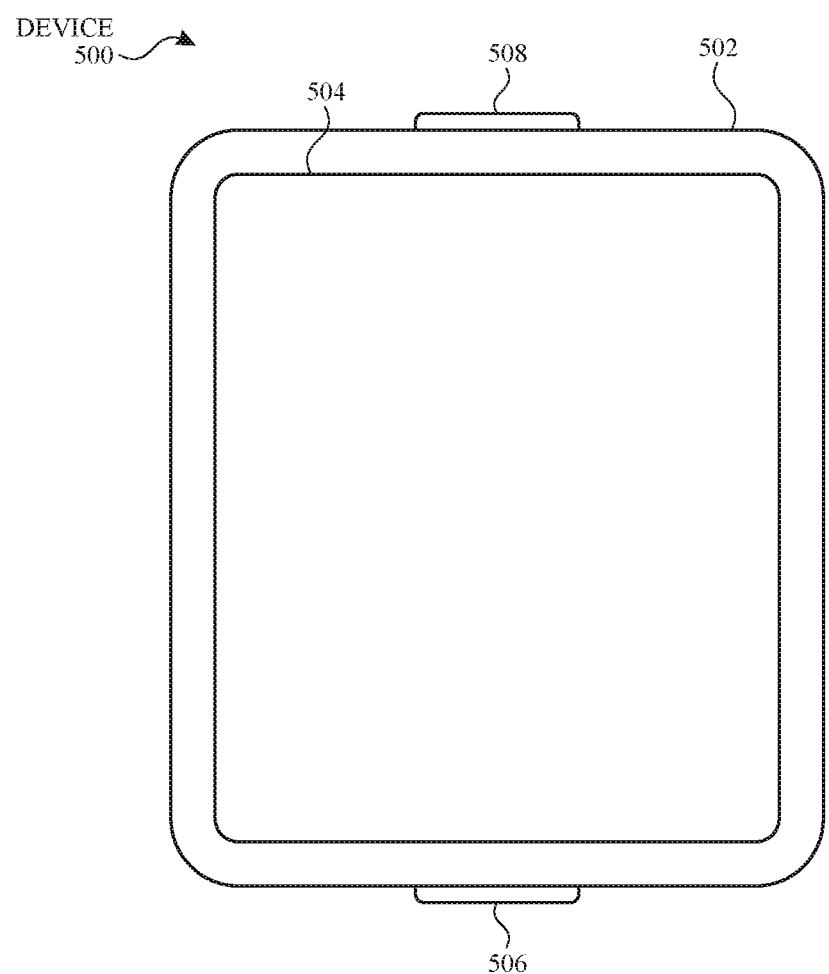
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
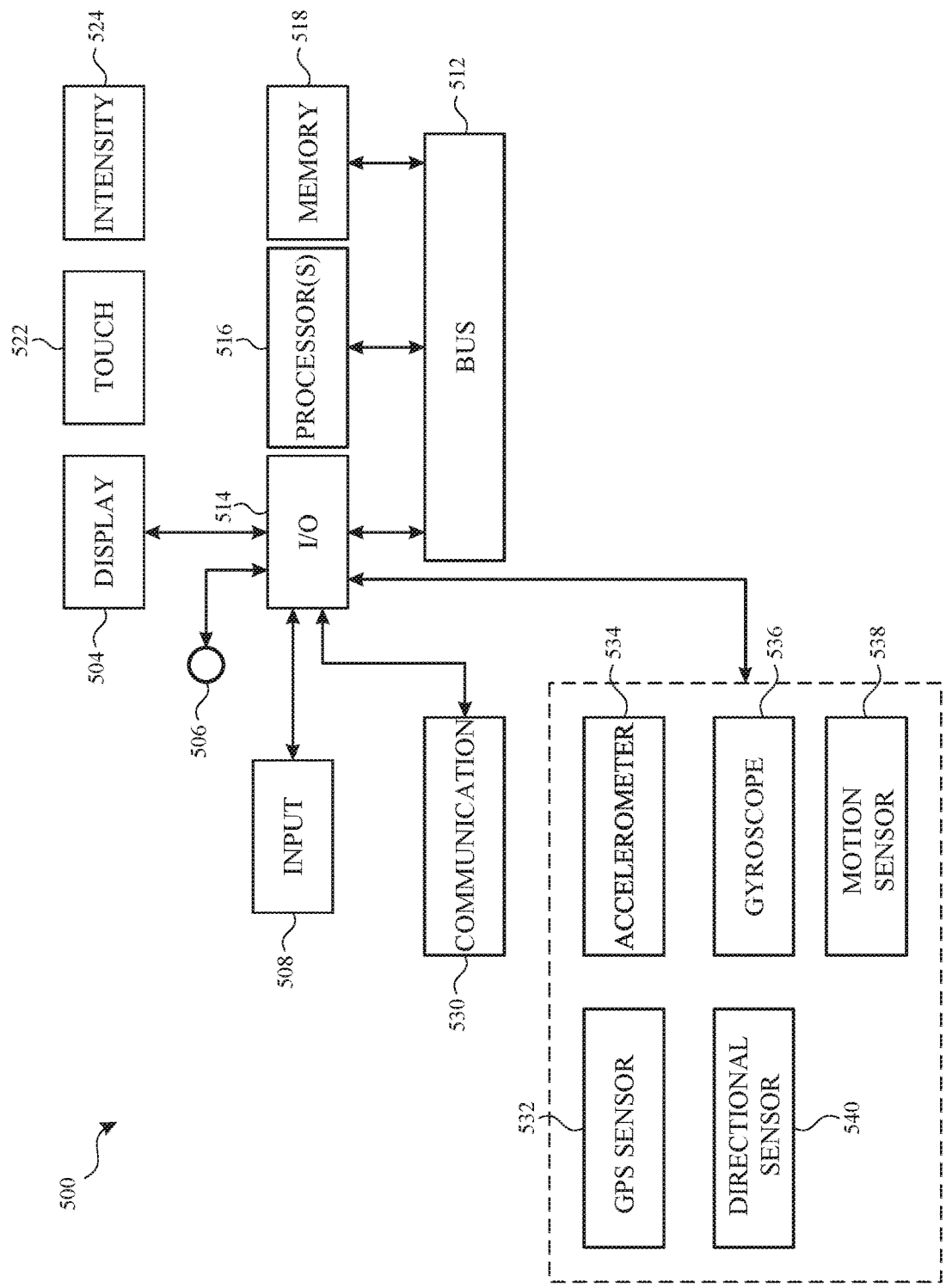
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7A-7C, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
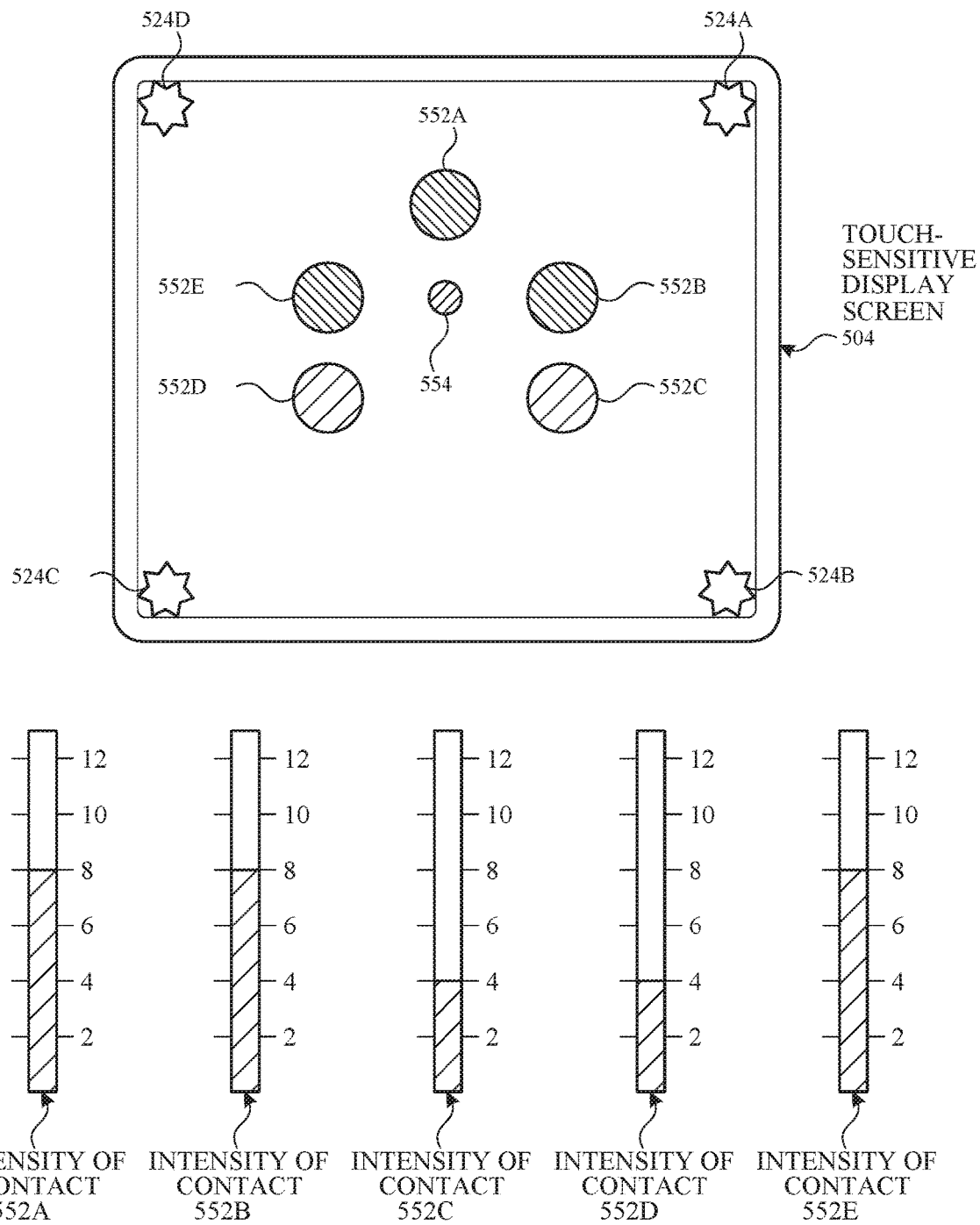
Figure 51:
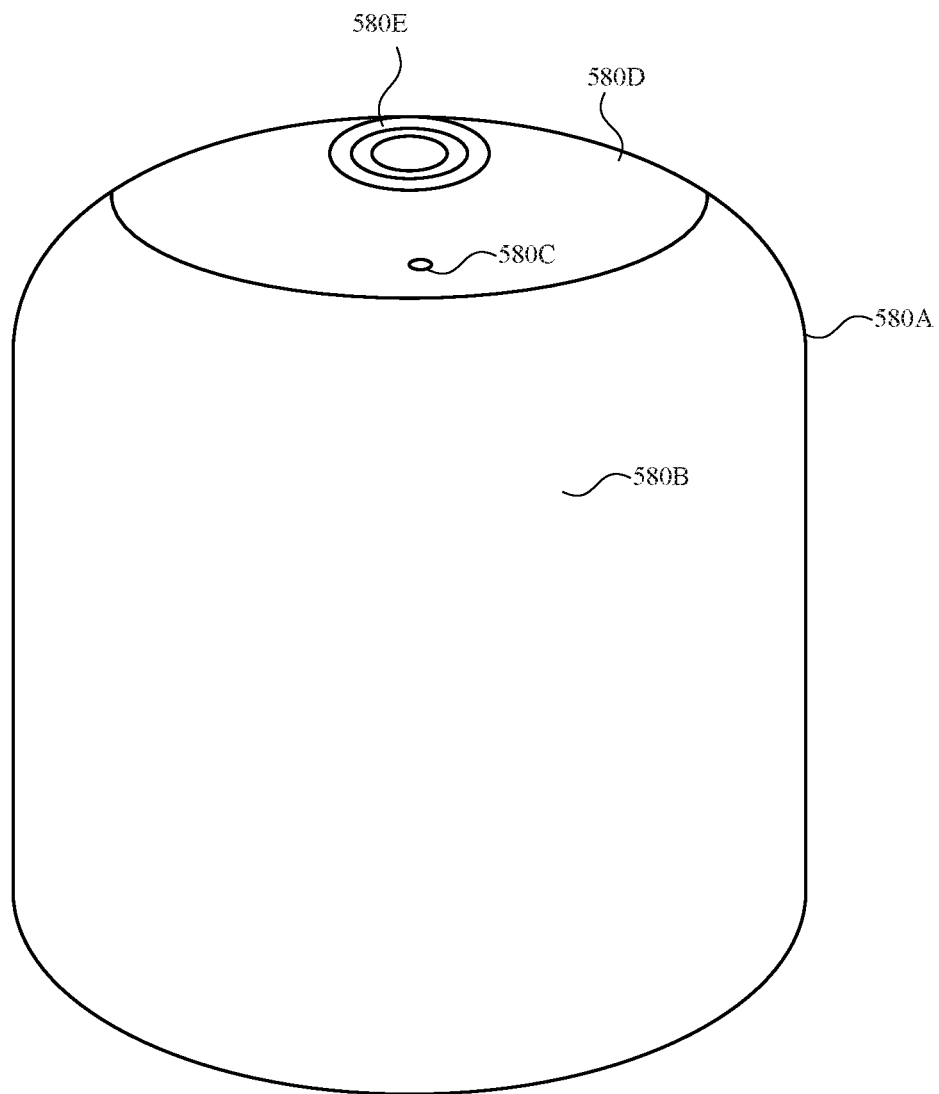

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
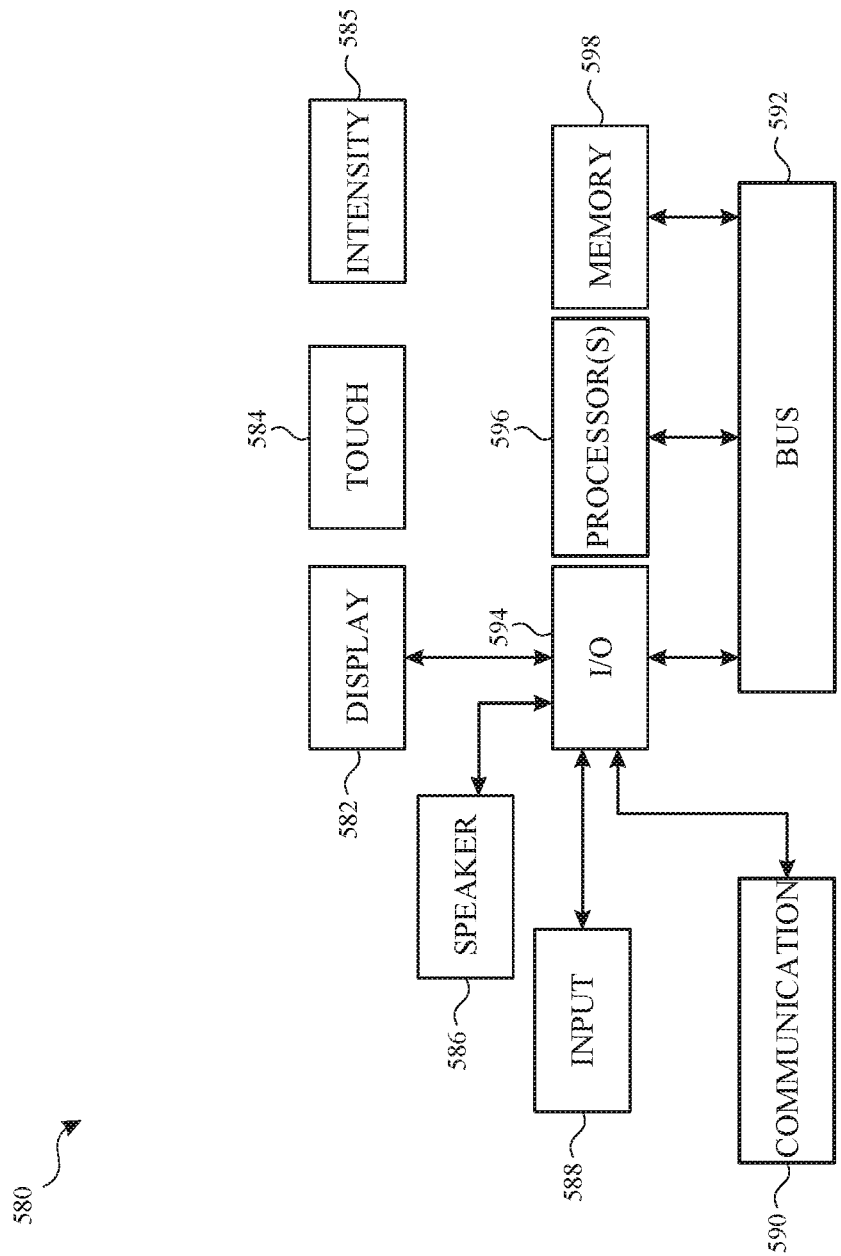
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700, 900, 1100, 1300, 1500, (FIGS. 7A-7C, 9, 11, 13, 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;
 a background application (or background processes), which is not currently displayed, but one or more processes for the application are being processed by one or more processors; and
 a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6L illustrate exemplary techniques for processing user requests, in accordance with some embodiments. The techniques described in these figures are used to illustrate the processes described below, including the processes in FIGS. 7A-7C.

Generally, FIGS. 6A-6L illustrate a variety of scenarios in which a device, such as a smart speaker, receives user input and performs voice identification based on the user input. If a user is identified based on the user input, the device processes one or more requests of the user input based on account data associated with the identified user. Exemplary techniques for voice identification and for configuring devices to perform voice identification are discussed in:

"Personalized Hey Siri." Apple Machine Learning Journal, vol. 1, no. 9, April 2018; and
 E. Marchi, S. Shum, K. Hwang, S. Kajarekar, S. Sigtia, H. Richards, R. Haynes, Y. Kim, and J. Bridle. "Generalised Discriminative Transform via Curriculum Learning for Speaker Recognition." Proceedings of the IEEE International Conference on Acoustics, Speech, and Signal Processing (ICASSP), April 2018.

The contents of these publications are hereby incorporated by reference in their entireties.

FIGS. 6A-6B illustrates a scenario that includes an electronic device 600 sitting on a table, and a user 602 standing near the device 600. In some examples, the electronic device 600 is a speaker (e.g., smart speaker). As shown, the user 602 provides a voice input 604 (e.g., natural-language speech input) to the electronic device 600 including a request for information (e.g., playback of classical music). In some embodiments, the voice input 604 includes a digital trigger (e.g., "Hey Assistant") that, when received by the electronic device, causes the electronic device 600 to initiate a dialog session with the user 602. In response to the voice input 604, the electronic device 600 indicates that the device is authorized to provide the requested information and/or provides the requested information. As shown in FIG. 6B, for instance, the electronic device 600 provides an output 606 indicating that the device is providing classical music (e.g., "playing classical music now") and provides music output 608.

In some examples, one or more user accounts are associated with the electronic device. For example, a first user account associated with the electronic device can correspond to a first user, and a second user account associated with the electronic device can correspond to a second user. In some examples, any number of user accounts are associated with the electronic device. In other examples, up to a threshold number of user accounts (e.g., five) are associated with the electronic device. In some examples, each user account associated with the electronic device is associated with a voice profile that can, for instance, be used to determine whether a user associated with the user account is speaking to the electronic device. For instance, during operation, the electronic device can receive a voice input (e.g., voice input 604) and determine whether the voice input matches a voice profile for a user account associated with the electronic device. If a match exists, the electronic device determines that a user of the user account associated with the matching voice profile provided the voice input. In some examples, account data associated with a user account is updated to reflect prior use of the electronic device (and/or other devices) by the user of the user account (e.g., listening history). The account data for user accounts can be updated based on information provided in response to requests from the user of the user account, in some examples.

In some examples, a user account is a default account (e.g., owner account). The default account can be enabled or disabled in some examples, for instance, by toggling a setting of the electronic device. By way of example, the electronic device can be associated with (e.g., signed into) the default account such that requests not attributable to identified users are processed according to the default account. (e.g., if a user provides an input that does not match a voice profile, the request is handled according to the default account). As an example, a user can request the electronic device play music, and if the electronic device determine that the input including the request does not match a voice profile for any user accounts, the electronic device processes the request according to the default account. Accordingly, the electronic device can play music according to the account data of the default account (e.g., listening history of the default account). In some examples, account data associated with the default account is updated to reflect prior use of the electronic device (and/or other devices associated with the default user account). The account data for the default account can be updated based on information provided in response to requests provided by any number of users, in some examples.

In the scenario illustrated in FIGS. 6A-6B, the electronic device 600 determines that the voice input 604 does not match a voice profile of any user accounts. Accordingly, the electronic device 600 does not update account data for any of the user accounts. However, because the default account associated with the electronic device is enabled (e.g., the account is set), the electronic device updates account data for the default account. As shown in FIG. 6B, for instance, the electronic device 600 updates the listening history for the default account based on the request. In some examples, updating the account data in this manner can allow the electronic device to provide a more intuitive user experience. By way of example, if a user requests that the electronic device perform music playback without specifying a genre or artist, the electronic device 600 can identify music for playback based on listening history of the default account such that the identified music better corresponds to previously requested music.

Figures 6C, 6D:
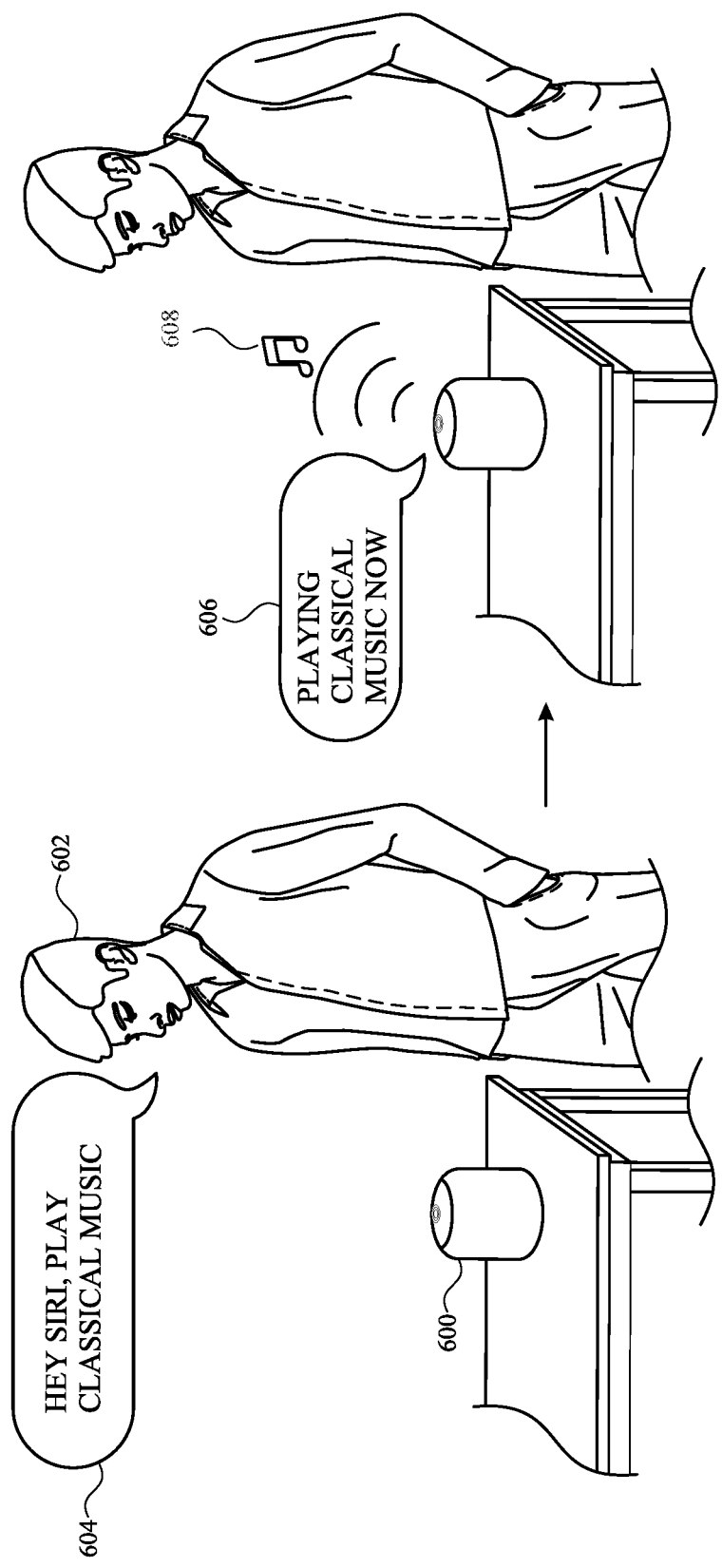

FIGS. 6C-6D illustrate a scenario in which a default account associated with the electronic device is disabled (e.g., the default account is not set) and the voice input 604 does not match a voice profile of any user accounts. As illustrated, in some examples, in response to the voice input 604, the electronic device 600 provides an output (e.g., output 606) that the electronic device is authorized to provide the requested information and provides the requested information (e.g., music output 608), as described. Because the default account associated with the electronic device is disabled, the electronic device does not update account data for the default account. Further, because the voice input 604 does not match a voice profile of any user accounts, the electronic device does not update account data for any user accounts. In other examples, if a default account associated with the electronic device is disabled and the voice input 604 does not match a voice profile of any user accounts, the electronic device 600 does not respond to the request, or indicates to the user that the request cannot be processed. In such examples, the electronic device does not update account data for any user accounts.

FIGS. 6E-6F illustrate a scenario in which a default account associated with the electronic device is enabled and the voice input 604 matches a voice profile associated with a user account of user 602. In response to the voice input 604, the electronic device 600 provides an output (e.g., output 606) that the electronic device is authorized to provide the requested information and provides the requested information (e.g., music output 608), as described. Because the voice input 604 matches the voice profile associated with a user account of user 602, the electronic device updates account data for the user account of user 602. Updating the account data in this manner can include updating listening history for the user account. In some examples, the electronic device 600 updates account data for the default account only when a voice input does not match a voice profile (unless the voice input matches the voice profile of the default account). Accordingly, as shown in FIGS. 6E-6F, because the voice input 604 matches the voice profile associated with the user account of user 602, the electronic device 600 does not update account data for the default account associated with the electronic device in response to the voice input 604.

FIGS. 6G-6H illustrate a scenario in which a user 610, different from user 602, provides a voice input 612 (e.g., natural-language speech input) to the electronic device 600 including a request for information (e.g., playback of jazz music). In some embodiments, the voice input 612 includes a digital trigger (e.g., "Hey Siri") that, when received by the electronic device, causes the electronic device 600 to initiate a dialog session, for instance, with the user 610. In response to the voice input 612, the electronic device 600 indicates that the device is authorized to provide the requested information and/or provides the requested information. As shown in FIG. 6G, for instance, the electronic device 600 provides an output 614 indicating that the device is providing jazz music (e.g., "playing jazz music now") and provides music output 616.

In the scenario illustrated in FIGS. 6G-6H, the default account associated with the electronic device is enabled, and the voice input 612 matches a voice profile associated with a user account of user 610. Because the voice input 612 matches the voice profile associated with a user account of user 610, the electronic device updates account data for the user account of user 610. Updating the account data in this manner can include updating listening history for the user account. As described, in some examples, the electronic device 600 updates account data for the default account only when a voice input does not match a voice profile (unless the voice input matches a voice profile of the default account). Accordingly, the electronic device 600 does not update account data for the default account associated with the electronic device in response to the voice input 612.

In some examples, the electronic device receives one or more requests for private information associated with a user account. In some examples, the electronic device provides the private information for the user account only when a voice input requesting the private information matches a voice profile associated with the user account. For example, in the scenario illustrated in FIGS. 6I-6J, the voice input 618 provided by user 630 does not match a voice profile associated with any user accounts. As shown in FIG. 6J, because the voice input 618 includes a request for private information (e.g., read my messages) and the voice input 618 does not match a voice profile, the electronic device 600 provides an output indicating that the device is not authorized to provide the requested information and does not provide the requested information. As shown in FIG. 6J, for example, in response to the voice input 618, the electronic device provides an output 620 indicating that the electronic device is not authorized to output messages to the user 602.

As another example, in the scenario illustrated in FIGS. 6K-6L, the voice input 604 provided by user 602 matches a voice profile associated with the user account of user 602. As shown in FIG. 6L, because the voice input 622 matches the voice profile of a user account for user 602, the electronic device 600 provides an output indicating that the device is authorized to provide the requested information and provides the requested information. As shown in FIG. 6L, for example, the electronic device 600 provides an output 624 indicating that the electronic device is authorized to provide messages associated with the user account of user 602 and provides the messages.

FIGS. 7A-7C illustrate a method for processing user requests using an electronic device (e.g., a smart speaker, a home media hub) in accordance with some embodiments. Method 700 is performed at a device (e.g., 100, 300, 500, 580, 600) with a media output device. Some operations in method 700 are, optionally, combined, the orders of some operations are, optionally, changed, and some operations are, optionally, omitted.

As described below, method 700 provides an intuitive way for processing user requests using an electronic device. The method reduces the cognitive burden on a user for providing requests to perform tasks on electronic devices, thereby creating a more efficient human-machine interface. For example, processing requests of voice inputs based on whether the voice inputs match voice profiles allows the electronic device to intuitively and efficiently perform tasks in response to the requests. For example, matching a voice input to a voice profile for a user allows the device to identify a user and thereafter perform a task based on account data associated with the user, thereby ensuring that the task is performed according to the user's preferences and prior usage of devices associated with the user. Thus, processing tasks in this manner provides for more efficient use of the electronic device by decreasing the number of inputs and amount of time needed for the user to operate the electronic device (e.g., by reducing user mistakes when operating/interacting with the device and ensuring that the device provides salient results), which, additionally, reduces power usage and improves battery life of the device.

In some embodiments, an electronic device (e.g., 600) (e.g., one or more speakers, one or more displays, one or more components connecting the device to one or more external output devices (e.g., external speakers and or displays)) receives (702) (e.g., via one or more microphone devices of the electronic device, via communication from another device (e.g., voice detected by another device, which forwards the request to the electronic device)) a request (e.g., for information) determined based on a voice input (e.g., 604).

In some embodiments, in response (704) to receiving the request, in accordance with a determination (706) that the voice input does not match a voice profile associated (e.g., via voice recognition analysis) with an (e.g., any) account (e.g., a user account that is used across multiple devices) that is associated (e.g., registered with, authorized to work with) with the electronic device, the electronic device (e.g., 600) causes (708) output, by the media output device, of first information (e.g., 608) (e.g., play music) based on the request using a first account (e.g., smart speaker owner's account, even if no default account is set) associated with the electronic device.

In some embodiments, in response to receiving the request, in accordance with a determination (706) that the voice input does not match a voice profile associated (e.g., via voice recognition analysis) with an (e.g., any) account (e.g., a user account that is used across multiple devices) that is associated (e.g., registered with, authorized to work with) with the electronic device, in accordance with a setting of the electronic device being set to a first state (e.g., first account is set as a default account), the electronic device causes (710) update of account data of the first account based on the request (e.g., update listening history, listening preferences).

In some embodiments, in response to receiving the request, in accordance with a determination (706) that the voice input does not match a voice profile associated (e.g., via voice recognition analysis) with an (e.g., any) account (e.g., a user account that is used across multiple devices) that is associated (e.g., registered with, authorized to work with) with the electronic device, in accordance with the setting of the electronic device being set to a second state (e.g., first account is not set as a default account, or no default account is set), the electronic device forgoes (712) causing update of the account data of the first account based on the request.

In some embodiments, in response (704) to receiving the request, in accordance with a determination (714) that the voice input matches a voice profile associated with an account that is associated with the electronic device, the electronic device causes (716) output, by the media output device, of the first information based on the request using the account associated with the matching voice profile.

In some embodiments, in response (704) to receiving the request, in accordance with a determination (714) that the voice input matches a voice profile associated with an account that is associated with the electronic device, the electronic device causes (718) update of account data of the account associated with the matching voice profile based on the request (e.g., update listening history, listening preferences).

In some embodiments, the electronic device receives (720) (e.g., via one or more microphone devices of the electronic device, via communication from another device (e.g., voice detected by another device, which forwards the request to the electronic device)) a second request (e.g., for information) determined based on a second voice input (e.g., 610). In some embodiments, the second voice input matches (722) a voice profile associated with a second account that is associated with the electronic device. In some embodiments, the first account is different from the second account (724). In some embodiments, in response (726) to receiving the second request, and in accordance with a determination that the second voice input matches the second voice profile associated (e.g., via voice recognition analysis) with the second account (e.g., a user account that is used across multiple devices), the electronic device causes (728) output, by the media output device, of second information (e.g., 616) (e.g., play music) based on the second request using the second account associated with the electronic device. In some embodiments, in response (726) to receiving the second request, and in accordance with a determination that the second voice input matches the second voice profile associated (e.g., via voice recognition analysis) with the second account (e.g., a user account that is used across multiple devices), the electronic device causes (730) update of account data of the second account based on the second request (e.g., update listening history, listening preferences).

In some embodiments, causing output of information using a respective account (e.g., first account, second account) includes accessing media using credentials (e.g., username, password, token, or the like) associated with the respective account.

In some embodiments, causing update of account data of a respective account includes causing update of a media profile (e.g., a media history, preferred (e.g., favorited) media, non-preferred media (e.g., disliked), frequently played media) associated with the respective account. Updating a media profile in this manner ensures that user preferences and prior usage of devices associated with the user is current for one or more media applications employed by the user. Thus, processing requests with the electronic device provides for more efficient use of the electronic device by decreasing the number of inputs and amount of time needed for the user to operate the electronic device (e.g., by reducing user mistakes when operating/interacting with the device and ensuring that the device provides salient results), which, additionally, reduces power usage and improves battery life of the device.

In some embodiments, the electronic device receives (732) (e.g., via one or more microphone devices of the electronic device, via communication from another device (e.g., voice detected by another device, which forwards the request to the electronic device)) a third request (e.g., for information) determined based on a third voice input (e.g., 618, 622). In some embodiments, the third request is a request (734) to output private information (e.g., text messages, calendar entries, email) associated with a third account (e.g., the first account, the second account, or another account associated with the electronic device). In some embodiments, in response (736) to receiving the third request, in accordance with a determination (738) that the third voice input (e.g., 622) matches a third voice profile associated (e.g., via voice recognition analysis) with the third account (e.g., a user account that is used across multiple devices), the electronic device causes (740) output (e.g., 624), by the media output device, of the private information (e.g., dictate text messages, dictate calendar entries, dictate email) based on the third request using the third account. In some embodiments, in response (736) to receiving the third request, in accordance with a determination (742) that the third voice input (e.g., 618) does not match the third voice profile associated (e.g., via voice recognition analysis) with the third account (e.g., a user account that is used across multiple devices), the electronic device forgoes (744) causing output, by the media output device, of the private information (e.g., forgo dictating text messages, forgo dictating calendar entries, forgo dictating email) based on the third request using the third account associated with the electronic device. For example, in contrast to a request for non-private information, a request for private information by a voice input request that does not match a voice profile associated with the corresponding account causes the request to fail to cause output of the private information. For example, a request by a person that is not the owner of the account will not cause the device to output private information associated with the account. Selectively causing output of private information in this manner allows the user device to provide information only when requested by a user authorized to receive the requested information. Thus, processing requests with the electronic device provides for a more secure use of the electronic device, while decreasing the number of inputs and amount of time needed for the user to operate the electronic device (e.g., by reducing user mistakes when operating/interacting with the device), which, additionally, reduces power usage and improves battery life of the device.

Note that details of the processes described above with respect to method 700 (e.g., FIGS. 7A-7C) are also applicable in an analogous manner to the methods described below. For example, method 900 optionally includes one or more of the characteristics of the various methods described below with reference to method 900. For example, when a personal requests feature, as described in method 900, is enabled, an electronic device can selectively perform user-specific requests as described in method 700. For brevity, these details are not repeated below.

FIGS. 8A-8AB illustrate exemplary user interfaces for configuring user accounts, in accordance with some embodiments. The user interfaces in these figures are used to illustrate the processes described below, including the processes in FIG. 9.

Generally, user interfaces described with reference to FIGS. 8A-8M can be employed to perform a configuration process through which a user can configure one or more features provided by one or more devices. Devices providing configurable features include but are not limited to the electronic device 800, a second device, such as a smart speaker, and/or a third device, such as a home media hub.

During a configuration process, a voice identification feature can be enabled on a user account, for instance, to configure an external device (e.g., smart speaker, home media hub) to identify a voice of the user. A user can be identified using a voice profile of the user account, as described with reference to FIGS. 6A-6L. Additionally, during the configuration process, a personal requests feature can be enabled for the user account such that the external device performs user-specific tasks in response to requests provided by the users. Accordingly, in combination with the voice identification feature, the personal requests feature can be enabled to cause the external device to both identify the user in response to a speech input (e.g., by matching a voice profile for a user account of the user) and perform one or more tasks specific to the user (e.g., playback of user's music).

As another example, during the configuration process, a profile feature can be enabled on a user account to configure an external device (e.g., a home media hub) to share content of the user account with users of one or more other user accounts. In some examples, a same external device is configured to support each of the voice identification feature, personal requests feature, and profile feature. In some examples, multiple external devices are configured to support one or more of the features, respectively. By way of example, a first external device can be configured to support the voice identification feature and personal requests feature and a second external device can be configured to support the profile feature.

As described in further detail below, in some examples, the configuration process is performed using a home control application. The home control application can be an application that is used to manage (e.g., configure) a set of devices (e.g., external devices) associated with a particular location (e.g., "123 Main St."). Examples of locations include, but are not limited to, an address, place, building, business, environment (e.g., backyard, automobile, porch), and so forth. In some examples, the location includes a plurality of designated areas within or associated with the location, such as rooms within a location. An example of a home control application is "Home" (by Apple Inc., of Cupertino, Calif., USA).

In some examples, one or more user accounts are associated with a location of the home control application. In some examples, a user account is associated with a location when included in a location profile of the home control application for the location. In some examples, a location profile is information describing various aspects of the location, including devices associated with the location, user accounts associated with the devices, and/or permissions (e.g., privileges) of the user accounts for controlling and/or configuring the devices associated with the location.

In some examples, user accounts can be assigned permissions using the home control application. By way of example, using a home control application, a first user account can be an administrator account assigned administrator permissions. A user with an administrator account has permissions to configure devices associated with the location and/or configure one or more settings for each user account of the location profile, in some examples. A second user account can be a non-administrator account assigned no administrator permissions. A user with a non-administrator account has permissions to configure one or more settings of the second user account in some examples.

Description is made herein with respect to a user configuring features of a user account using a configuration process to enable features on one or more devices supporting the features. In some examples, each of a plurality of users (e.g., users having user accounts belonging to a same location profile) can configure features of a respective user account to enable a respective set of features on the one or more devices. Accordingly, the one or more devices can support features for any number of users. By way of example, a device can support a voice identification feature and a personal requests for a first user and support only a voice identification feature for a second user. As another example, a device can support a profile feature for a first user, but not a second user.

In some examples, features are configured at an account level. By way of example, a voice identification feature, when enabled, can enable the voice identification feature for all devices associated with the user account. In some examples, features are configured at a device level. As an example, a personal request feature can be individually enabled (or disabled) for each device associated with a user account.

FIG. 8A illustrates an indication interface 803 displayed on display device 802 of electronic device 800. The indication interface 803 includes a continue affordance 805 and indicators 804A-804E. Each of the indicators 804A-804E can indicate one or more new and/or updated features of a home control application (e.g., a first party home control application).

While displaying the indication interface 803, the electronic device 800 detects selection of the continue affordance 805. As shown in FIG. 8A, selection of the continue affordance 805 is, optionally, a tap gesture 806. In some examples, selection of the continue affordance 805 initiates a configuration process (e.g., of the home control application) for a user account of the user of the electronic device. By way of example, the configuration process can be used to configure (e.g., enable) a voice identification feature for the user account. As another example, the configuration process can be used to configure (e.g., enable) a personal request feature of the user account. In some examples, the personal request feature is enabled for the user account only if the voice identification feature is enabled for the user account. As another example, the configuration process can be used to configure (e.g., enable) a profile feature for a user account.

In response to selection of the continue affordance 805, the electronic device 800 determines whether an external device (e.g., smart speaker) associated with the electronic device 800 is available to support the voice identification feature. In some examples, a device is associated with the electronic device if each of the electronic device 800 and the external device are associated with a same user account. The electronic device 800 can, for instance, determine whether the external device has already been configured to identify a threshold number of voices and/or whether a current language of the external device supports the voice identification feature hub.

Figure 8B:
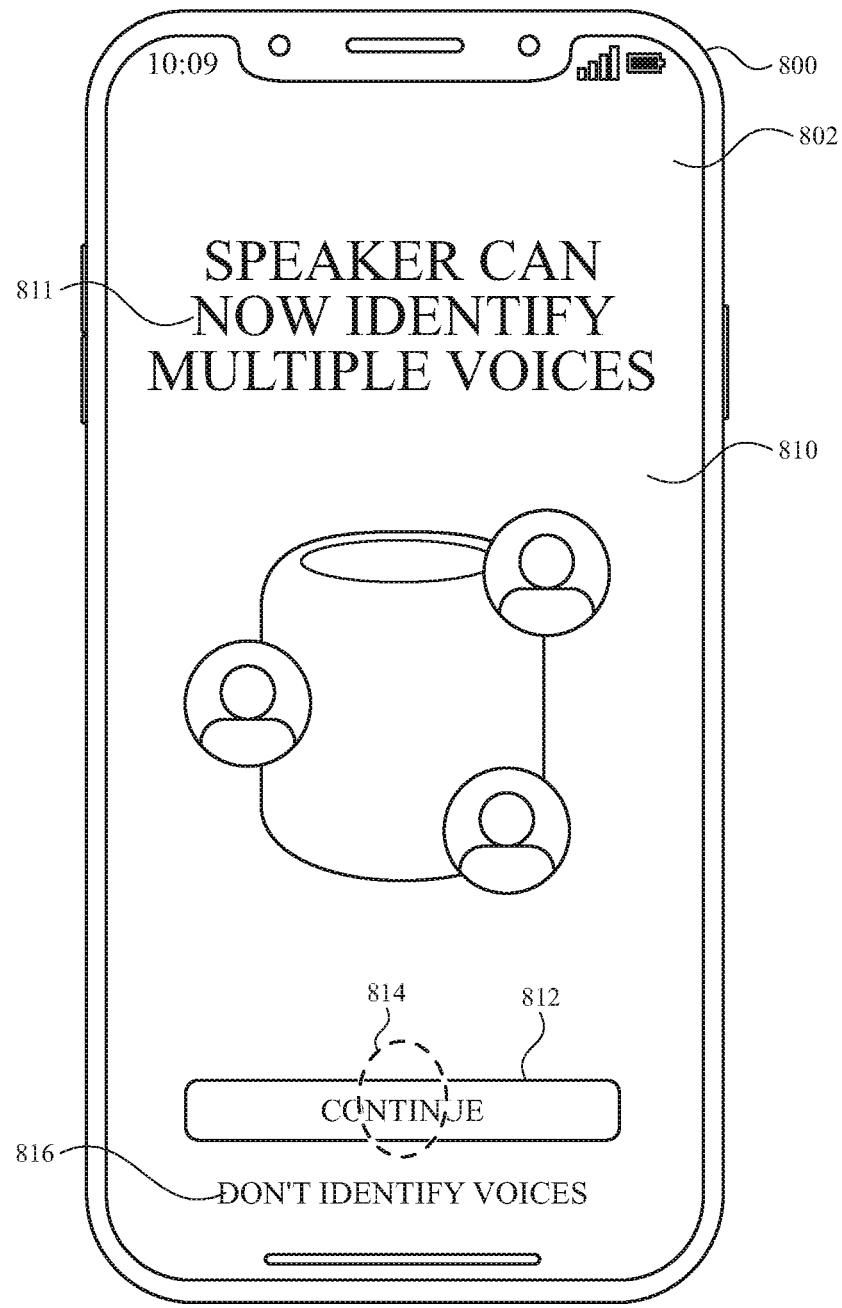

If the electronic device determines that an external device is available to support the voice identification feature, the electronic device displays (e.g., replaces display of the update indication interface 803 with), on the display 802, configuration interface 810, as shown in FIG. 8B. The configuration interface 810 includes indicator 811, continue affordance 812, and cancel affordance 816. The indicator 811 can, optionally, indicate that a voice identification feature can be configured for the user account, for instance, to cause the external device to identify a voice of the user (e.g., using a voice profile of the user account of the user). Selection of the cancel affordance 816 causes the electronic device to not enable (e.g., disable) a voice identification feature for the user account and/or cease to display of the configuration interface 810.

Figure 8C:
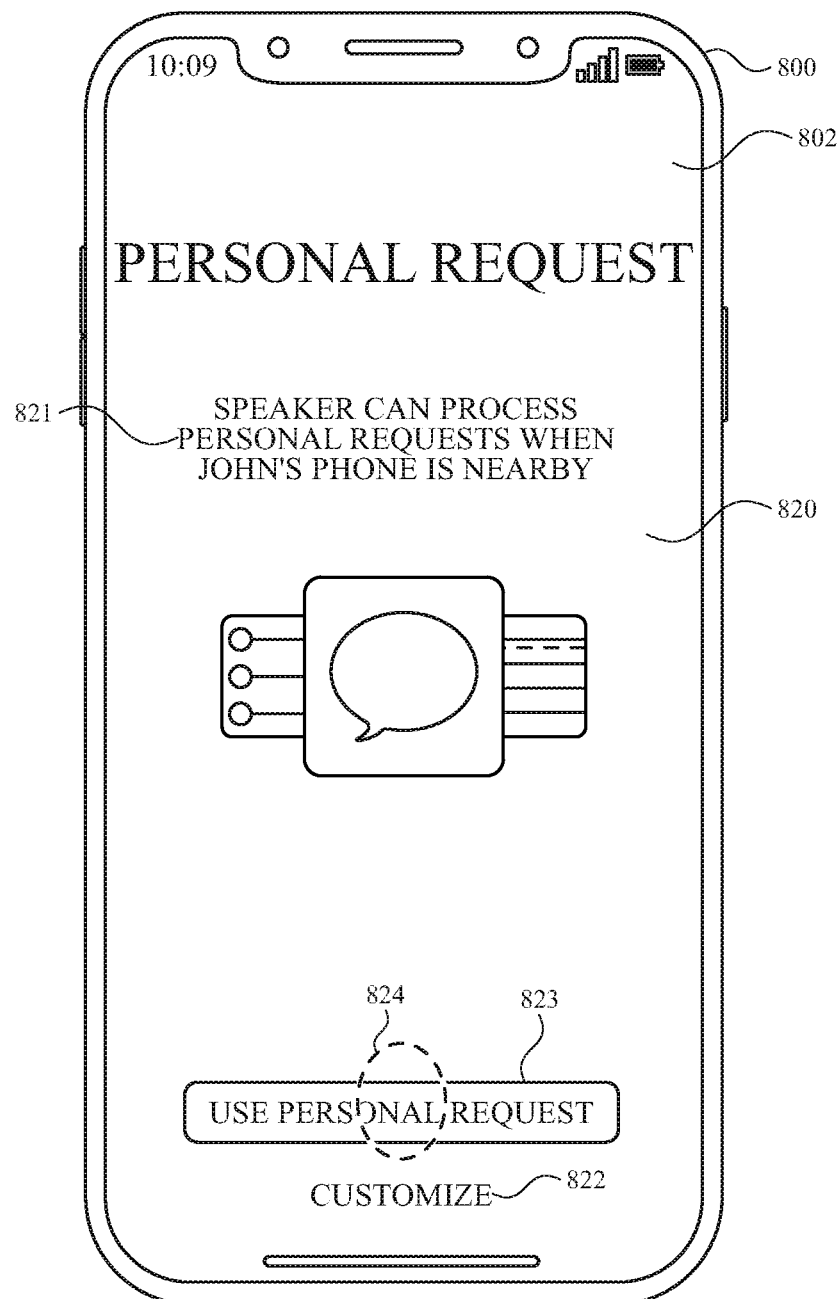

While displaying the configuration interface 810, the electronic device 800 detects selection of the continue affordance 812. As shown in FIG. 8B, selection of the continue affordance 812 is, optionally, a tap gesture 814. In response to selection of the continue affordance 812, the electronic device 800 configures (e.g., enables) a voice identification feature for the user account (recall that the voice identification feature is enabled or disabled for all devices associated with the user account in some examples). Accordingly, the external device can thereafter identify the user in response to speech inputs provided by the user. Further in response to selection of the continue affordance 812, the electronic device displays (e.g., replaces display of the configuration interface 810 with), on the display 802, configuration interface 820, as shown in FIG. 8C.

Configuration interface 820 includes indicator 821, customize affordance 822, and feature enable affordance 823. The indicator 821 indicates that a personal requests feature can be configured for the user account of the user on the external device. In some examples, when a personal requests feature is enabled on the external device, the external device is configured to respond to user-specific requests provided by a user when a device (e.g., external device 800) of the user is near the external and/or when a voice input of the user matches a voice profile of the user. As will be described in more detail below with respect to FIG. 8K, the customize affordance 822, when selected, causes the electronic device to display one or more editable options for configuring the personal requests feature of the user account.

While displaying the configuration interface 820, the electronic device 800 detects selection of the feature enable affordance 823. As shown in FIG. 8C, selection of the feature enable affordance 823 is, optionally, a tap gesture 824. In response to selection of feature enable affordance 823, the electronic device configures (e.g., enables) a personal requests feature on the user account for the external device.

Figure 8D:
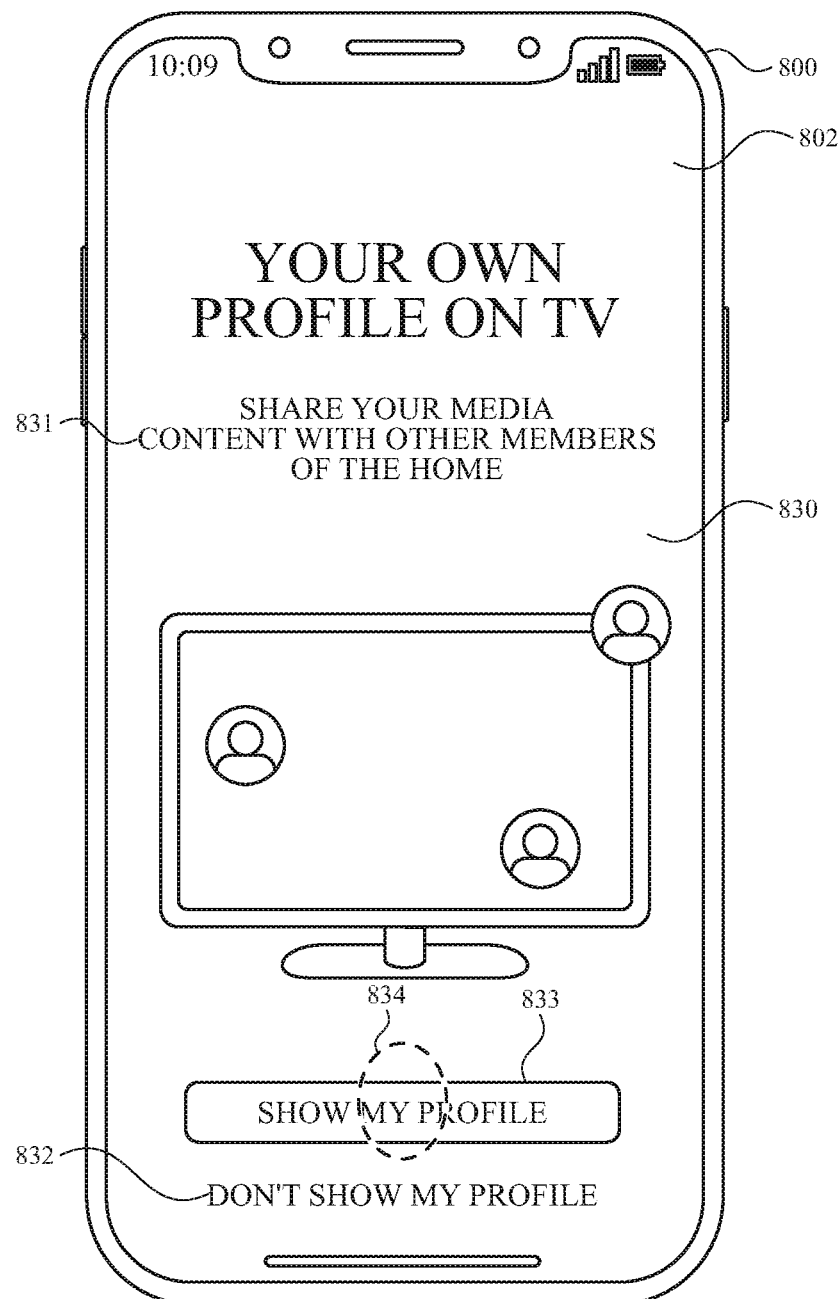

Further in response to selection of the continue affordance 823, the electronic device 800 determines whether an external device (e.g., home media hub) associated with the electronic device 800 is available to support the profile feature. If so, the electronic device 800 displays (e.g., replaces display of the update indication interface 810 with), on the display 802, configuration interface 830, as shown in FIG. 8D. The configuration interface 830 includes indicator 831, disable affordance 832, and feature enable affordance 833. The indicator 831 indicates that the profile feature can be enabled for the user account on the external device supporting the profile feature. In some examples, enabling the profile feature in this manner allows media content associated with the user account to be accessed using the home media hub, for instance, by one or more other users. Selection of feature enable affordance 833 causes the electronic device to enable a profile feature for the user account, and selection of disable affordance 832 causes the electronic device to not enable (e.g., disable) the profile for the user account. In response to selection of either the feature enable affordance 833 or the disable affordance 832, the electronic device completes the configuration process. In some examples, after (e.g., in response to) completing the configuration process, the electronic device displays a notification indicating that the configuration process is complete, such as the notification 851B of lock screen interface 850B (FIG. 8AA). In some examples, the notification is displayed only if one or more particular features are enabled during the configuration process (e.g., voice identification feature and/or personal requests feature).

As described, in some examples, prior to displaying the configuration interface 810, the electronic device 800 determines whether an external device (e.g., smart speaker, home media hub) associated with the electronic device 800 is available to support the voice identification feature. If no external device is available, the electronic device 800 forgoes display of the configuration interface 810 and configuration interface 820. As described, in some examples, prior to displaying the configuration interface 830, the electronic device 800 determines whether an external device (e.g., home media hub) associated with the electronic device 800 is available to support the profile feature. If no external device is available to support the profile feature, the electronic device forgoes display of the configuration interface 830.

Figure 8E:
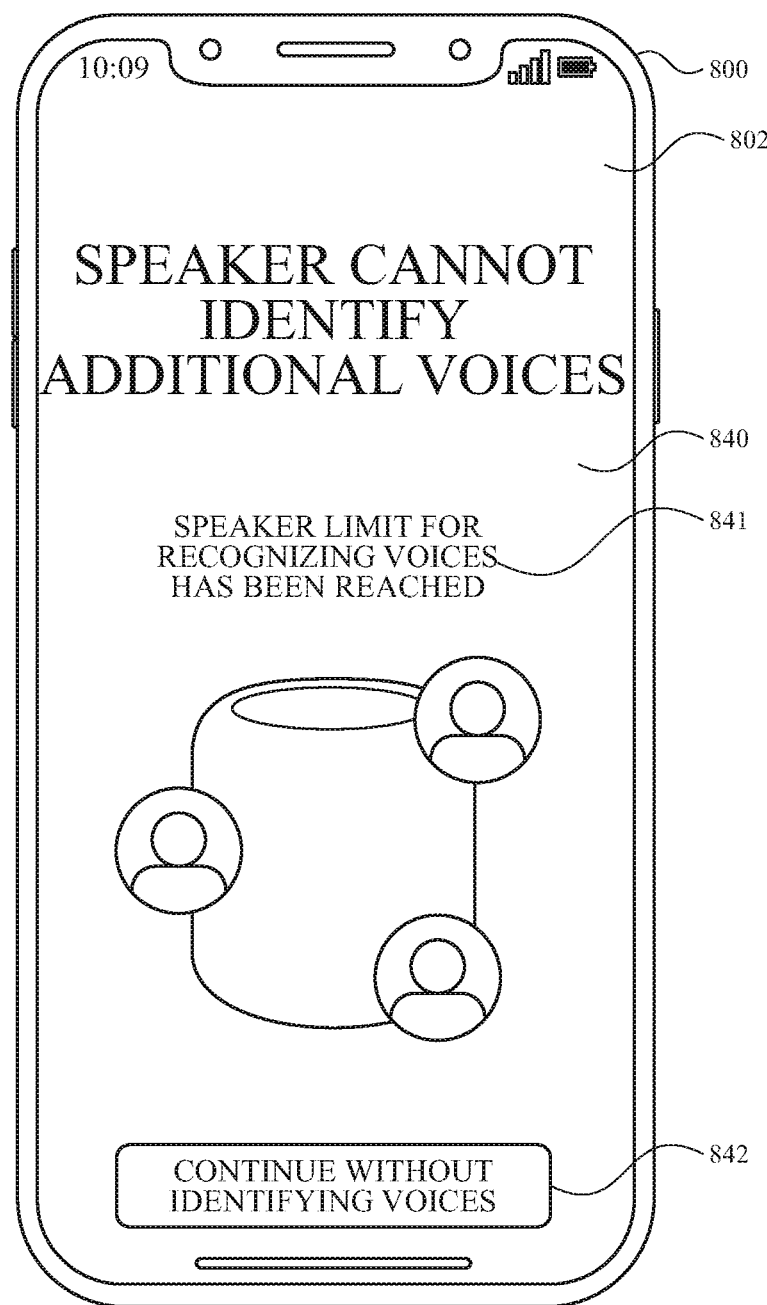

In some examples, if, prior to enabling a voice identification feature, the electronic device determines that the external device already supports a voice identification feature for a threshold (e.g., non-zero threshold) number of users, the electronic device 800 displays (e.g., replaces display of the update indication interface 803 with), on the display 802, configuration interface 840, as shown in FIG. 8E. The configuration interface 840 includes an indicator 841 and a continue affordance 842. The indicator 841 indicates that the external device has reached the threshold number of users for the voice recognition feature and that the external device cannot identify additional voices. The continue affordance 842, when selected, causes the electronic device to not enable (e.g., disable) a voice identification feature for the user account.

Figure 8F:
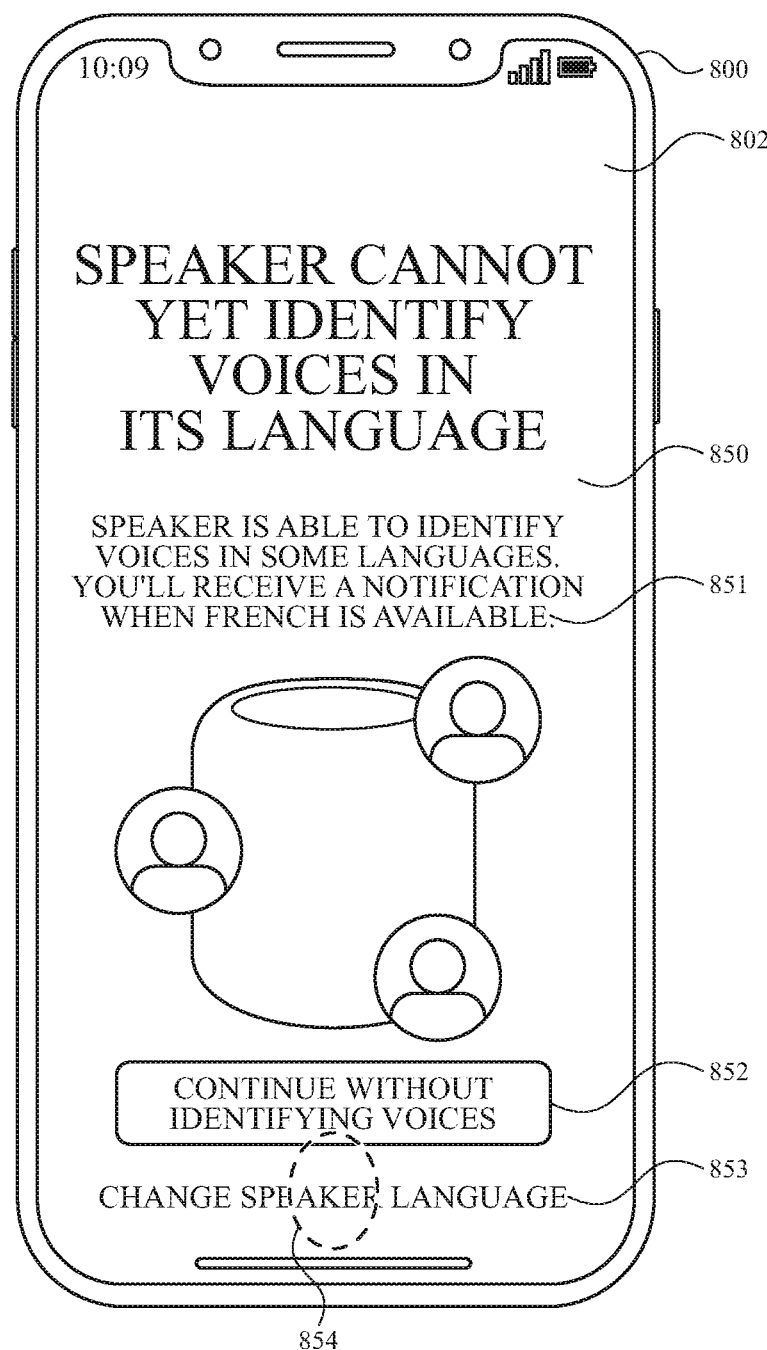

In some examples, if, prior to enabling a voice identification feature, the electronic device 800 determines that a current language of the external device does not support a voice identification feature, the electronic device 800 displays (e.g., replaces display of the update indication interface 803 with), on the display 802, configuration interface 850, as shown in FIG. 8F. The configuration interface 830 includes indicator 851, continue affordance 852, and language affordance 853. The indicator 851 indicates that the external device cannot support the voice identification feature using the current language of the external device, and, optionally, that the electronic device 800 will notify the user if the current language becomes supported. When a language becomes support, the electronic device 800 can, for instance, provide a notification to an electronic device of the user, such as the notification 861B of lock screen interface 860B (FIG. 8AB). The continue affordance 852, when selected, causes the electronic device 800 to not enable (e.g., disable) a voice identification feature for the user account.

Figure 8G:
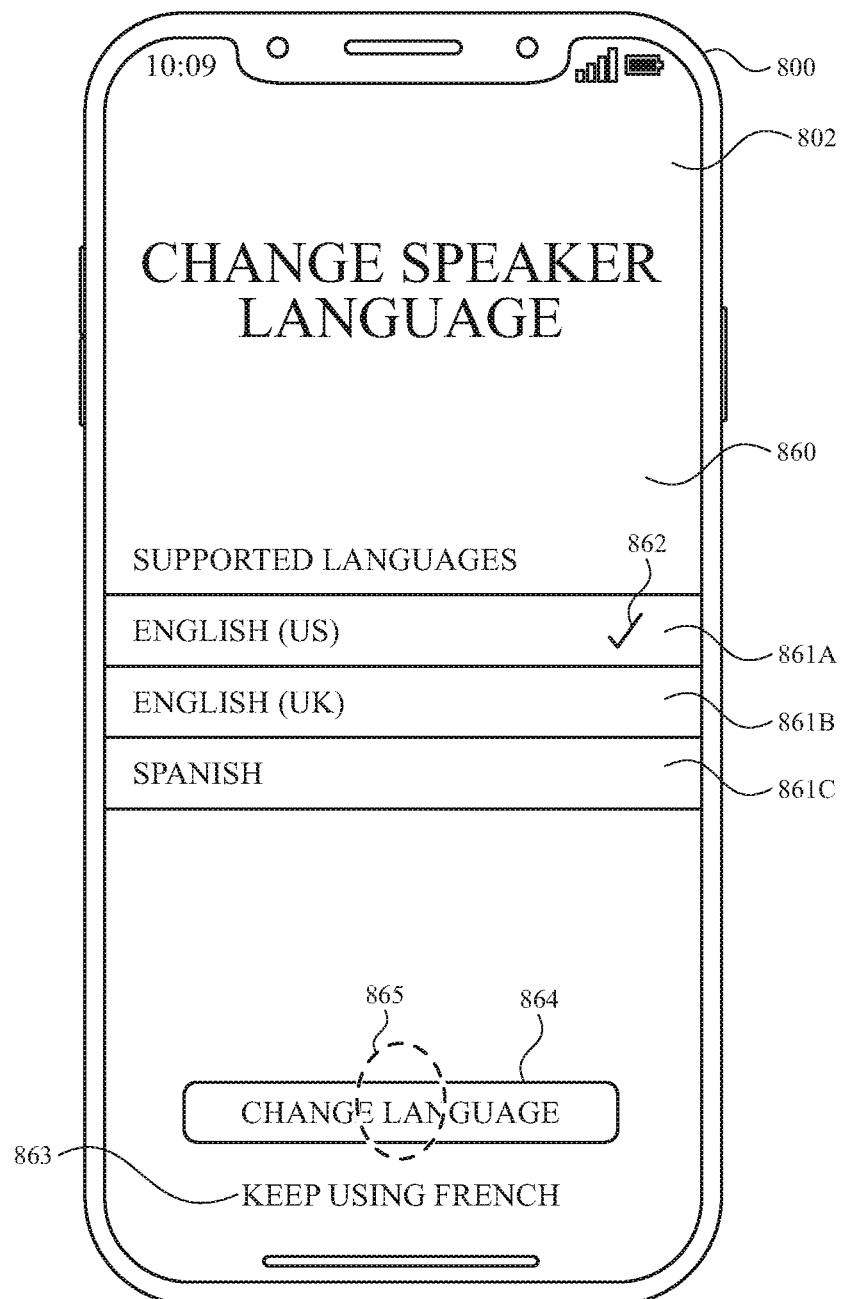

In some examples, the user can change the language of the external device to a language supported by the voice identification feature. By way of example, while displaying the configuration interface 850, the electronic device 800 detects selection of the language affordance 853. As shown in FIG. 8F, selection of the language affordance 853 is, optionally, a tap gesture 854. In response to selection of the language affordance 853, the electronic device 800 displays (e.g., replaces display of the update indication interface 850 with), on the display 802, language interface 860, as shown in FIG. 8G.

Language interface 860 includes language elements 861A-861C, retain affordance 863, and change affordance 864. Retain affordance 863, when selected, causes the electronic device to maintain the current language of the external device and not enable (e.g., disable) a voice identification feature for the user account.

In some examples, each of the language elements 861A-861C corresponds to a respective language. By way of example, language element 861A corresponds to English (US), language element 861B corresponds to English (UK), and language element 861C corresponds to Spanish. In some examples, a user can select a language element to choose a new language for the external device. As illustrated in FIG. 8G, for instance, a user can select language element 861A (e.g., by providing a user input at a location on the display 802 corresponding to language element 861A) to identify English (US) as the language of the external device. The selected language can be identified by selection indicator 862. After a new language has been selected for the external device, the electronic device 800 detects selection of change affordance 864 (e.g., input 865) confirming selection of the new language.

Figure 8H:
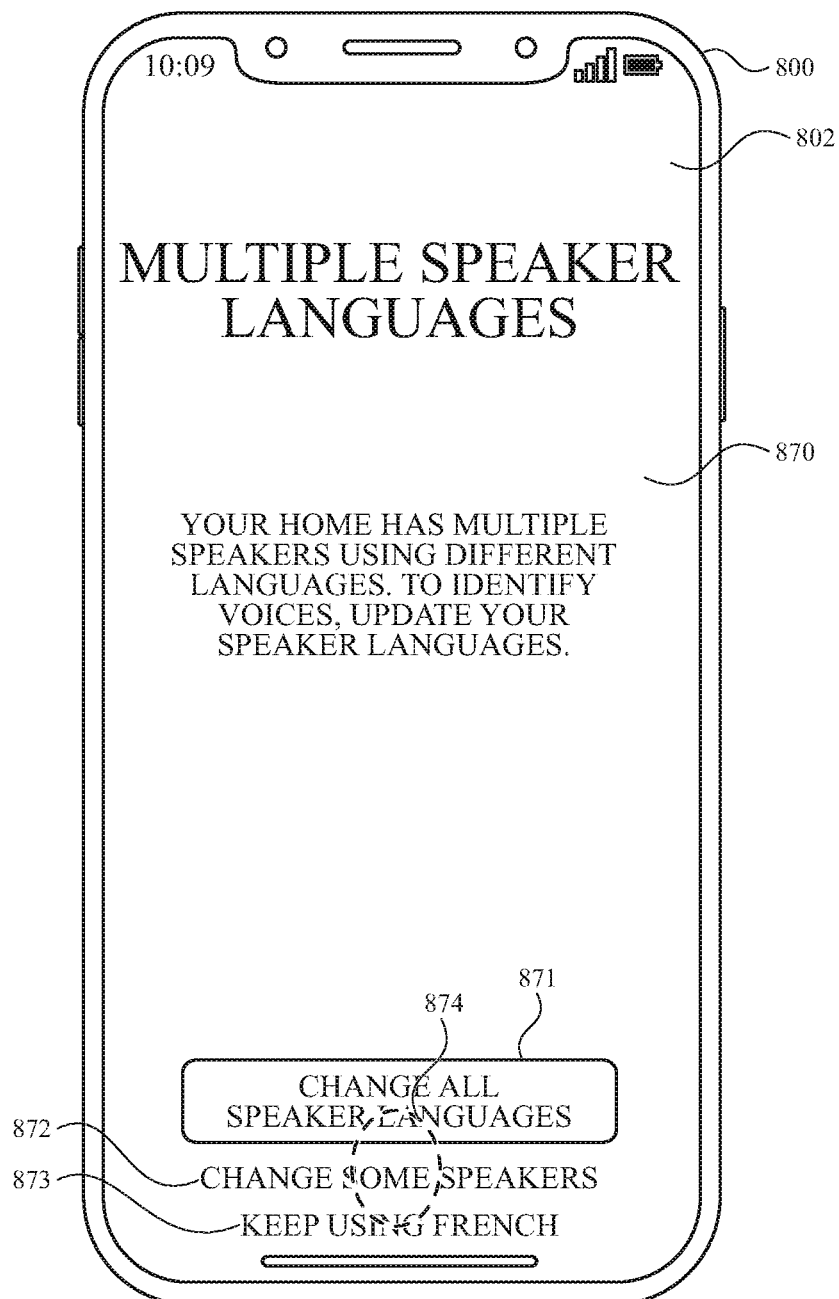

In some examples, the electronic device 800 determines multiple external devices associated with the electronic device 800 are available to support the voice identification feature. In some examples, if the electronic device 800 determines that multiple external devices are available and that at least two of the external devices have different current languages, the electronic device 800 displays (e.g., replaces display of the configuration interface 810 with), on the display 802, configuration interface 870, as shown in FIG. 8H.

Configuration interface 870 includes change affordance 871, change affordance 872, and retain affordance 873. Retain affordance 873, when selected, causes the electronic device to maintain the current language of the external devices and not enable (e.g., disable) a voice identification feature for the user account.

Figure 8I:
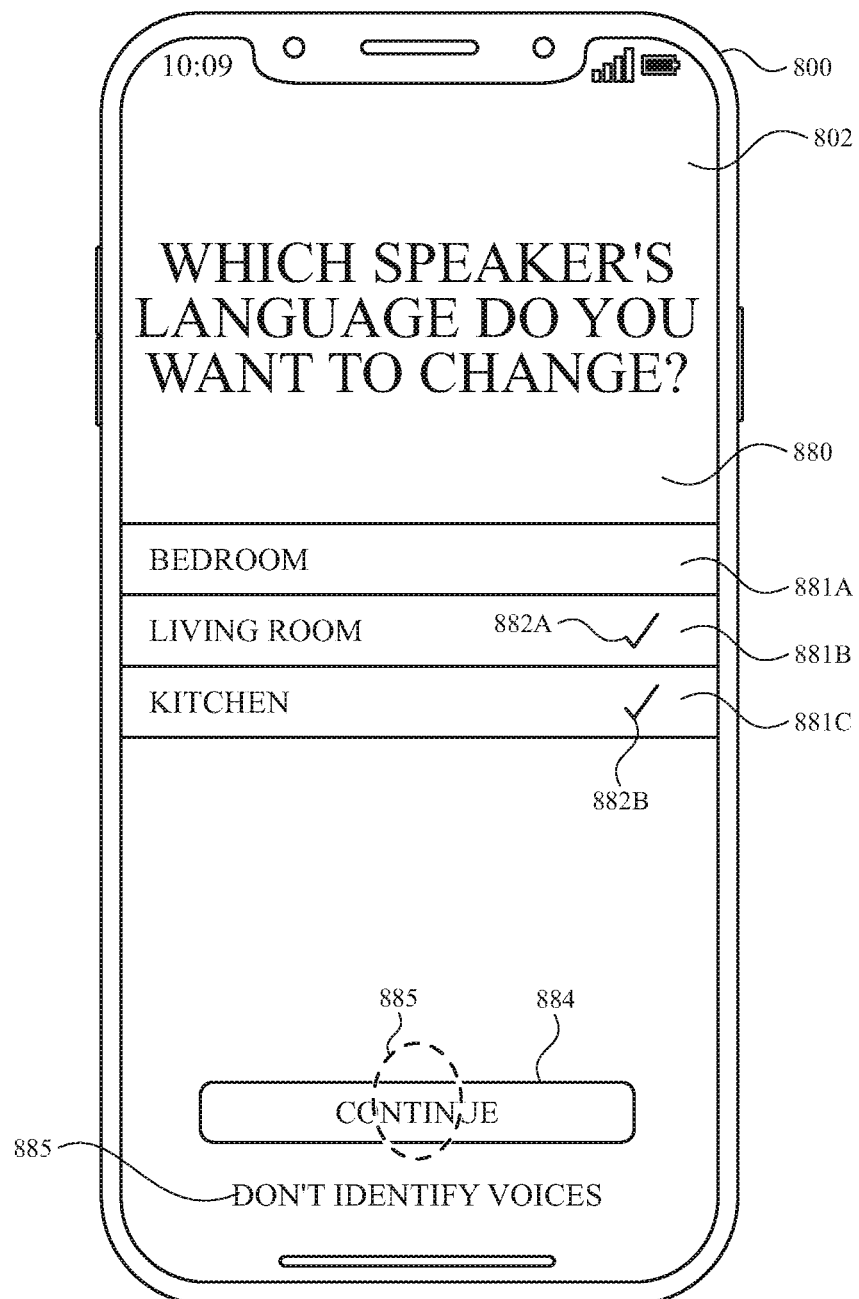

Change affordance 872, when selected, causes the electronic device 800 to display an interface in which the user can select a subset of the available external devices and change the language for the external devices of the selected subset. For example, while displaying the configuration interface 870, the electronic device 800 detects selection of the change affordance 872. As shown in FIG. 8H, selection of the continue affordance 872 is, optionally, a tap gesture 874. In response to selection of the change affordance 872, the electronic device 800 displays (e.g., replaces display of the update indication interface 870 with), on the display 802, configuration interface 880, as shown in FIG. 8I.

Configuration interface 880 includes device elements 881A-881C, each of which can correspond to a respective external device available to support the voice identification feature. By way of example, the device element 881A can be associated with an external device "Bedroom", device element 881B can be associated with an external device "Living Room" and device element 881C can be associated with an external device "Kitchen". While displaying the configuration interface 880, the electronic device receives one or more inputs selecting the subset of external devices. In some examples, selected external devices are indicated by a selection indicator (e.g., selection indicators 882A, 882B).

Configuration interface 880 further includes a cancel affordance 883 and a continue affordance 884. Selection of the cancel affordance 883 causes the electronic device to not enable (e.g., disable) a voice identification feature for the user account and/or cease display of the configuration interface 880.

While displaying the configuration interface 880, the electronic device 800 detects selection of the continue affordance 884. As shown in FIG. 8I, selection of the continue affordance 884 is, optionally, a tap gesture 885. In response to selection of the continue affordance 884, the electronic device 800 displays (e.g., replaces display of the update indication interface 880 with), on the display 802, one or more configuration interfaces (e.g., configuration interface 860) by which the user can select a language for each of the selected external devices.

Figure 8J:
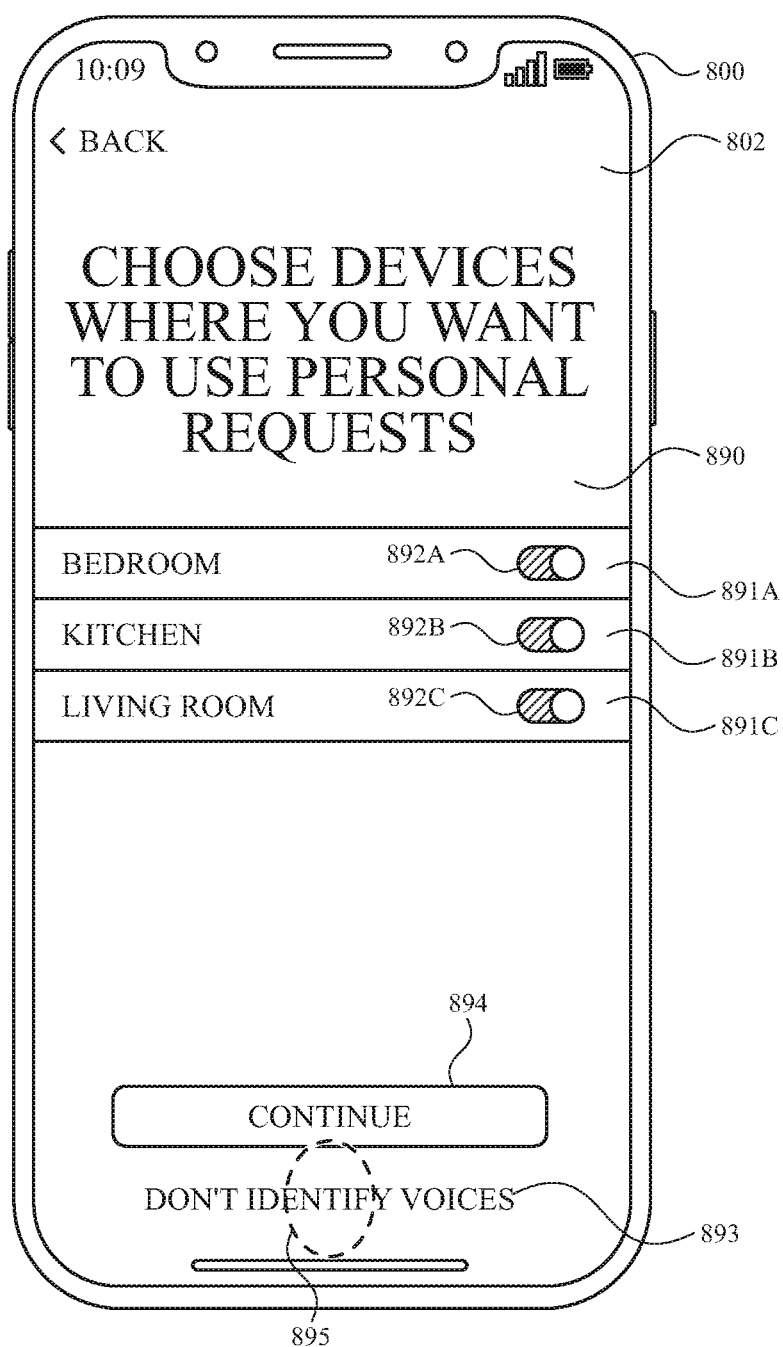

In some examples, a user can selectively enable a personal request feature on each external device for which a voice identification feature is enabled. For instance, while displaying the configuration interface 820 (FIG. 8C), the electronic device 800 detects selection of the customize affordance 822. In some examples, selection of the customize affordance 822 causes the electronic device 800 to display (e.g., replaces display of the configuration interface 820), on the display 802, configuration interface 890, as shown in FIG. 8J.

The configuration interface 800A includes device elements 892A-892C, each of which can correspond to an external device. By way of example, the device element 891A can be associated with an external device "Bedroom", device element 891B can be associated with an external device "Kitchen", and device element 891C can be associated with an external device "Living Room". Each of the device elements 891A-C can include a respective toggle affordance. Device element 891A can include toggle affordance 892A, device element 891B can include toggle affordance 892B, and device element 891C can include toggle affordance 892C, for instance. In some examples, each of the toggle affordances represents a parameter indicating whether a personal requests feature for the user account is to be enabled on a respective external device.

The configuration interface 890 further includes cancel affordance 893, and continue affordance 894. Selection of the cancel affordance 893 causes the electronic device 800 to not enable (e.g., disable) a voice identification feature for the user account (e.g., for any of the listed external devices) and/or cease display of the configuration interface 890. Selection of the continue affordance 894 (e.g., using input 895) causes the electronic device to enable a personal requests feature for the user account on each of the selected external devices.

In some examples, the personal requests feature is enabled only if a voice identification feature has been enabled. Accordingly, if, during a configuration process, a user elects to not enable (e.g., disable) a voice identification feature for the user account, the electronic device 800 can omit display of configuration interface 820 (and/or one or more other interfaces directed to configuring a personal request feature). In some examples, a user can have enabled a personal requests feature prior to initiating the configuration process, or can indicate an intent to not enable voice identification after indicating an intent to enable a personal requests feature (e.g., selection of affordance 894 of FIG. 8J following selection of affordance 823 of FIG. 8B). If so, the electronic device 800 can request a user disable the personal requests feature. In some examples, the electronic device 800 prompts the user to indicate whether the user intends to disable the personal requests feature. By way of example, with reference to FIG. 8K, the electronic device 800 can, optionally, display confirmation interface 800A. Confirmation interface 800A includes query 801A, confirm affordance 802A, and resume affordance 803A. The query 801A is a query requesting that the user confirm the user intends to disable a personal requests feature. Confirm affordance 802A, when selected, causes the electronic device to disable the personal requests feature. Resume affordance 803A, when selected, signals to the electronic device that the user does not intend to disable the personal requests feature, and in turn the electronic device 800 ceases to display confirmation interface 800A (and optionally, displays one or more user interfaces by which the user can enable the voice identification feature, as described).

Figure 8K:
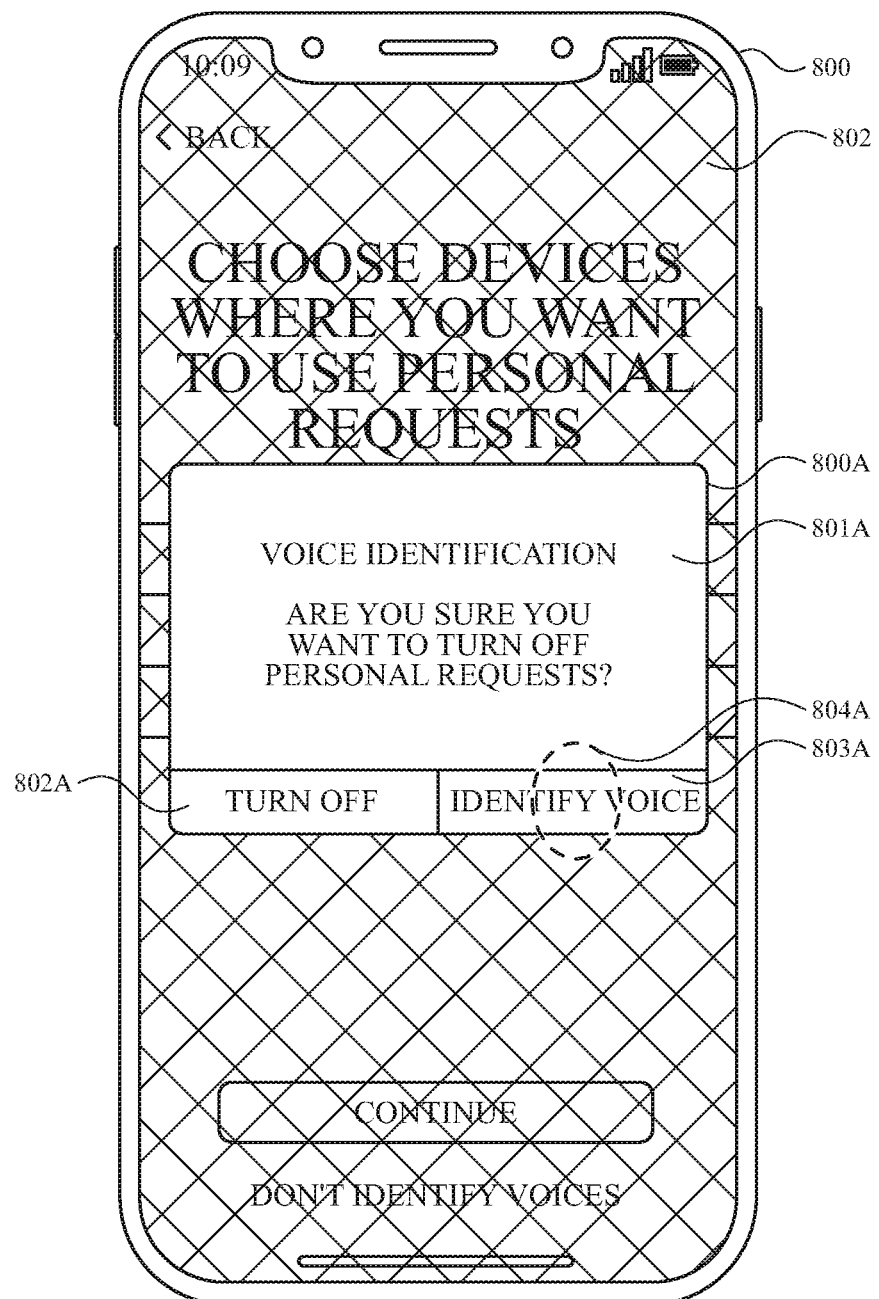

In some examples, confirmation interface 800A is overlaid over one or more displayed user interfaces. As shown in FIG. 8K, for instance, confirmation interface 800A is overlaid on configuration interface 890. It will be appreciated that confirmation interface 800A can be displayed at any point during a configuration process in which a user indicates an intention to proceed without enabling a voice identification feature while a personal requests feature is enabled.

Figure 8L:
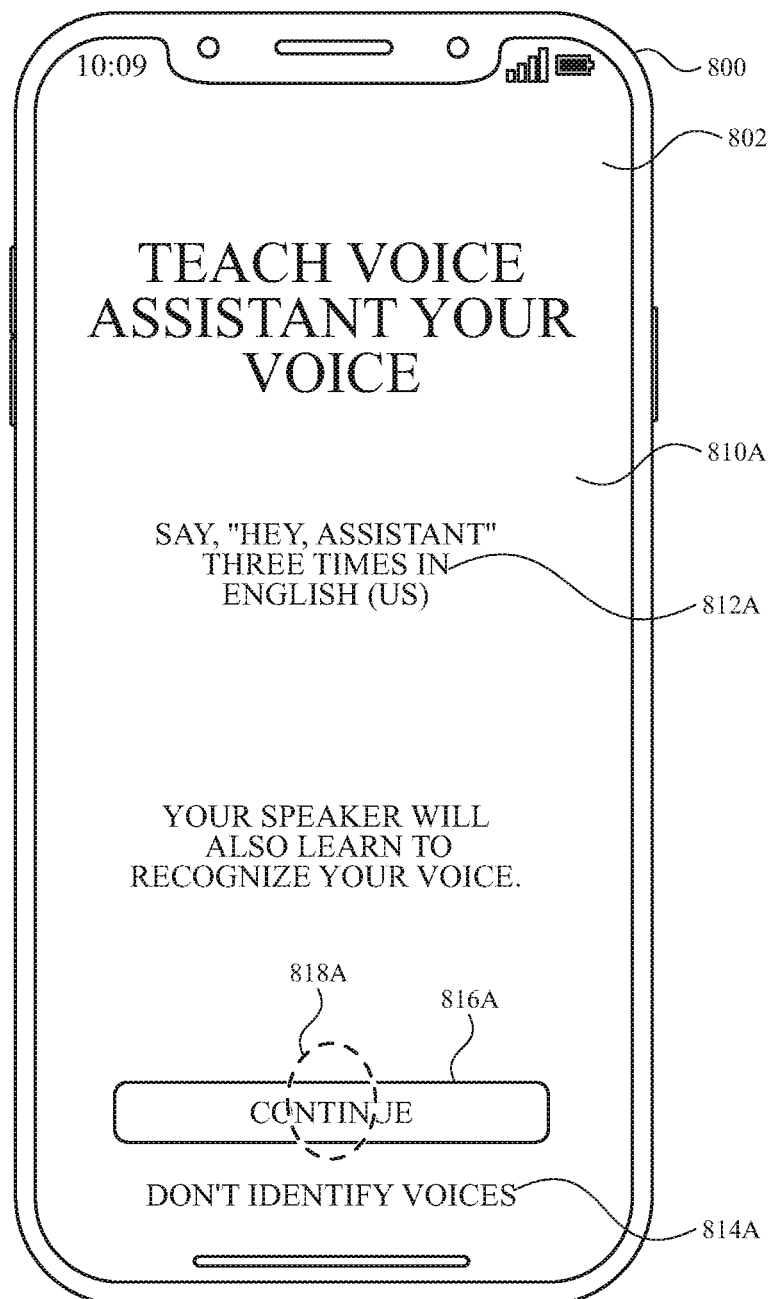

In some examples, enabling the voice identification feature requires that a digital assistant of the electronic device be trained based on a voice of the user. For instance, during the configuration process, the electronic device 800 can determine whether a digital assistant of the electronic device has been trained based on a voice of a user. With reference to FIG. 8L, if the digital assistant of the electronic device 800 has not been trained based on the user's voice, the electronic device displays the configuration interface 810A.

In some examples, configuration interface 810A includes instructions 812A, which indicate one or more actions of a voice training operation for the digital assistant of the electronic device 800. The instructions 812A can prompt the user to provide a set of speech inputs, for instance, in which the user speaks (e.g., repeats) a word or phrase (e.g., a digital trigger, such as "Hey Assistant").

Configuration interface 810A further includes cancel affordance 814A and continue affordance 816A. Selection of the cancel affordance 814A causes the electronic device to not enable (e.g., disable) a voice identification feature for the user account and/or cease display of the configuration interface 810A. Selection of the continue affordance 814A causes the electronic device to initiate a voice training operation by which the digital assistant is trained using one or more speech inputs provided by the user. In some examples, training the digital assistant in this manner includes generating a model (e.g., speech model) based on the set of speech inputs provided by the user during the voice training operation.

In some examples, the electronic device provides voice identification data to one or more external devices (e.g., each external device for which the voice identification feature of the user account is enabled). In turn, the external devices can use the voice identification data to identify the user in response to received speech inputs. The voice identification data can, for instance, be used to generate and/or update a voice profile for a user for use on an external device.

Figure 8M:
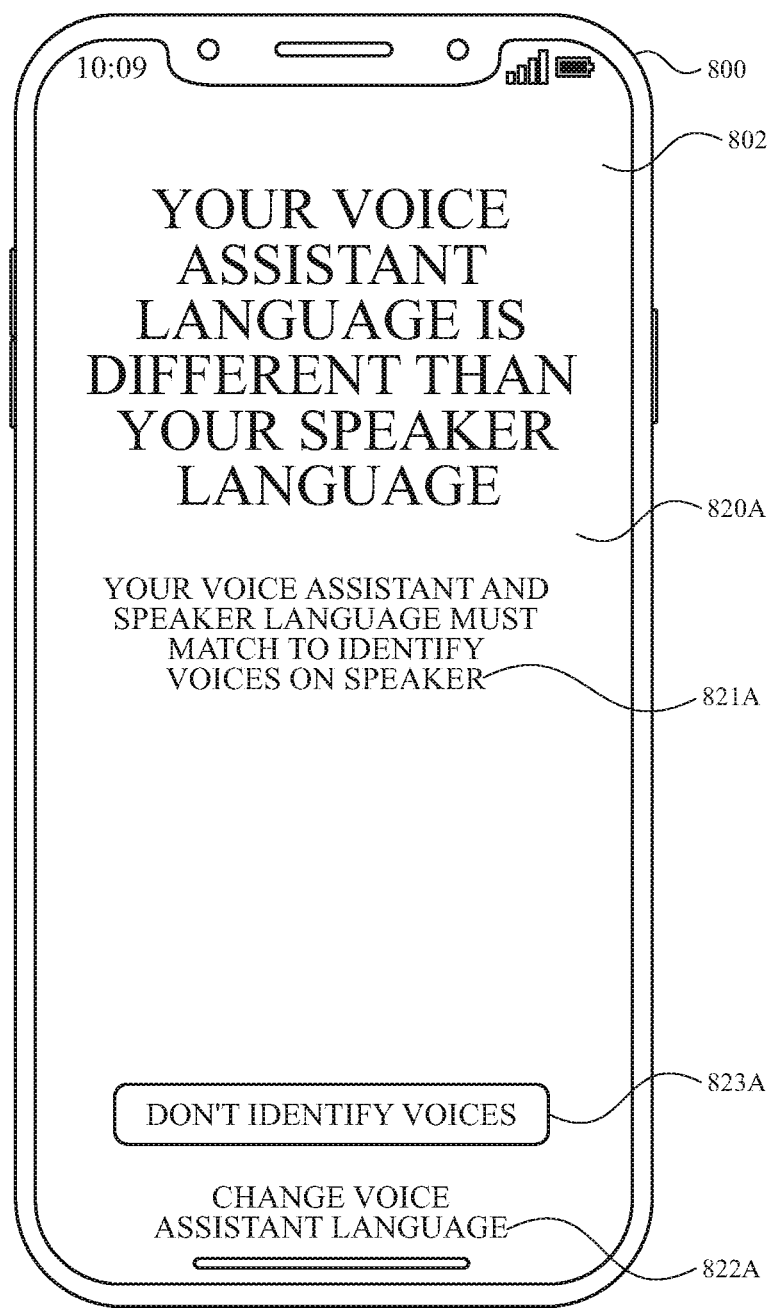

In some examples, the electronic device determines whether a language of the digital assistant of the electronic device is a same language as a language of an external device. With reference to FIG. 8M, if the language of the digital assistant of the electronic device is not the same language of the external device, the electronic device displays configuration interface 820A.

Configuration interface 820A includes indicator 821A, change affordance 822A, and cancel affordance 823A. In some examples, selection of change affordance 822A causes the electronic device to display one or more user interfaces by which a user can change a language of the digital assistant to the language of the external device, thereby allowing the voice identification feature can be enabled. Selection of cancel affordance 823A causes the electronic device to not enable (e.g., disable) a voice identification feature and/or cease display of the configuration interface 820A.

Description is provided herein with respect to the electronic device 800 being used during a configuration process to selectively enable features supported by one or more external devices (e.g., devices associated with the electronic device). It will be appreciated that in some examples, the electronic device 800 can support a feature such that the configuration process can be used to configure the electronic device 800. By way of example, the electronic device, in additional or alternatively to an external device, can be configured to support a voice identification feature and a personal requests feature.

Figure 8N:
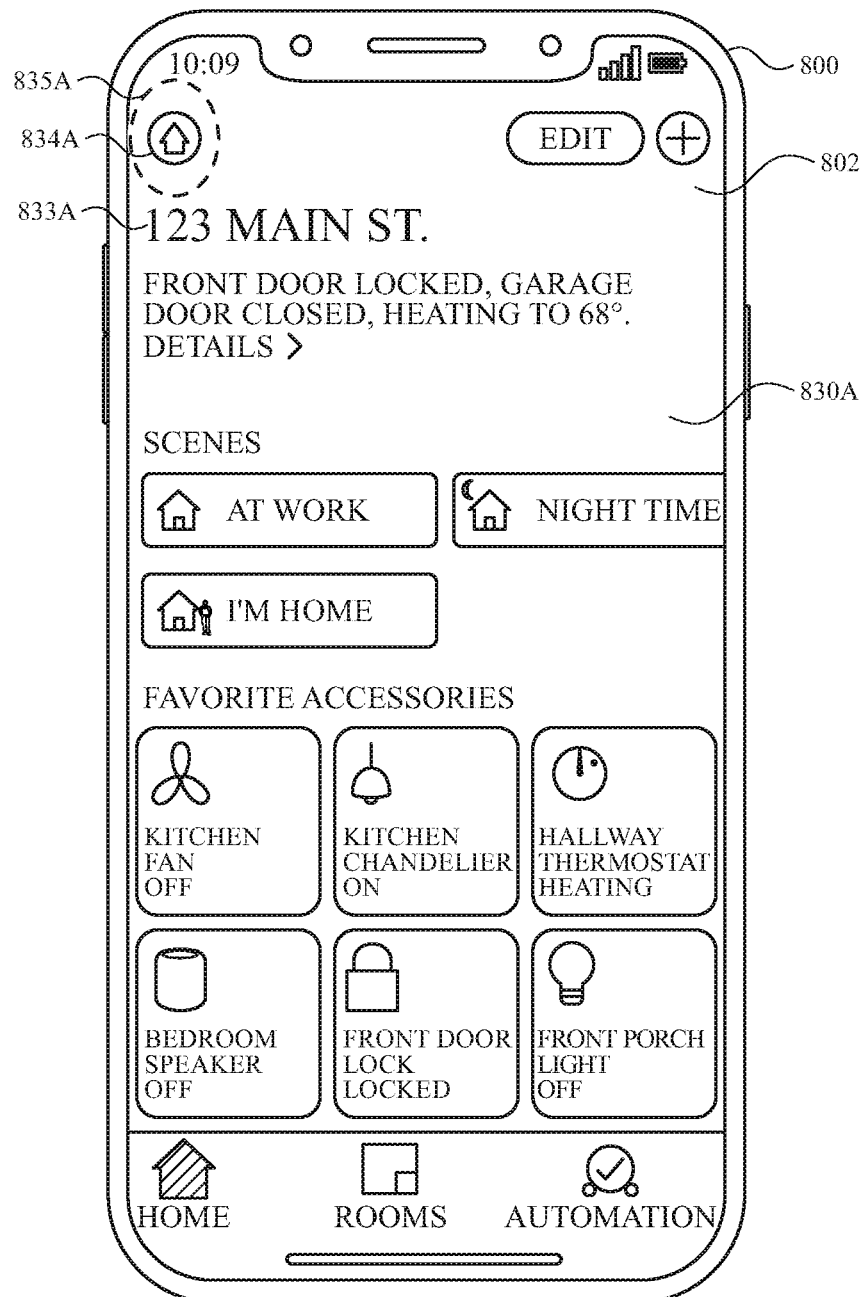

In FIG. 8N, device 800 displays a home interface 830A of a home control application. As illustrated, home interface 830A includes indicator 833A indicating the location ("123 Main St."). In some examples, indicator 833A includes text. In some examples, indicator 833A additionally or alternatively includes an image or other identifying information.

Figure 8O:
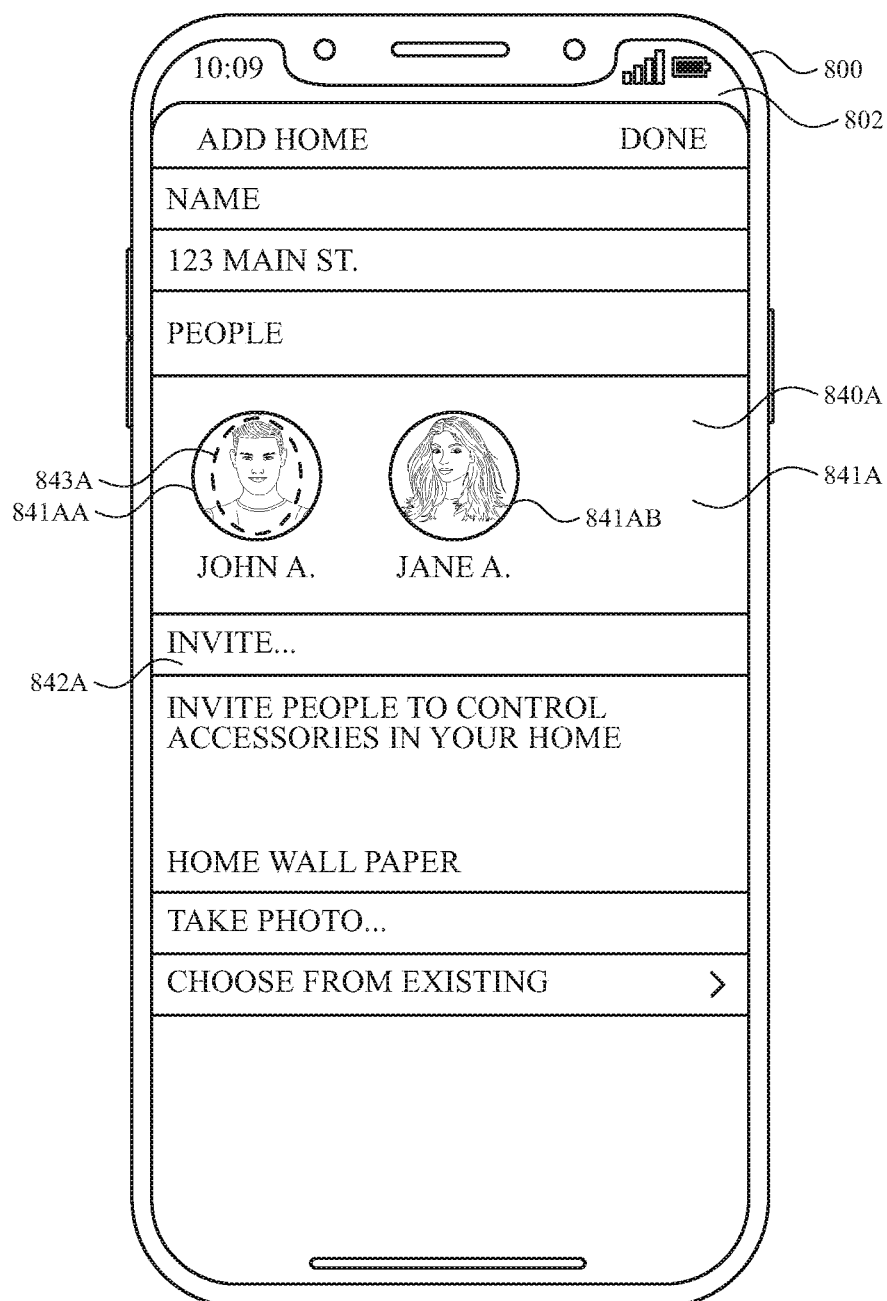

Home interface 830A further includes a home affordance 834A which when selected causes the electronic device 800 to display an interface in which the user can view and/or edit a settings of user accounts of the location profile (e.g., user accounts associated with the location). For example, while displaying the configuration interface 830A, the electronic device 800 detects selection of the home affordance 834A. As shown in FIG. 8O, selection of the home affordance 834A is, optionally, a tap gesture 835A. In response to selection of the home affordance 834A, the electronic device 800 displays (e.g., replaces display of the home interface 830A with), on the display 802, home interface 840A, as shown in FIG. 8O.

Home interface 840A includes user affordances 841A, each of which corresponds to a user account (and by extension, to a user of the user account). By way of example, user affordance 841AA corresponds to a user account for a user John Appleseed ("John A") and user affordance 841AB corresponds to a user account for a user Jane Appleseed ("Jane A"). Home interface 840A further includes invite affordance 842A which when selected allows the user to invite other users (e.g., personal contacts) to the location profile, as described in further detail below. As will be described further below, inviting other users in this manner can include providing notifications to each of the users which can be used to add user accounts of the users to the location profile, respectively.

Figure 8P:
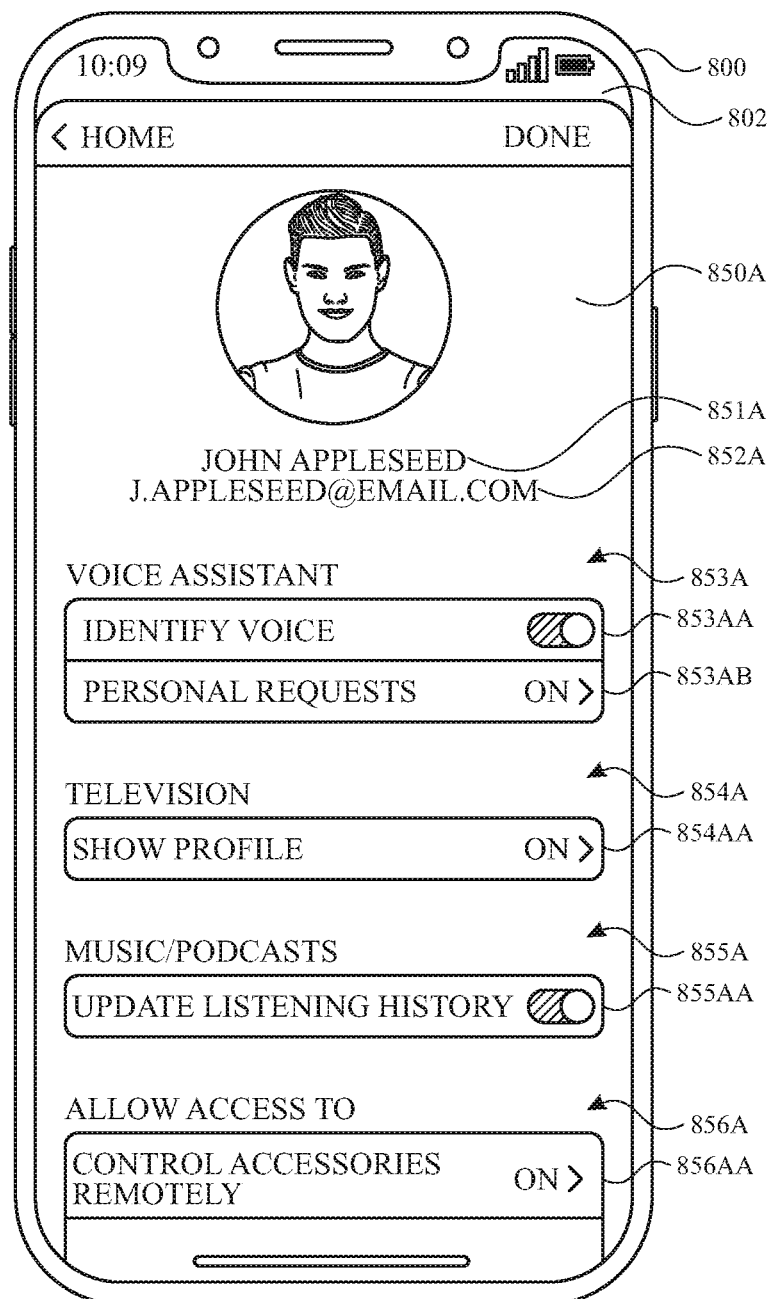

While displaying the home interface 840A, the electronic device 800 detects selection of user affordance 841AA. As shown in FIG. 8O, selection of the user affordance 841AA is, optionally, a tap gesture 843A. In some examples, in response to selection of the user affordance 841AB, the electronic device 800 displays (e.g., replaces display of the home interface 840A with), on the display 802, user account interface 850A for the user John Appleseed, as shown in FIG. 8P (recall that the selected user affordance 841AA corresponds to the user John Appleseed).

User account interface 850A includes user indicator 851A, user identification 852A, voice features portion 853A, profile portion 854A, playback portion 855A, and permissions portion 856A. User indicator 851A indicates a name of a user associated with the user account for the user account interface 850A. User identification 852A indicates information associated with the user (e.g., email address for the user). In some examples, the user identification 852A serves as a unique identifier of the user account.

Voice features portion 853A includes voice identification element 853AA and personal requests affordance 853AB. Voice identification element 853AA includes a toggle affordance which represents a parameter indicating whether a voice identification feature is enabled for the user account. Personal requests affordance 853AB, when selected, causes the electronic device 800 to display one or more user interfaces (e.g., interface 1070 of FIG. 10H) through which a user can view and/or adjust one or more settings associated with a personal requests feature of the user account (e.g., enable a personal requests feature for the user account on one or more devices).

Profile portion 854A includes profile affordance 854AA which when selected, causes the electronic device 800 to display one or more user interfaces (e.g., interface 1080 of FIG. 10I) through which a user can view and/or adjust one or more settings associated with a profile feature on a device (e.g., home media hub). Playback portion 855A includes a toggle affordance which represents a parameter indicating whether listening history of the user is updated in response to user requests, for instance, as described with reference to FIGS. 6A-6L. Permissions portion 856A includes remote access affordance 856AA, which when selected, causes the electronic device 800 to display one or more user interfaces (e.g., interface 1090 of FIG. 10J) through which a user can view and/or adjust one or more settings associated with remote access of one or more devices associated with the location.

In some examples, a user may want to switch between user accounts. For example, while the user is signed into a first user account on the electronic device, a user may, for instance prefer to sign into a second user account on the electronic device, for instance, to view content associated with the second user account. FIGS. 8Q-8U illustrate user interfaces for a process by which the electronic device, in response to a user signing in to the second user account, prompts the user to add the second user account to the location profile (and optionally, remove the first user account from the location profile) such that the same user account is used consistently across devices of the user (e.g., electronic device 800 and one or more external devices).

Figure 8Q:
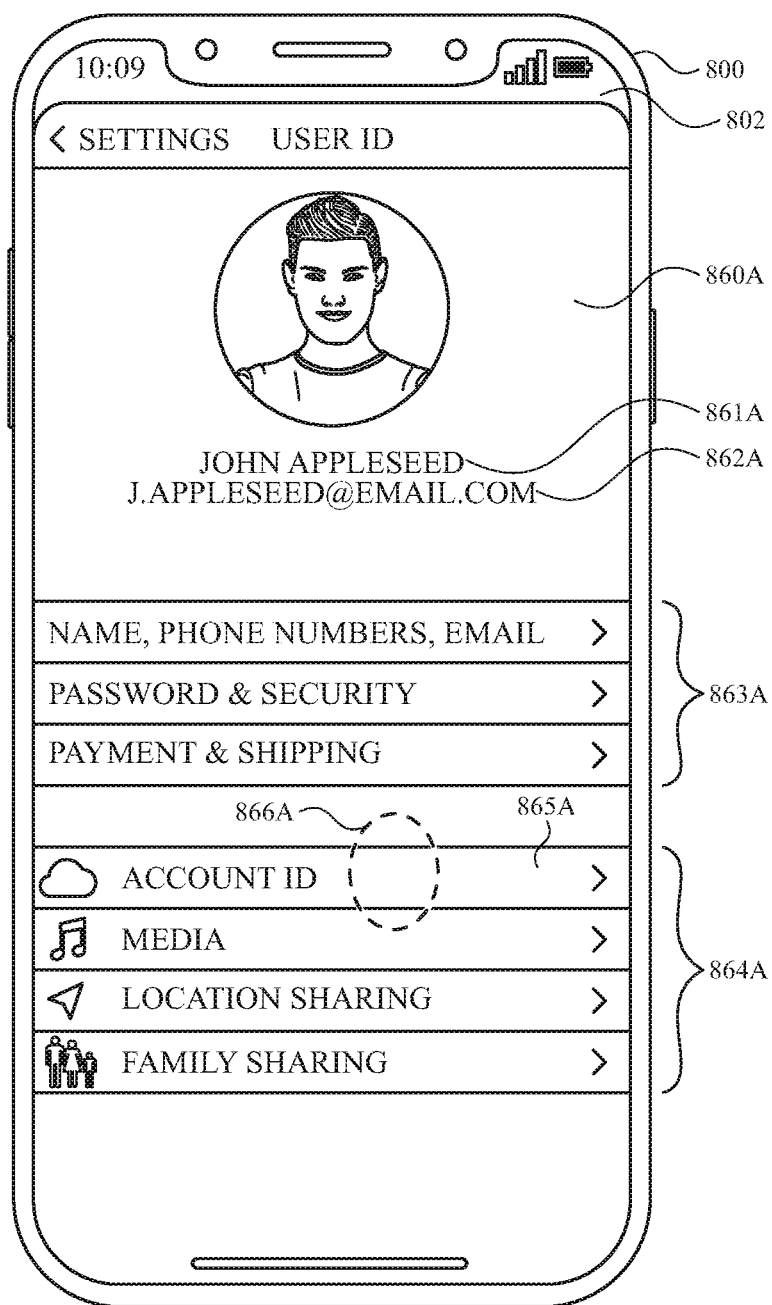

FIG. 8Q illustrates user account interface 860A displayed on display device 802 of electronic device 800. In some examples, user account interface 860A is a user interface of a settings application of the electronic device 800. User account interface 860A includes user indicator 861A, user identification 862A, account affordances 863A, and option affordances 864A. User indicator 861A indicates a name of a user associated with the user account for the user account interface 860A. User identification 862A indicates information associated with the user account (e.g., email address for the user account). In some examples, the user identification 862A serves as a unique identifier of the user account. Account affordances 863A, when selected, cause the electronic device to display one of respective sets of user interfaces by which the user can view and/or edit user-specific (e.g., private) information of an account. By way of example, the user can change a name of the user account, a password of the user account, and/or a payment method for transactions made under the user account.

Figure 8R:
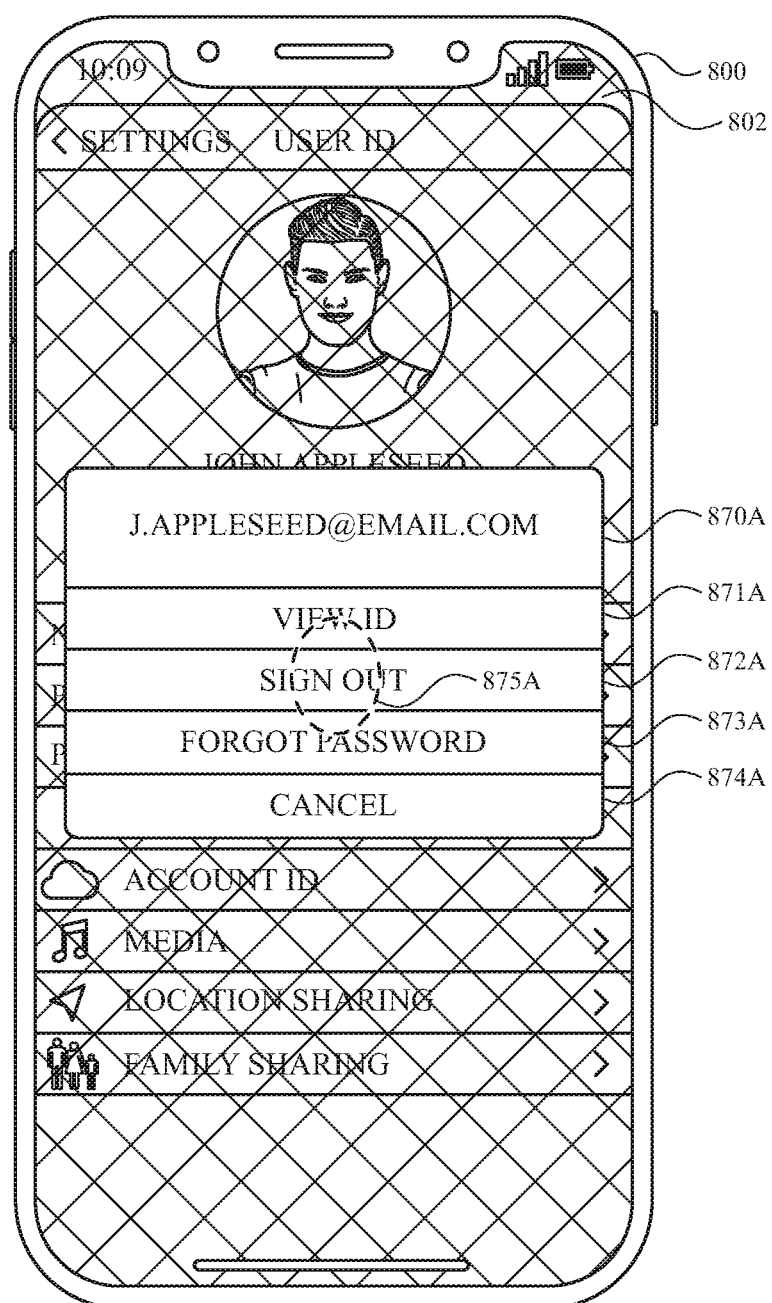

Option affordances 864A when selected, cause the electronic device 800 to display respective sets of user interfaces by which the user can view and/or edit various settings associated with the user account. A user may, for instance, select option affordance 865A to adjust various sign on settings associated with the user account. By way of example, with reference to FIG. 8Q, while displaying the user account interface 860A, the electronic device 800 detects selection of user affordance 865A. As shown in FIG. 8Q, selection of the user affordance 865A is, optionally, a tap gesture 866A. In some examples, in response to selection of the user affordance 865A, the electronic device 800 displays (e.g., replaces display of the home interface 840A with), on the display 802, user account interface 870A, as shown in FIG. 8R. In some examples, the user account interface 870A is overlaid on the user account interface 860A.

User account interface 870A includes view affordance 871A, sign out affordance 872A, forgot password affordance 873A, and cancel affordance 874A. View affordance 871A, when selected, causes the electronic device 800 to display a user interface including additional information regarding the user account. Forgot password affordance 873A, when selected, causes the electronic device 800 to initiate a password recovery operation such that the user can modify and/or retrieve a password for the user account. Cancel affordance 874A, when selected, causes the electronic device 800 to cease display of the user account interface 870A, and optionally, redisplay the user account interface 870, as shown in FIG. 8R.

Figure 8S:
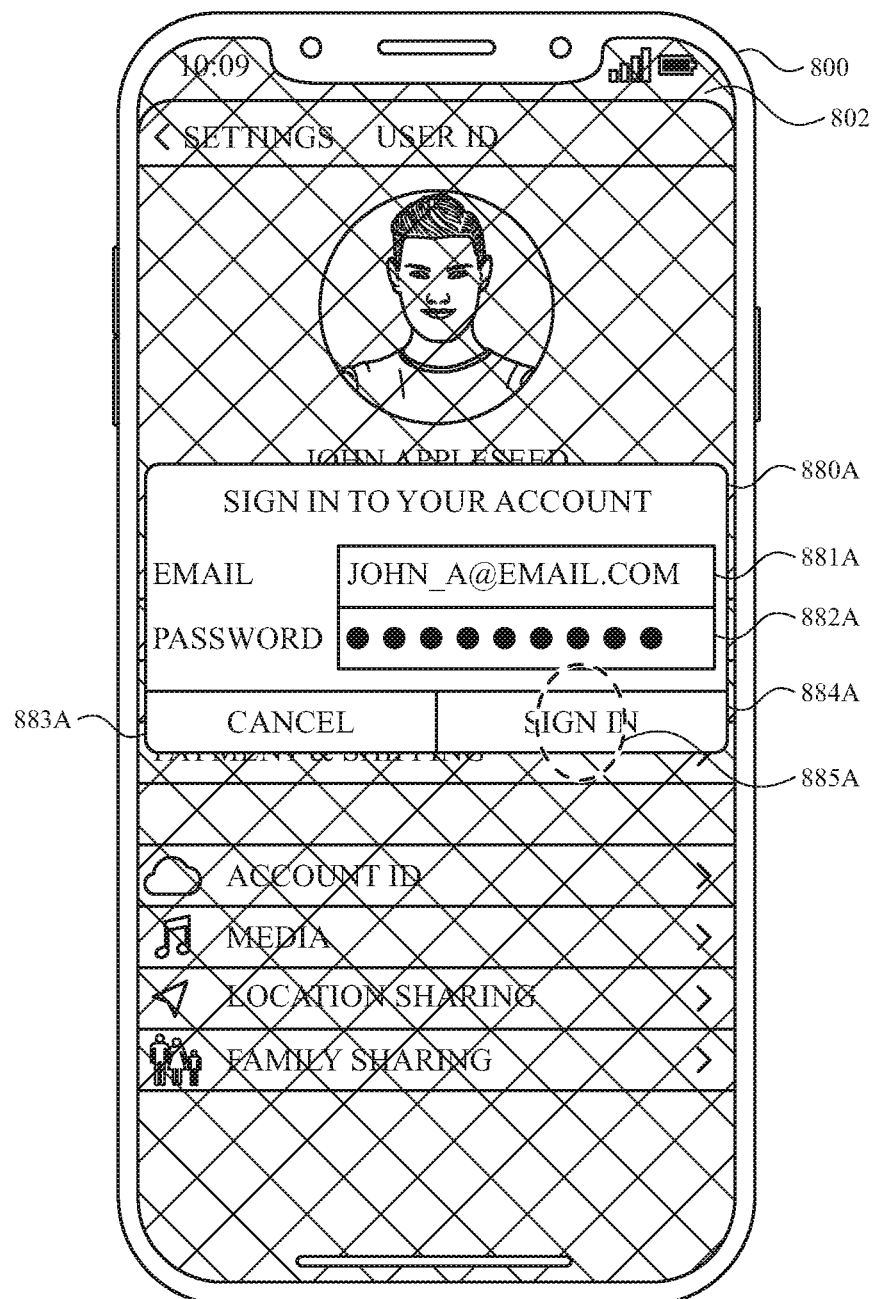

Sign out affordance 872A, when selected, causes the user to be signed out of the first user account (e.g., "j.appleseed@email.com"), and optionally, to prompt the user to sign in to a second user account (e.g., "john_a@email.com"). For example, while displaying user account interface 870A, the electronic device detects selection of user affordance 872A. As shown in FIG. 8R, selection of the user affordance 865A is, optionally, a tap gesture 875A. In some examples, in response to selection of the user affordance 872A, the electronic device 800 displays (e.g., replaces display of the home interface 870A with), on the display 802, user account interface 880A, as shown in FIG. 8S. In some examples, the user account interface 880A is overlaid on the user account interface 860A.

User account interface 880A includes username field 881A, password field 882A, cancel affordance 883A, and sign in affordance 884A. In some examples, user account interface 880 serves as a prompt for a user to sign in to a user account on the electronic device 800. Accordingly, a user can provide a username and password for the user account in fields 881A and 882A, respectively. Sign in affordance 885A, when selected, causes the electronic device to submit the username and password of the account as credentials for the account. Select cancel affordance 883A, when selected, causes the electronic device 800 to cease display of the user account interface 870A, and optionally, redisplay the user account interface 860A, as shown in FIG. 8Q.

Figure 8T:
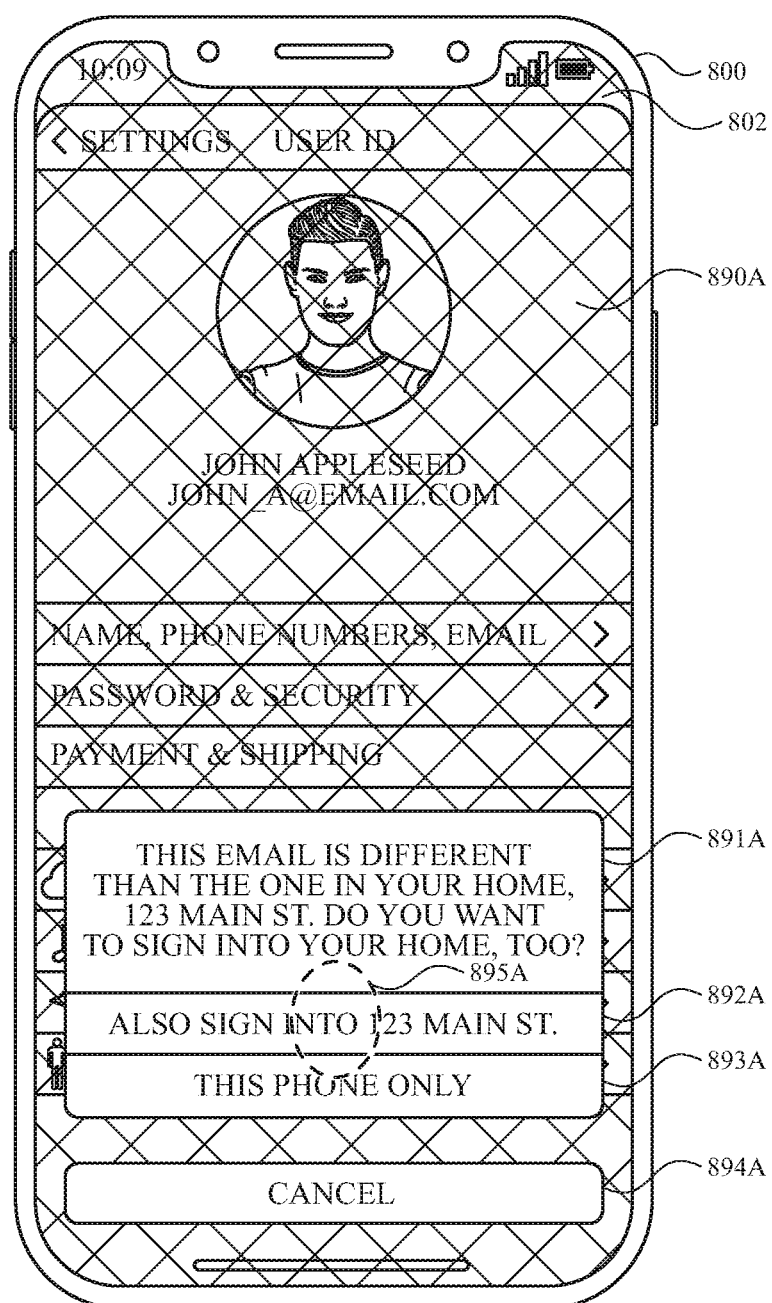

As an example, while displaying user account interface 880A, the electronic device detects selection of sign in affordance 884A. As shown in FIG. 8S, selection of the sign in affordance 884A is, optionally, a tap gesture 885A. In some examples, in response to selection of the sign in affordance 884A, the electronic device 800 initiates a sign in operation by which the user is signed into the second user account (e.g., "john_a@email.com") and displays (e.g., replaces display of the home interface 880A with), on the display 802, user account interface 890A, as shown in FIG. 8T.

In some examples, prior to performing the sign in operation (e.g., in response to selection of the user affordance, the electronic device 800 determines whether the second user account (e.g., john_a@email.com) is the same user account as the user account of the user in the location profile of the home control application. If the user accounts are not the same, the electronic device 800 displays sign on interface 891A, as shown in FIG. 8T. Sign on interface 891A is overlaid on user account interface 890A in some examples.

Sign on interface 891A includes sign on affordance 892A, device affordance 893A, and cancel affordance 894A. Selection of device affordance 893A causes the electronic device to perform the sign in operation for the user account only on the electronic device 800. Selection of cancel affordance 894A causes the electronic device 800 to terminate the sign in operation such that the user remains signed in to the first user account (e.g., "j.appleseed@apple.com") or signed out of all user accounts.

Figure 8U:
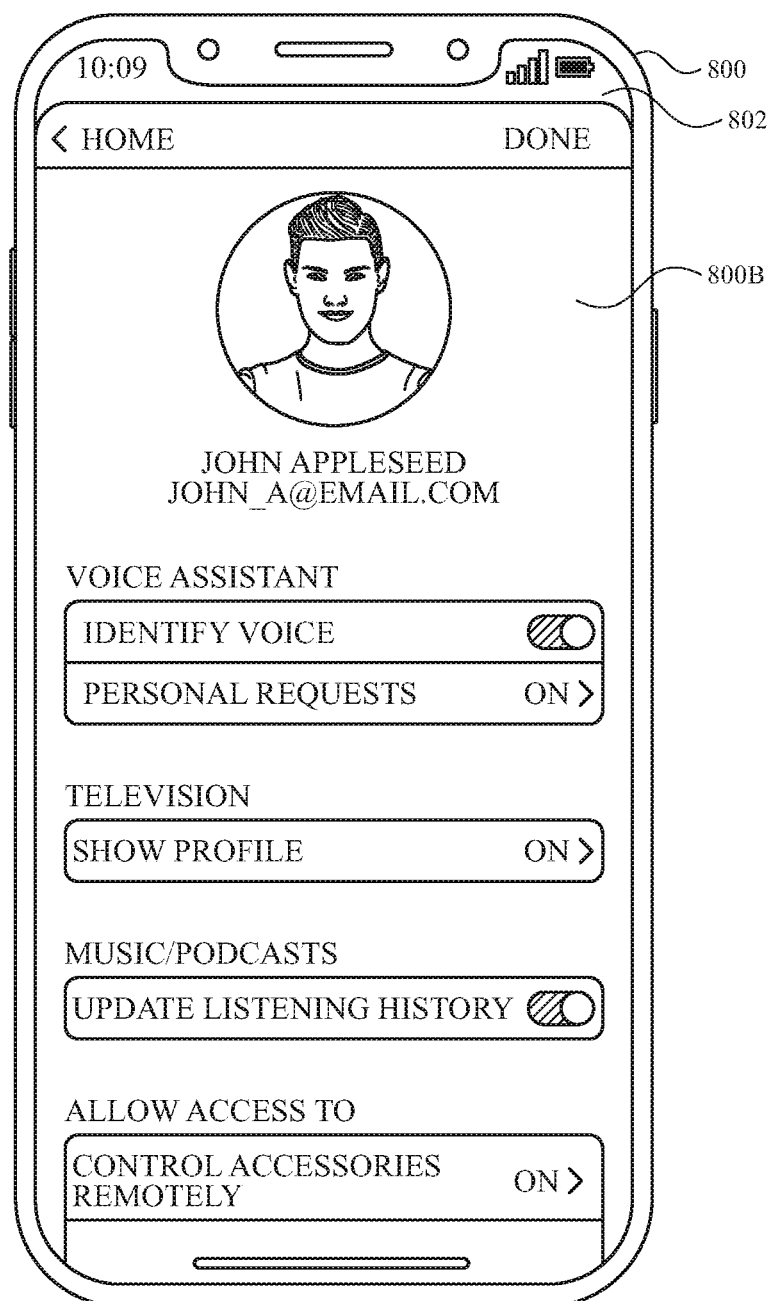

Selection sign on affordance 892 causes the electronic device to perform the sign in operation for the user account on the electronic device and perform the additional sign in operation such that the second user account is added to the location profile. By way of example, while displaying the sign on interface 891A, the electronic device 800 detects selection of the sign on affordance 892A. As shown in FIG. 8T, selection of the sign on affordance 892A is, optionally, a tap gesture 895A. In response to selection of the sign on affordance 892A, the electronic device 800 adds the user account (e.g., user account "john_a@email.com") to the location profile, as shown in the user account interface 800B of a home control application (FIG. 8U).

Figure 8V:
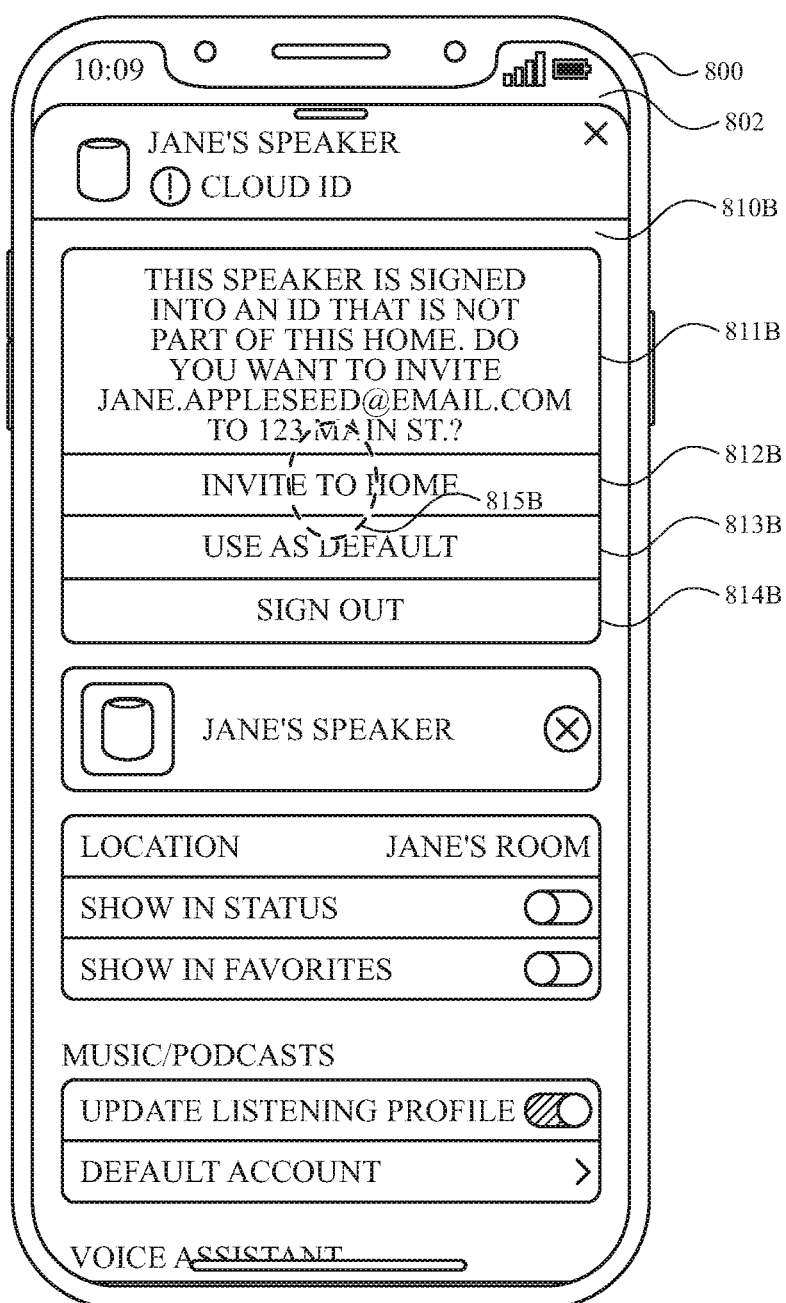

FIGS. 8V-8Z illustrate user interfaces for a process by which a user account can be added to a location profile for a location of a device. FIG. 8V illustrates a settings interface 810B for an external device associated with a location and a user account (e.g., user account "jane.applewood").

In some examples, a device associated with a location is associated with a user account not included in a location profile for the location. Because the user account is not included in the location profile, when viewing a settings interface 810B for the device, the electronic device displays, in settings interface 810B, account interface 811B. Account 811B includes invite affordance 812B, default affordance 813B, and sign out affordance 814B. Invite affordance 812B, when selected, causes the electronic device to provide an invite by which the invited user can elect to add their user account to the location profile. By way of example, while displaying the settings interface 810B, the electronic device 800 detects selection of the invite affordance 812B. As shown in FIG. 8V, selection of the invite affordance 812B is, optionally, a tap gesture 815B. In response to selection of the invite affordance 812B, the electronic device provides a notification, such as notification 1241 of lock screen interface 1240 (FIG. 12F), that the invited user can accept to add their user account to the location profile. Sign out affordance 814B, when selected, causes the electronic device to sign out the user account from the device such that the device is no longer associated with the user account.

Figure 8W:
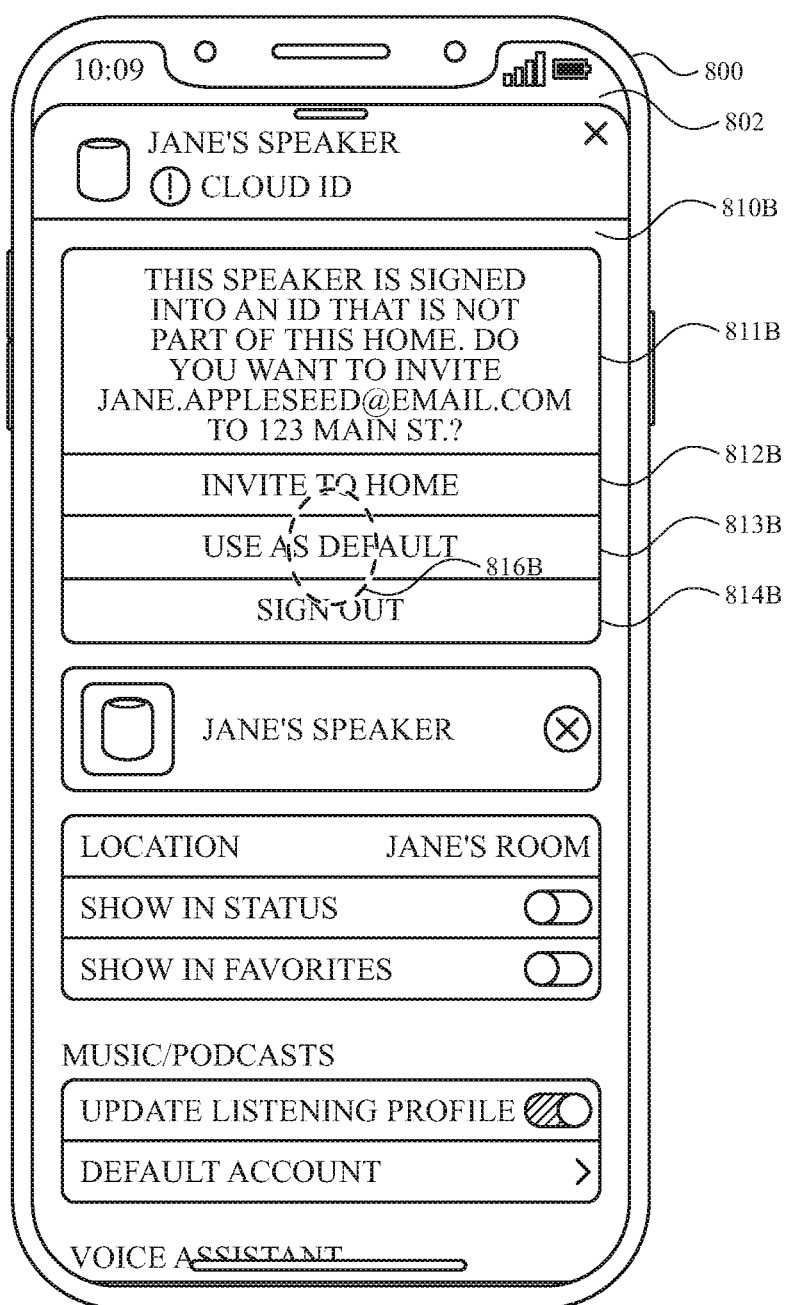

With reference to FIG. 8W, in some examples, while displaying the settings interface 810B, the electronic device 800 detects selection of the default affordance 813B. As shown in FIG. 8W, selection of the default affordance 813B is, optionally, a tap gesture 815B. In response to selection of the invite affordance 812B, the electronic device 800 assigns the user account as the default account for the device. As described, requests thereafter provided to the device that are not attributed to a specific user will be processed according to the default account.

Figure 8X:
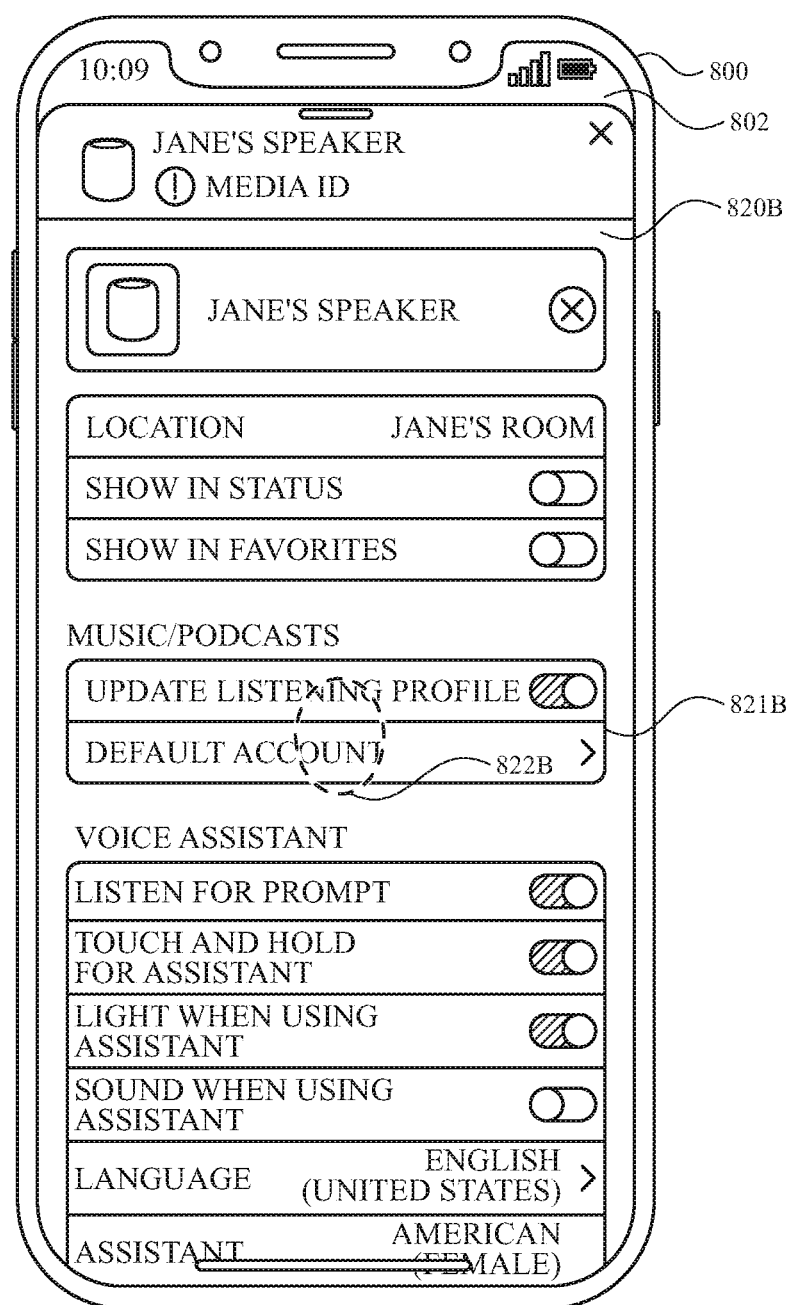
Figure 8Y:
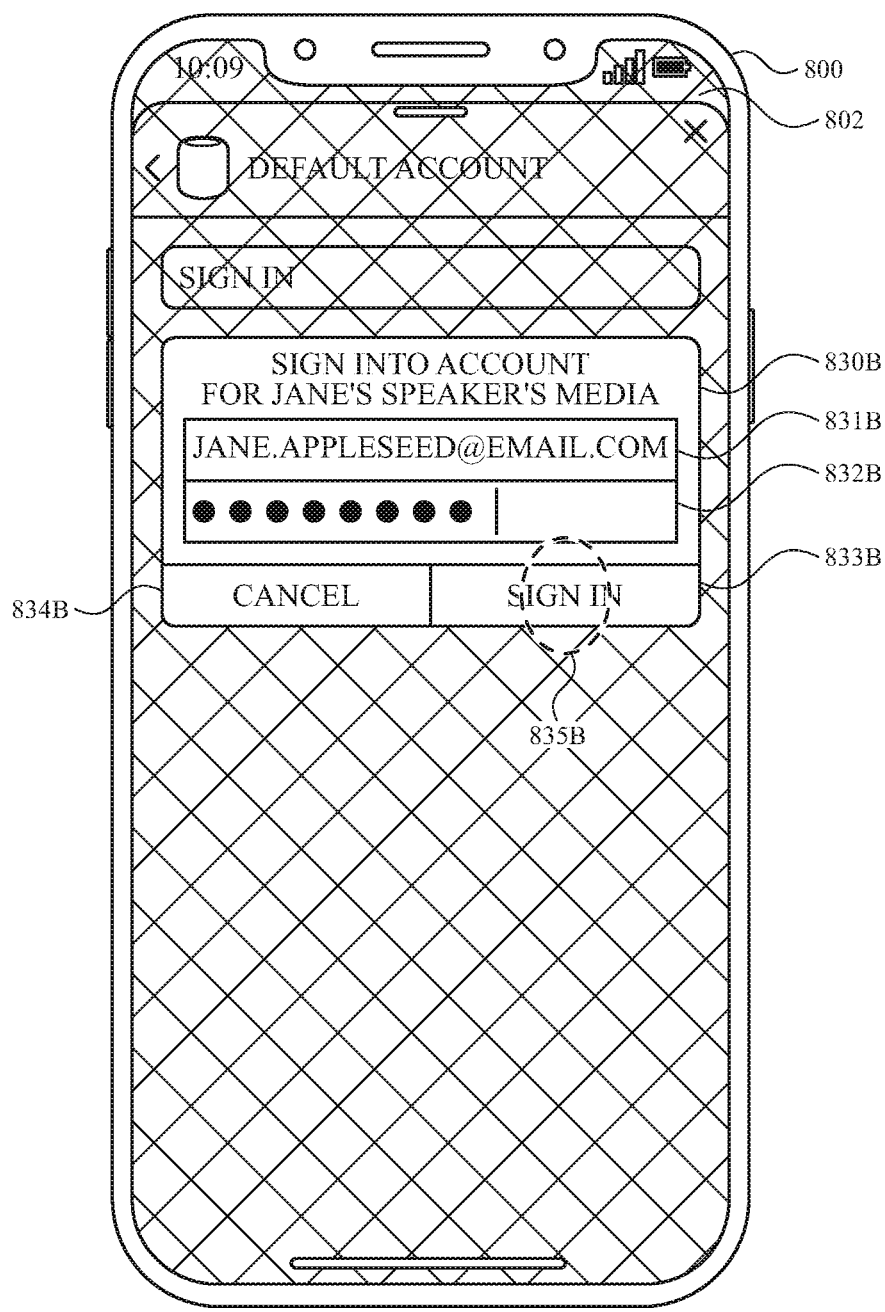
Figure 8Z:
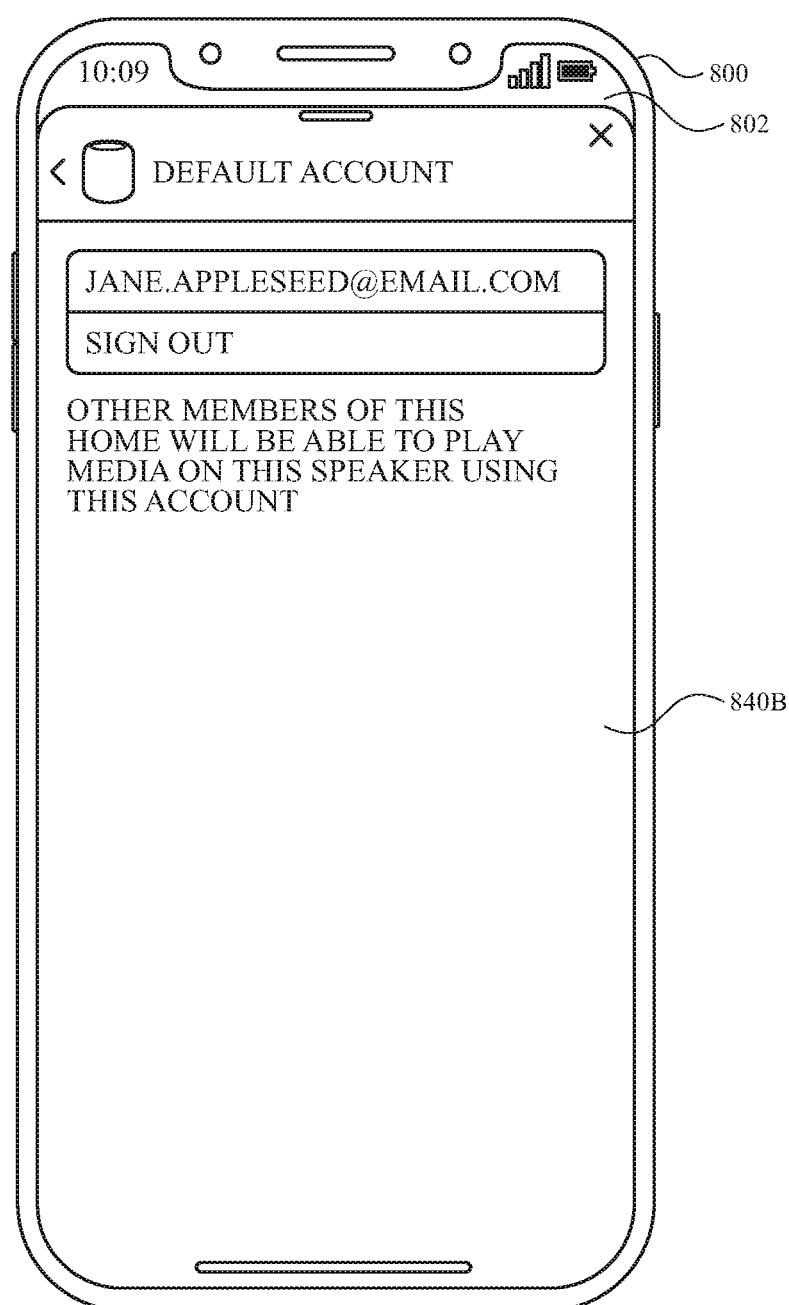
Figure 8A:
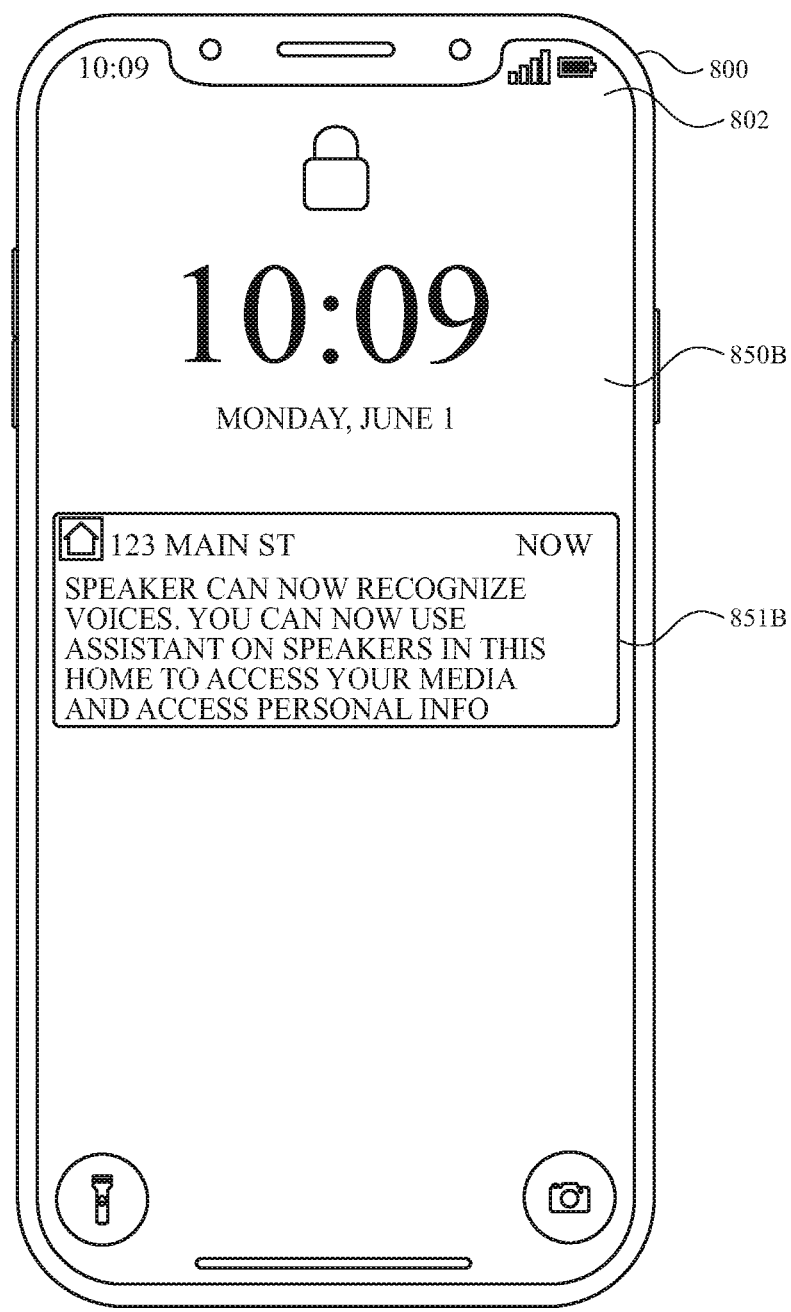
Figure 8A:
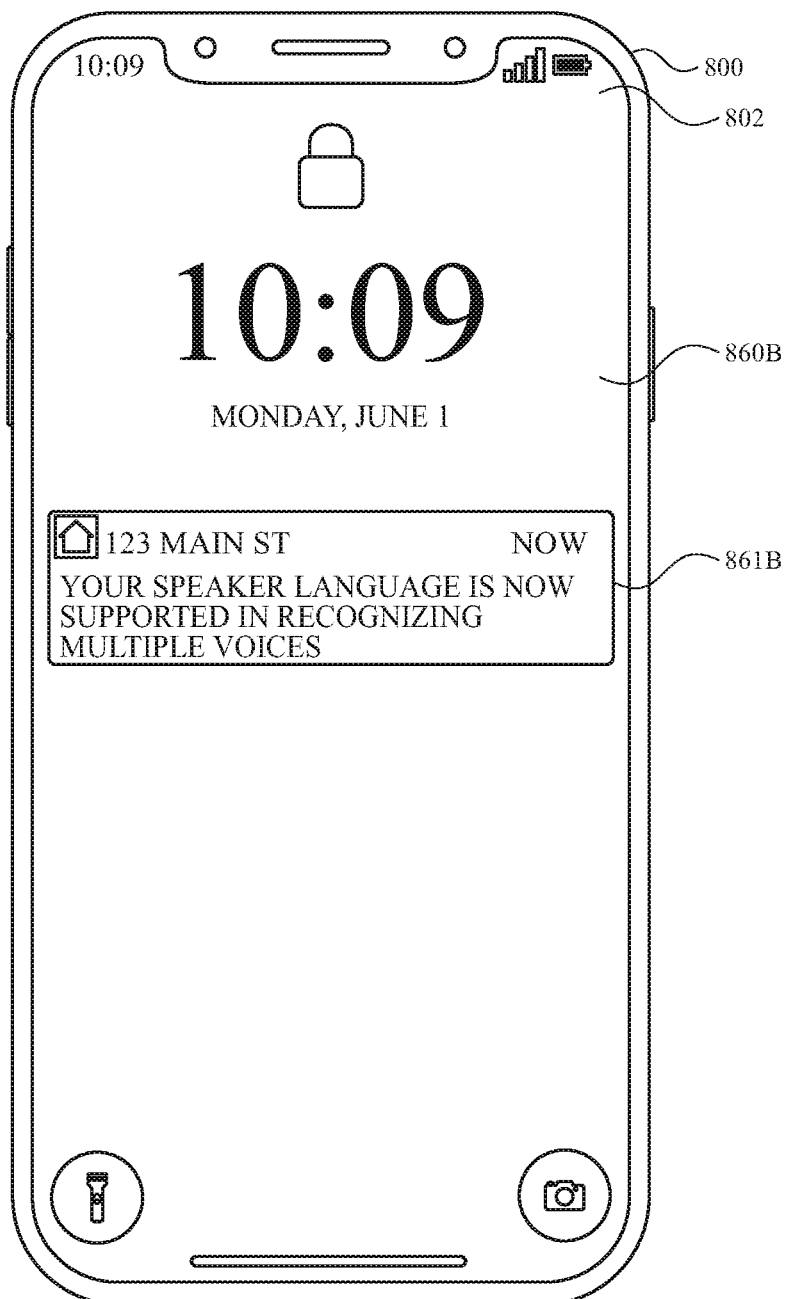

FIG. 8X illustrates a settings interface 820B for a device associated with a location. The settings interface 820B includes account affordance 821B which when selected causes the electronic device 800 to display one or more user interfaces through which a user can view and/or set a default user account for the device. By way of example, while displaying the settings interface 820B, the electronic device 800 detects selection of the account affordance 821B. As shown in FIG. 8X, selection of the account affordance 821B is, optionally, a tap gesture 822B. In response to selection of the account affordance 821B, the electronic device 800 displays (e.g., replaces display of the settings interface 821B with), on the display 802, sign on interface 830B, as shown in FIG. 8Y.

The sign on interface 810 includes username field 831B, password field 832B, cancel affordance 834B, and sign in affordance 833B. Sign in affordance 833B, when selected, causes the electronic device to submit the username and password of the account as credentials for the user account. Cancel affordance 834B, when selected, causes the electronic device 800 to cease display of the sign on interface 830B, and optionally, redisplay the settings interface 820B.

In an example operation, while displaying user account interface 880A, the electronic device detects selection of sign in affordance 834B. As shown in FIG. 8Y, selection of the sign in affordance 834B is, optionally, a tap gesture 835B. In some examples, in response to selection of the sign in affordance 834B, the electronic device 800 initiates a sign in operation by which the user is signed into the specified user account to set the user account as the default account of the device, as shown in interface 840B of FIG. 8Z.

FIG. 9 is a flow diagram illustrating a method for configuring user accounts using an electronic device (e.g., a smart phone, a tablet computer) in accordance with some embodiments. Method 900 is performed at a device (e.g., 100, 300, 500, 580, 600) with a display device and one or more input devices. Some operations in method 900 are, optionally, combined, the orders of some operations are, optionally, changed, and some operations are, optionally, omitted.

As described below, method 900 provides an intuitive way for configuring user accounts. The method reduces the cognitive burden on a user for configuring user accounts, thereby creating a more efficient human-machine interface. As an example, detecting devices that support a feature and displaying a prompt to configure the feature if one or more devices supporting the feature are detected allows the user to efficiently and intuitively perform a configuration operation for the feature. For instance, first detecting devices supporting a feature ensures that devices supporting the feature are available prior to initiating a configuration operation. In turn, this decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, an electronic device (a first device) (e.g., 800) detects (902) that one or more devices (e.g., smart devices) associated with the first device (e.g., associated with a user account of the first device) support a respective feature (e.g., a voice identification feature).

In some embodiments, the respective feature is a voice identification feature. In some embodiments, the electronic device (e.g., 800) causes transmission of (e.g., transmission by the first device, transmission by device other than the first device) voice identification data (e.g., a voice profile, a received voice command) to one or more of the one or more devices (e.g., during a configuration process for configuring the respective feature; subsequent to completion of the configuration process (e.g., in which the respective feature has been enabled)). Causing transmission of voice data in this manner allows devices to use the voice data to compare voice inputs received by the devices and accurately determine whether a voice profile of a user account matches the voice input. Matching voice inputs in this manner ensures that devices perform tasks according to user preferences and prior usage of the devices. In turn, this decreases the number of inputs and amount of time needed for the user to operate the electronic device (e.g., by helping the user provide proper inputs and reducing user mistakes when operating/interacting with the device and ensuring that the devices return salient results), which, additionally, reduces power usage and improves battery life of the device.

In some embodiments, in accordance (904) with a determination that a set of criteria are met, the set of criteria including a criterion that is met when the one or more devices support the respective feature, the electronic device displays (906), on the display device, a prompt (e.g., 803, 810, 820, 830) to configure the respective feature of the one or more devices (e.g., displaying an interface during a configuration process (e.g., during an initial setup process for a voice command process); displaying a banner, notification, or pop-up message while not in a configuration process).

In some embodiments, in accordance (904) with a determination that a set of criteria are met, the set of criteria including a criterion that is met when the one or more devices support the respective feature, while displaying the prompt to configure the respective feature of the one or more devices, the electronic device receives (908), via the one or more input devices, a set of one or more inputs (e.g., 806, 816, 824, 834).

In some embodiments, in accordance (904) with a determination that a set of criteria are met, the set of criteria including a criterion that is met when the one or more devices support the respective feature, in response to receiving the set of one or more inputs, the electronic device performs (910) a configuration operation associated with the respective feature (e.g., display a next interface (e.g., if "Continue" is selected), disable the feature (e.g., if "Don't Recognize" or "No" is selected)).

In some embodiments, performing a configuration operation includes initiating (912) a configuration process for configuring the respective feature of the one or more devices (e.g., initiated in response to user input while the prompt is displayed (e.g., selection of "Continue"). In some embodiments, the configuration process includes display of one or more interfaces (e.g., 803, 810, 820, 830, 840, 850, 860, 870, 880, 890, 800A, 810A, 820A) for configuring one or more settings (e.g., related to the respective feature). For example, the process can include a series of interfaces that the device progresses through based on user input. In some embodiments, whether an interface is displayed and/or which options are displayed on an interface depends on one or more conditions (e.g., how many devices are being configured to use the respective feature, whether other user's use such devices, and the like).

In some embodiments, while performing (914) the configuration process, the electronic device (e.g., 800) displays (916), on the display device, a first interface (e.g., 800A) that includes one or more options for enabling the respective feature on the one or more devices. In some embodiments, while performing the configuration process, the electronic device receives (918), via the one or more input devices, input (e.g., 805A) representing selection of a set of devices of the one or more devices. In some embodiments, while performing the configuration process, in response to receiving the input representing selection of the set of devices, the electronic device enables (920) the respective feature on the set of devices. In some embodiments, the device receives user selection of which of the one more devices will enable a sub-feature (e.g., output of personal data (e.g., Personal Requests)) that relies on the respective feature.

In some embodiments, the set of criteria includes a first criterion that is met when the respective feature has been enabled for fewer than (e.g., zero) a threshold number of user accounts (e.g., six accounts) associated with (e.g., registered with, logged into) the one or more devices. In some embodiments, the device displays an interface (e.g., 840) indicating that the maximum number of user accounts has been reached (e.g., that does not include an option for enabling the respective feature).

In some examples, the respective feature is a voice identification feature. In some embodiments, the set of criteria includes a second criterion that is met when the one or more devices are configured to use a language (e.g., for interpreting voice inputs and/or for outputting voice output (e.g., verbal output of information)) supported by the respective feature. In some embodiments, the device displays an interface (e.g., 850) indicating that the language of the one or more devices is not supported. In some embodiments, the interface includes an option (e.g., 853) to change the language associated with at least one of the one or more devices.

In some embodiments, the electronic device (e.g., 800) (first device) is associated with a first user account (e.g., logged into). In some embodiments, while performing the configuration process, in response to the second criterion not being met and in accordance with a determination that the first user account is an administrator account, the electronic device displays, on the display device, a second interface (e.g., 860) that includes one or more options for changing the language that the one or more devices are configured to use. In some embodiments, the second interface is displayed in response to selection (e.g., 854) at an interface indicating the language of the one or more devices is not supported. In some embodiments, the second interface is displayed if the second criterion is not met. In some embodiments, while performing the configuration process, in response to the second criterion not being met and in accordance with a determination that the first user account is an administrator account, the electronic device receives, via the one or more input devices, input (e.g., 864) representing a change to the language that the one or more devices are configured to use.

In some embodiments, while performing the configuration process, in response to the second criterion not being met and in accordance with a determination that the first user account is an administrator account, in response to receiving the input representing the change to the language, the electronic device changes the language that the one or more devices are configured to use.

In some embodiments, the electronic device displays, while performing the configuration process, in response to the second criterion not being met, the electronic device displays, on the display device, one or more options (e.g., 864, 871, 872) for changing the language that the one or more devices are configured to use. In some embodiments, displaying the one or more options includes, in accordance with a determination that more than one device of the one or more devices is configured to use a language not supported by the respective feature, displaying, on the display device, a third interface (e.g., 870) that includes the one or more options (e.g., 871, 872) for configuring the language of multiple devices. In some embodiments, displaying the one or more options includes in accordance with a determination that one device of the one or more devices is configured to use a language not supported by the respective feature, displaying, on the display device, a fourth interface (e.g., 880) that includes an option (e.g., 881A, 881B, 881C) of the one or more options for configuring the language of the one device. In some embodiments, the electronic device receives input (e.g., 885) representing a change to the language that at least one of the one or more devices is configured to use. In some embodiments, in response to receiving the input representing the change to the language, the electronic device changes the language that the at least one device is configured to use.

In some embodiments, while performing the configuration process, the electronic device receives, via the one or more input devices, input (e.g., 814, 824, 834) representing selection of an option to enable the respective feature on the one or more devices. In some embodiments, the electronic device (first) device is associated with a first language (e.g., English) and the one or more devices are associated with a second language (e.g., French). In some embodiments, while performing the configuration process, in response to receiving the input representing selection of the option to enable the respective feature on the one or more devices, in accordance with a determination that the first language (e.g., English) is different from the second language (e.g., French), the electronic device displays, on the display device, a fifth interface (e.g., 820A) that includes one or more options (e.g., 822A) for changing the language of the first device. In some embodiments, while performing the configuration process, in response to receiving the input representing selection of the option to enable the respective feature on the one or more devices, in accordance with a determination that the first language (e.g., English) is not different from the second language (e.g., French), the electronic device forgoes displaying the fifth interface.

In some embodiments, while performing the configuration process, in accordance with a determination that a voice profile (e.g., resulting from performing a voice training process) is not associated with (e.g., stored on, being used by) the first device, the electronic device displays, on the display device, a sixth interface (e.g., 810A) for performing a voice training operation for the voice identification feature.

In some embodiments, while performing the configuration process, in accordance with a determination that the voice profile (e.g., resulting from performing a voice training process) is associated with (e.g., stored on, being used by) the first device, the electronic device forgoes displaying, on the display device, the sixth interface for performing a voice training operation for the voice identification feature. In some embodiments, while performing the configuration process, in accordance with a determination that the voice profile (e.g., resulting from performing a voice training process) is associated with (e.g., stored on, being used by) the first device, the electronic device configures the voice identification feature to use the voice profile.

In some embodiments, while performing the configuration process, in accordance with a determination that the voice identification feature has been enabled (e.g., during a process for configuring the respective feature), the electronic device displays, on the display device, a seventh interface (e.g., 820) for configuring a second feature different from the respective feature. In some embodiments, enabling the second feature requires the first feature be enabled. In some embodiments, while performing the configuration process, in accordance with a determination that the voice identification feature has not been enabled (e.g., during a process for configuring the respective feature), the electronic device forgoes displaying, on the display device, a seventh interface for configuring the second feature. In some examples, displaying an interface to enable a second feature only when a first feature is enabled provides the electronic device to intuitively and efficiently provide a configuration process for a user. As an example, a user need not provide inputs indicating whether a user prefers to enable the second feature when the first feature is not enabled, thus decreasing the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, in accordance with a determination that the voice identification feature has not been enabled (e.g., disabled during a process for configuring the respective feature) and the second feature has been enabled (e.g., prior to being disabled during the configuration process), the electronic device displays, on the display device, an eighth interface that includes one or more of: an option (e.g., 893) to enable the respective feature and an option (e.g., 892) to disable the second feature. In some embodiments, in accordance with a determination that the voice identification feature has been enabled (e.g., during a process for configuring the respective feature) and the second feature has been enabled, the electronic device forgoes displaying, on the display device, the eighth interface.

In some embodiments, in accordance with a determination that the one or more devices includes a plurality of devices, the electronic device displays, on the display device, a ninth interface (e.g., 800A) for configuring the second feature that includes one or more options (e.g., 802AA, 802AB, 802AC) for selecting which of the plurality of devices will have the second feature enabled (e.g., for a particular user account). In some embodiments, in accordance with a determination that the one or more devices does not include a plurality of devices, the electronic device forgoes displaying the ninth interface for configuring the second feature that includes one or more options for selecting which of the plurality of devices will have the second feature enabled (e.g., for a particular user account).

In some embodiments, in accordance with a determination that the one or more devices do not support the respective feature, the electronic device forgoes (922) display of, on the display device, the prompt to configure the respective feature of the one or more devices.

In some embodiments, the set of criteria include a criterion that is met when an account associated with the first device accepts (e.g., using the first device) an invitation to join a group of accounts associated with the one or more devices (e.g., joins a smart home group). For example, an interface for configuring a voice identification feature is displayed (e.g., upon switching to an application or interface for managing a group of devices associated with a geographic location (e.g., home), or upon arriving at the location of the new geographic location associated with the group of devices)

In some embodiments, the set of criteria include a criterion that is met when a new device (e.g., of a particular type, such as a smart speaker or a home media hub) is added to a group of devices associated with the first device.

In some embodiments, a notification is transmitted to a plurality of devices (e.g., the first device) in response to the set of criteria being met. For example, each device (e.g., first device) associated with a group of devices can receive data, and cause display of the prompt, in response to the set of criteria being met.)

In some embodiments, in accordance with a determination that the first device is associated with a group of devices (e.g., not necessarily the same as the one or more devices (e.g., which are smart speakers)) that includes a particular type of device (e.g., a home media hub), the electronic device displays, on the display device, one or more of an option (e.g., 834) to enable display, by the particular type of device, an indication of a user account associated with the first device and an option (e.g., 832) to disable display, by the particular type of device, the indication of the user account associated with the first device.

In some embodiments, in response to receiving a request to log in to a first account on the first device, and in accordance with a determination that a second device (e.g., smart speaker, home media hub) of the one or more devices is logged in to an account other than the first account, the electronic device displays a prompt (e.g., 891A) that includes one or more of an option (e.g., 892A) to log the second device into the first account and an option (e.g., 893A) to keep the second device logged in to the account other than the first account. In some embodiments, in accordance with receiving user input selection of the option to log the second device into the first account, the electronic device causes the second device to log in to the first account. In some embodiments, the first and second devices are both logged in to a second account, and remain both logged in to the second account subsequent to causing the second device to log in to the first account. For example, the first account can be a media account and the second account can be cloud based service (e.g., storage) account, which remains logged in to on both devise despite a change in the first account on one of the devices. In some embodiments, in accordance with receiving user input selection of the option to keep the second device logged into the account other than the first account, the electronic device forgoes causing the second device to log in to the first account.

In some embodiments, the first device is logged in to a second account. In some embodiments, a third device of the set of devices is logged in to a fourth account. In some embodiments, the second account is associated with a group of accounts (e.g., smart devices in a user's home that are linked together (e.g., by an application for controlling such devices)). In some embodiments, in accordance with a determination that the fourth account is not associated with the group of accounts, the electronic device displays, on the display device, a prompt (e.g., 811B) that includes an option (e.g., 812B) to invite the fourth account to the group of accounts. In some embodiments, the prompt includes an option (e.g., 813B) to use the fourth account as a default account (e.g., an account used for outputting information in response to requests that do not otherwise match a voice profile associated with a respective account). In some embodiments, selection (e.g., 816B) of the default account option causes display of a prompt (e.g., 830B) to log in to the account (e.g., to enter login credentials).

In some embodiments, in accordance with a determination that the fourth account is associated with the group of accounts, the electronic device forgoes displaying, on the display device, the prompt that includes the option to invite the fourth account to the group of accounts. In some embodiments, subsequent to displaying the prompt that includes the option to invite the fourth account to the group of accounts, the electronic device receives input (e.g., 815B) representing selection of the option to invite the fourth account to the group of accounts. In some embodiments, in response to receiving the input representing selection of the option to invite the fourth account to the group of accounts, the electronic device causes an invitation to the group of accounts to be sent to the fourth account.

Note that details of the processes described above with respect to method 900 (e.g., FIG. 9 are also applicable in an analogous manner to the methods described below. For example, method 1100 optionally includes one or more of the characteristics of the various methods described above with reference to method 900. For example, after performing a configuration process for a user account with respect to one or more devices, settings of the user account can be subsequently configured for the one or more devices. For brevity, these details are not repeated below.

FIGS. 10A-10M illustrate exemplary user interfaces for configuring user accounts, in accordance with some embodiments. The user interfaces in these figures are used to illustrate the processes described below, including the processes in FIG. 11.

Generally, user interfaces described with reference to FIGS. 10A-10M can be employed to configure (e.g., edit) settings of one or more user accounts using an electronic device, such as electronic device 1000. As will be described in more detail, in some examples, settings configured in this manner include personalization settings including one or more user preferences and non-personalization settings including one or more user permissions.

Figure 10A:
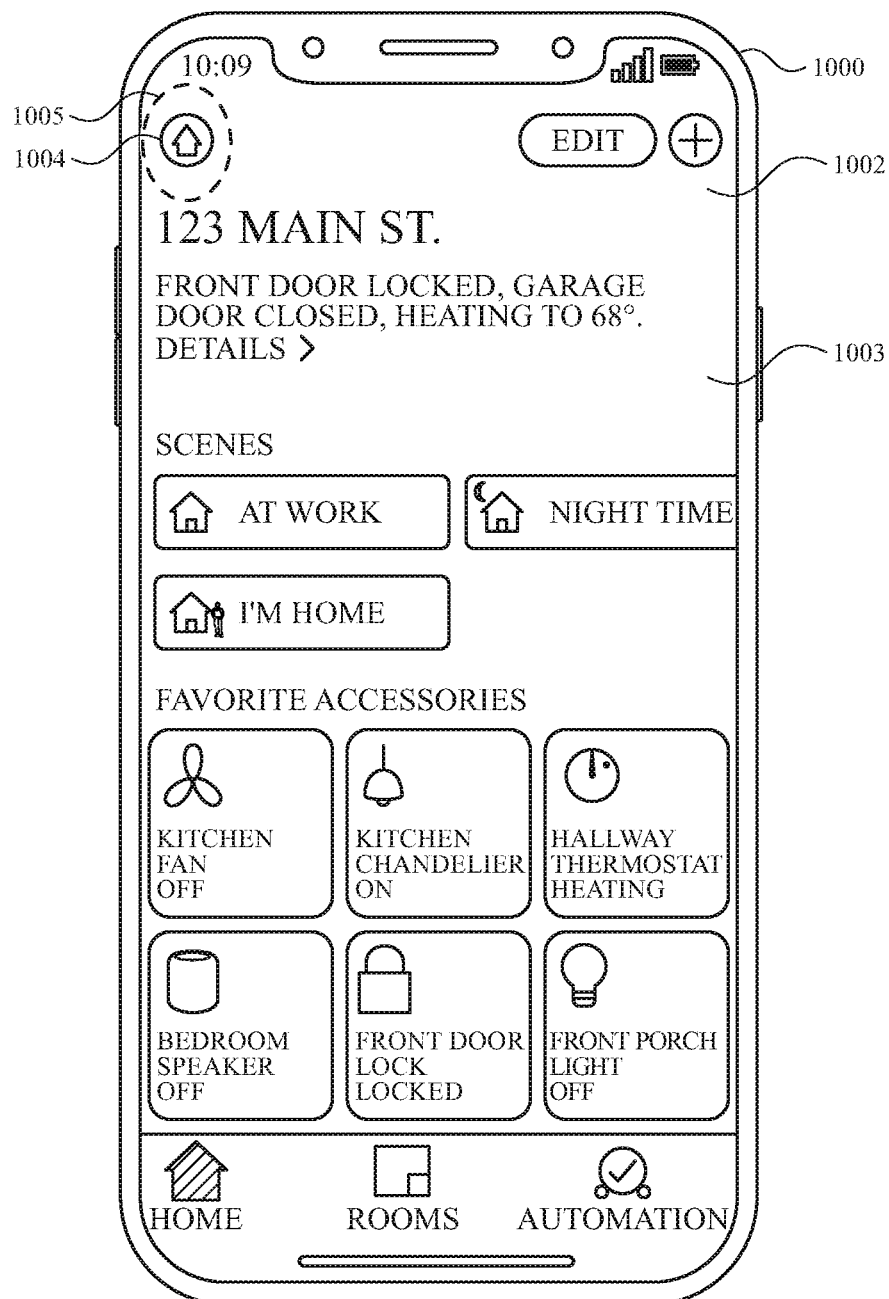
FIGS. 10A-10M illustrate exemplary user interfaces for configuring user accounts, in accordance with some embodiments.
Figure 11:
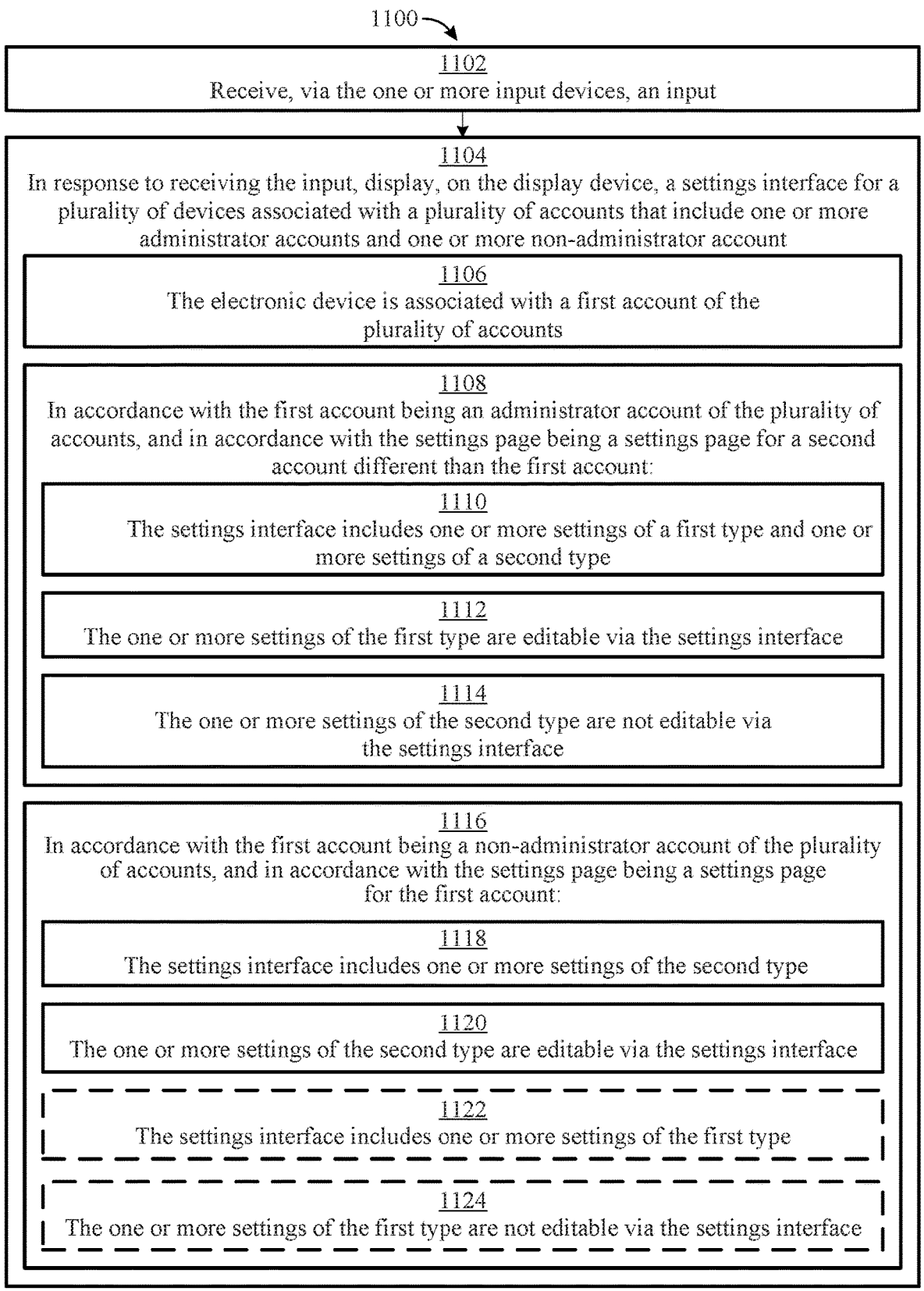
FIG. 11 is a flow diagram illustrating a process for configuring user accounts, in accordance with some embodiments.

FIG. 10A illustrates home interface 1003 for managing a set of controllable external devices associated with a location on display 1002 of electronic device 1000. In some examples, the home interface 1003 is an interface of a home control application.

Figure 10B:
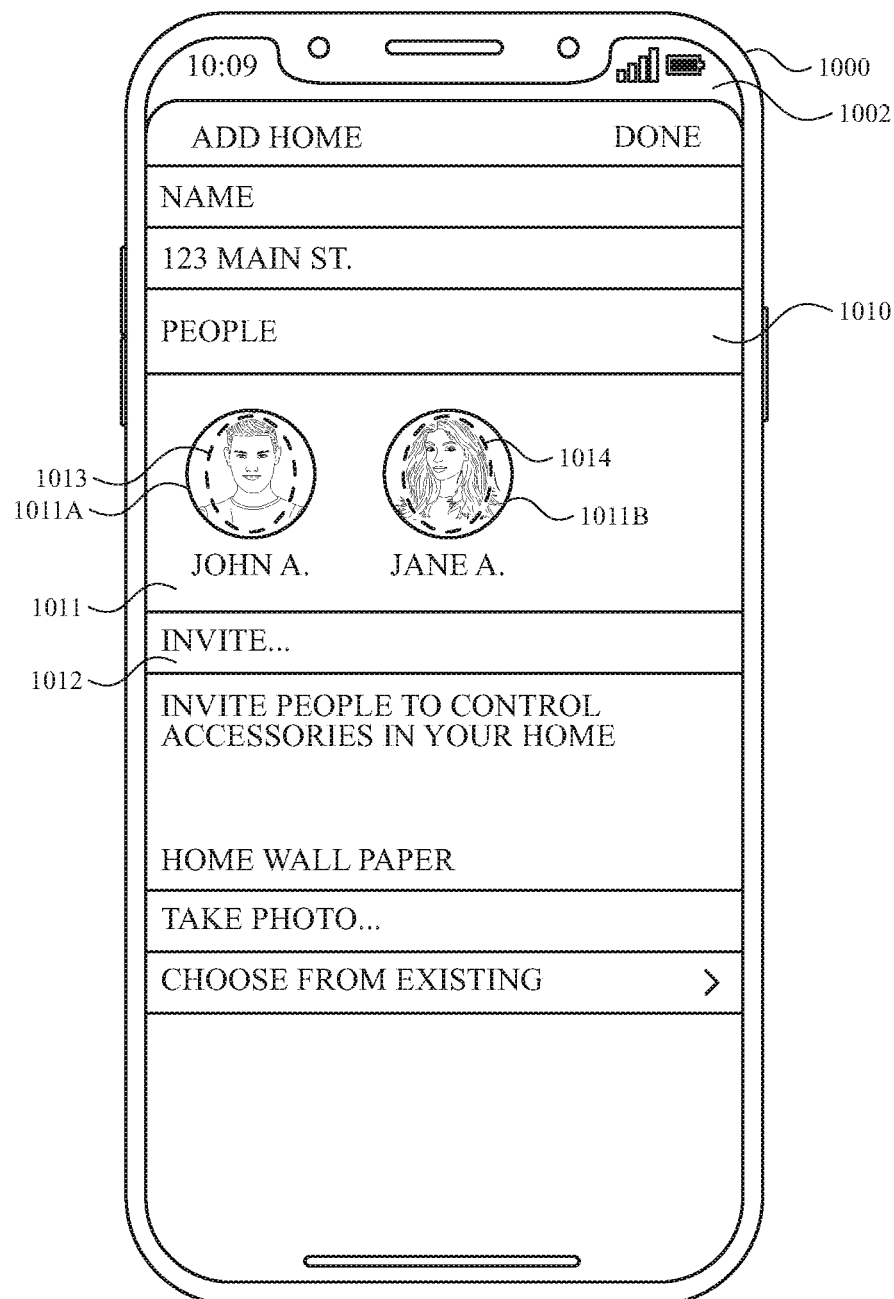

Home interface 1003 includes a home affordance 834A which when selected causes the electronic device 800 to display an interface in which the user can view and/or edit a set of user accounts of a location profile. For example, while displaying the configuration interface 1003, the electronic device 1000 detects selection of the home affordance 1004. As shown in FIG. 10A, selection of the home affordance 1004 is, optionally, a tap gesture 1005. In response to selection of the home affordance 1004, the electronic device 1000 displays (e.g., replaces display of the home interface 1003 with), on the display 1002, home interface 1010, as shown in FIG. 10B.

Home interface 1010 includes user affordances 1011, each of which corresponds to a respective user account in some examples. By way of example, user affordance 1011A corresponds to a user account for a user John Appleseed ("John A") and user affordance 1011B corresponds to a user account for a user Jane Appleseed ("Jane A"). In the example illustrated in FIG. 10B, the user account for user John Appleseed is an administrator account, and the user account for user Jane Appleseed is not an administrator account. Home interface 1010 further includes invite affordance 1012 which, when selected, allows the user to invite one or more other uses to the location profile.

In some examples, a user of an administrator account is authorized to configure both personalization settings and non-personalization settings for their own account, and configure non-personalization settings for other user accounts. As another example, a user of a non-administrator account is authorized to configure only personalization settings for their own user account.

Figure 10C:
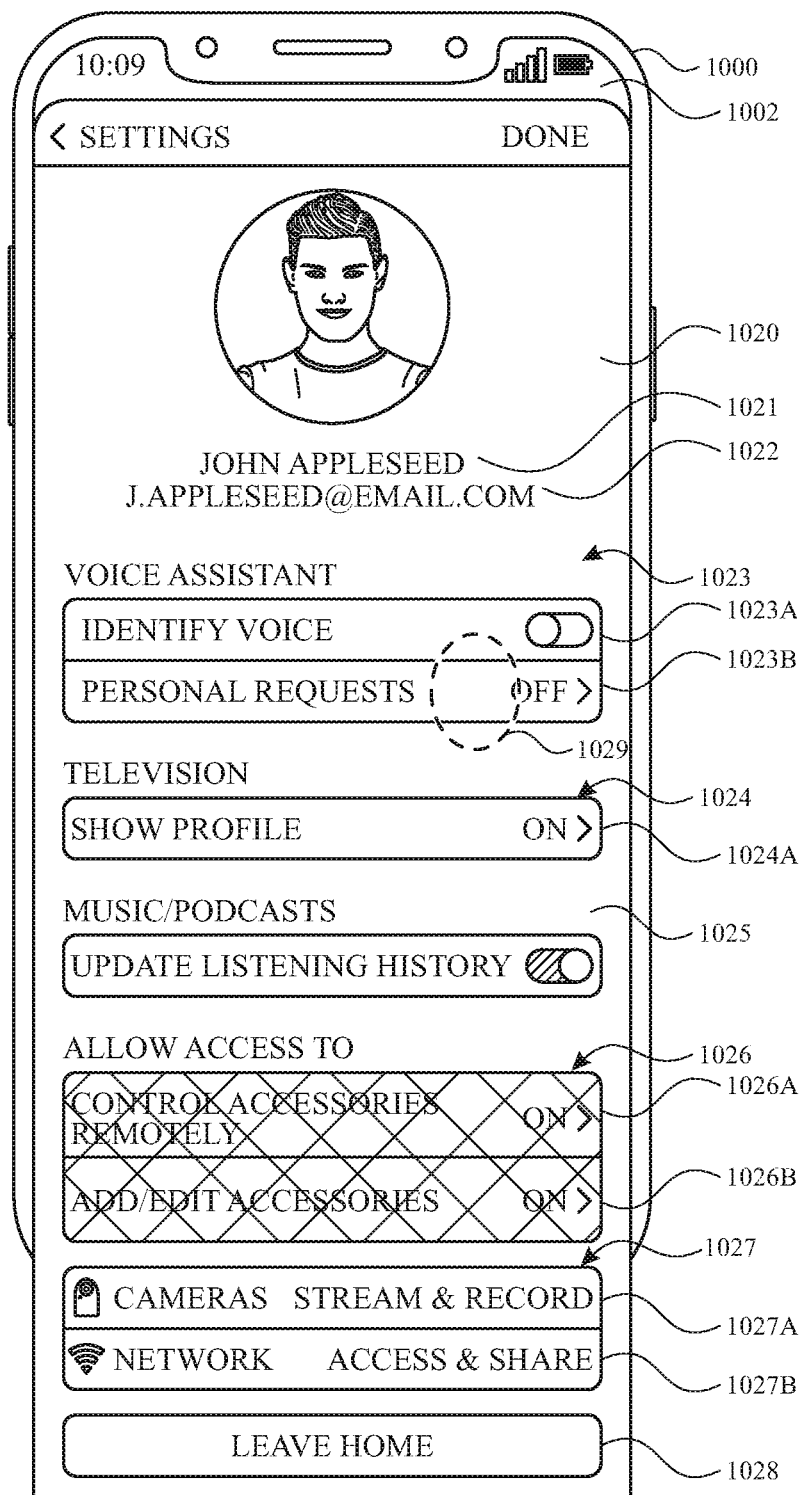

For example, while displaying the home interface 1010, the electronic device 1000 detects selection of user affordance 1011A. As shown in FIG. 10B, selection of the user affordance 1011A is, optionally, a tap gesture 1013. In some examples, in response to selection of the user affordance 1011A, the electronic device 800 displays (e.g., replaces display of the home interface 1010 with), on the display 802, user account interface 1020 for the user account of user John Appleseed, as shown in FIG. 10C (recall that the selected user affordance 841AB corresponds to the user John Appleseed).

User account interface 1020 includes user indicator 1021, user identification 1022, voice features portion 1023, profile portion 1024, playback portion 1025, permissions portion 1026, permissions portion 1027, and exit affordance 1028. User indicator 1021 indicates a name of a user associated with the user account for the user account interface 1020. User identification 1021 indicates information associated with the user (e.g., email address for the user). In some examples, the user identification 1021 serves as a unique identifier (e.g., username) of the user account.

Voice features portion 1023 includes voice identification element 1023A and personal requests affordance 1023B. Voice identification element 1023A includes a toggle affordance which represents a parameter indicating whether a voice identification feature is enabled for the user account. In some examples, selection of the toggle affordance of the voice identification element 1023A causes the value of the parameter to change (e.g., off to on, on to off). Personal requests affordance 1023B, when selected, causes the electronic device 1000 to display one or more user interfaces (e.g., interface 1070 of FIG. 10H) through which a user can view and/or adjust one or more settings associated with a personal requests feature. As an example, a user can selectively enable a personal requests feature of the user account for each device of a set of devices associated with the location. As another example, a user can selectively enable a requirement that the user be authenticated prior to the providing secure and/or private information in response to a request. A user can be authenticated, for instance, in response to detected proximity of the electronic device 1000 and/or matching a voice input to a voice profile for the user.

Profile portion 1024 includes profile affordance 1024A, which when selected, causes the electronic device 1000 to display one or more user interfaces (e.g., interface 1080 of FIG. 10I) through which a user can view and/or adjust one or more settings associated with a profile feature. As an example, a user can selectively enable a profile feature on each of a set of devices (e.g., media play back devices) associated with the location. In this manner, one or more other users can access content of the user while using devices for which the profile feature is enabled for the user account.

Playback portion 1025 includes a toggle affordance which represents a parameter indicating whether listening history of the user is updated in response to user requests, for instance, as described with reference to FIGS. 6A-6L.

Permissions portion 1026 includes remote access affordance 1026A, which when selected, causes the electronic device 1000 to display one or more user interfaces (e.g., interface 1090 of FIG. 10J) through which a user can view and/or configure one or more settings associated with a remote access feature. As an example, a user can selectively enable whether a user is permitted to remotely control accessories, for instance, using the electronic device. Permissions portion further includes accessories affordance 1026B, which when selected, causes the electronic device 1000 to display one or more user interfaces (e.g., interface 1000A of FIG. 10K) through which a user can view and/or configure settings for adding and/or configuring devices associated with the location.

Permissions portion 1027 includes camera affordance 1027A, which when selected, causes the electronic device 1000 to display one or more user interfaces (e.g., interface 1010A of FIG. 10L) through which a user can view and/or configure settings associated with video streaming. As an example, a user can configure permissions for viewing live video, viewing recorded, or a combination thereof. Permissions portion 1027 includes network affordance 1027B, which when selected, causes the electronic device 1000 to display one or more user interfaces (e.g., interface 1020A of FIG. 10M) through which a user can view and/or configure settings associated with network sharing. As an example, a user can select from a set of permission levels for accessing a network and sharing on a network, or a combination thereof.

As shown in FIG. 10C, in some examples, a portion of the user account interface 1020 may not be displayed on the display 1002. Accordingly, in some examples, a user can provide a set of inputs, such as a swipe gesture, to reveal portions of the user interface 1020 not otherwise displayed.

In some examples, an administrator cannot configure one or more settings for a user account with administrator permissions. For example, because the user account for John Appleseed is an administrator account, settings corresponding to permissions portion 1026 cannot be configured. An administrator cannot, for instance, disable permissions for controlling accessories remotely or adding and/or editing accessories. Accordingly. both affordances 1026A,B of the permissions portion 1026 are depicted as being non-configurable.

Figure 10D:
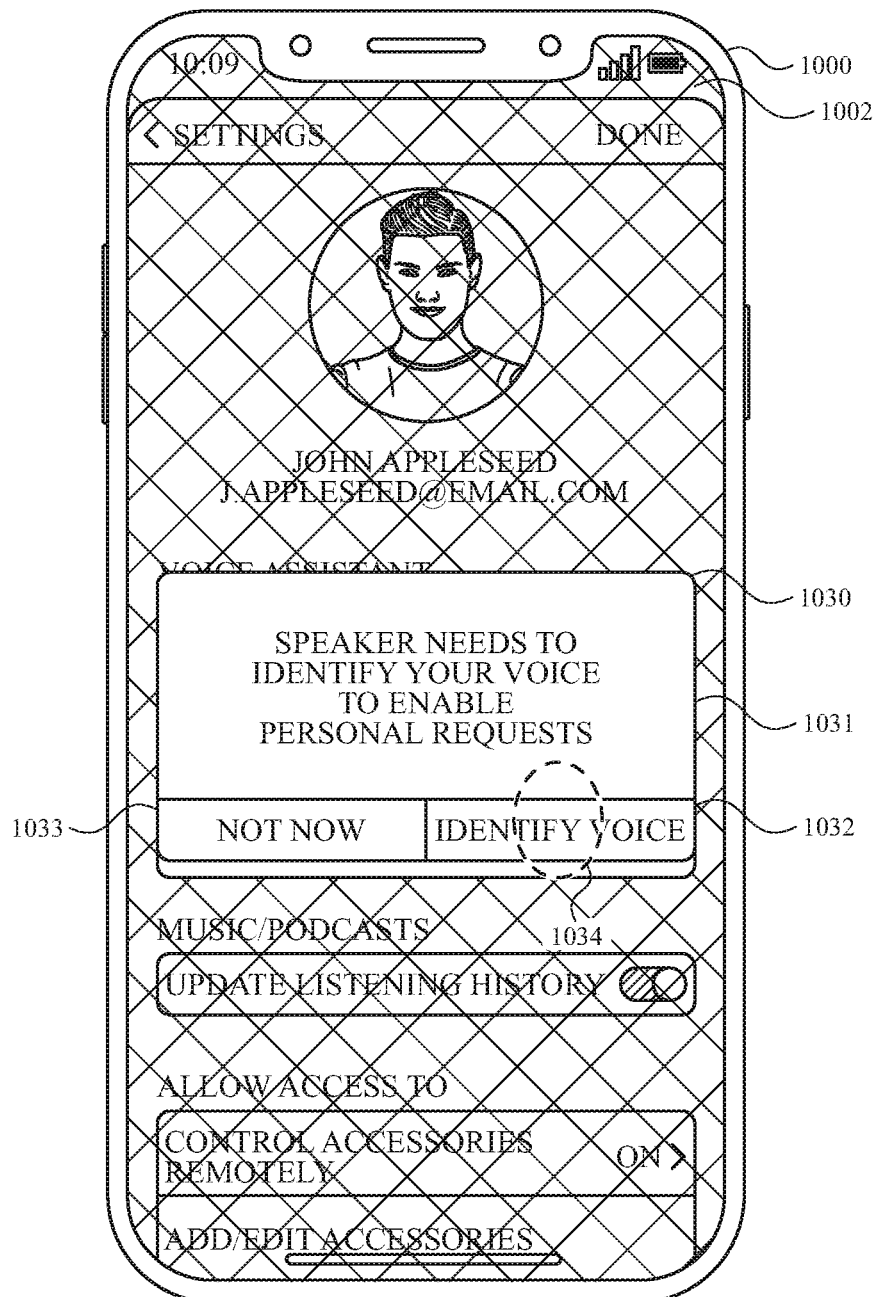

As described, in some examples, one or more features (e.g., personal requests feature) can be configured only if another feature (e.g., voice identification feature) is enabled. By way of example, with reference to FIG. 10C, the electronic device detects selection of personal requests affordance 1023B while a voice identification feature for the user account of the user account interface 1020 is not enabled (e.g., as indicated by a toggle affordance of voice identification element 1023A). As shown in FIG. 10C, selection of the user affordance 1023B is, optionally, a tap gesture 1029. In some examples, if a voice identification feature is disabled, in response to selection of the user affordance 1023B, the electronic device 800 displays, on the display 802, feature enable interface 1030, as shown in FIG. 10D. In some examples, the feature enable interface is overlaid on user interface 1020.

Feature enable interface 1030 includes indicator 1031, feature enable affordance 1032, and decline affordance 1033. Indicator 1031 indicates that, for a personal requests feature to be enabled, a voice identification feature must be first enabled. Decline affordance 1033, when selected, indicates to the electronic device 1000 that the user does not intend to enable a voice identification feature for the user account. Thus, in response to selection of the decline affordance 1033, the electronic device 1000 does not enable a voice identification feature or a personal requests feature and ceases display of the feature enable interface 1030. Feature enable affordance 1032, when selected, causes the electronic device 1000 to display a user interface for performing a configuration process.

Figure 10E:
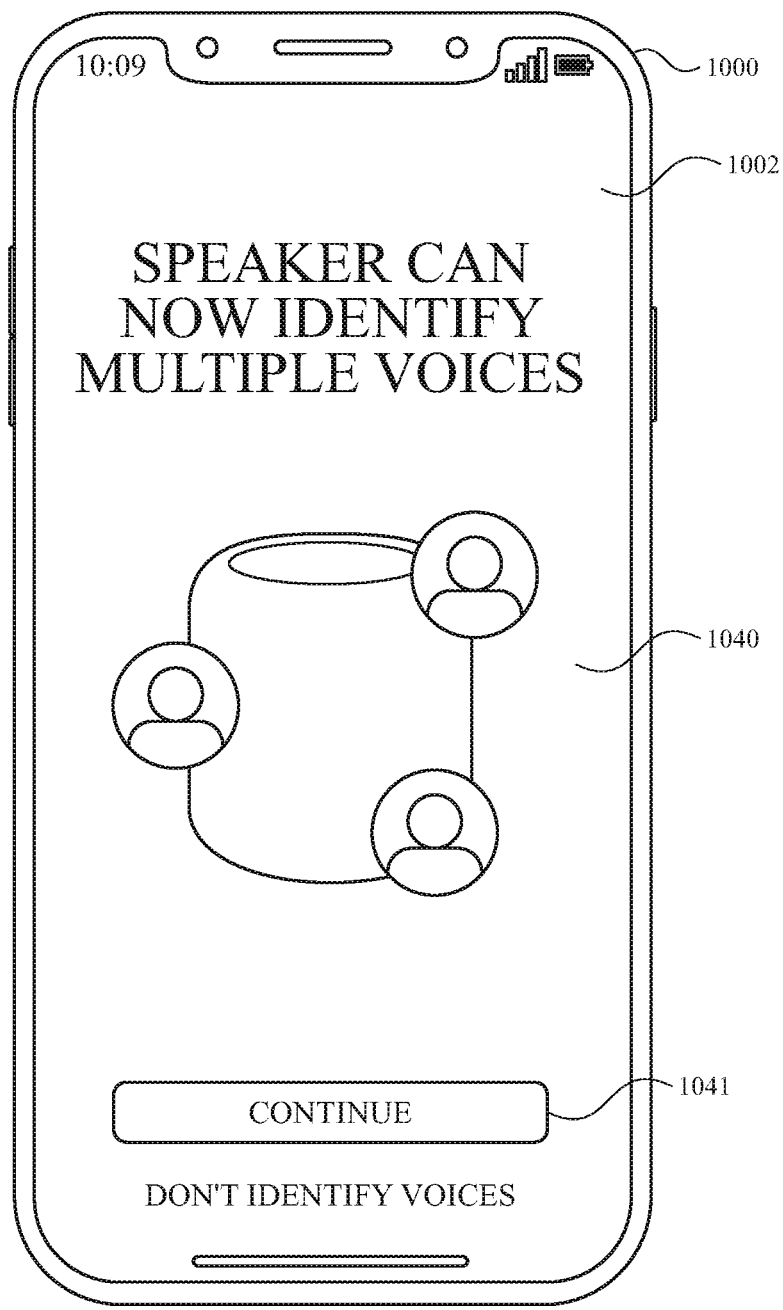

As an example, while displaying the feature enable interface 1030, the electronic device detects selection of the feature enable affordance 1033. As shown in FIG. 10D, selection of the feature enable affordance 1033 is, optionally, a tap gesture 1034. In response to selection of feature enable affordance 1034, the electronic device 1000 displays (e.g., replaces display of the feature enable interface 1030 with), on the display 1002, configuration interface 1040 including a continue affordance 1041, as shown in FIG. 10E. In some examples, configuration interface 1040 is substantially the same as configuration interface 820 of FIG. 8B. Accordingly, in response to selection of the continue affordance 1041, the electronic device 800 initiates a configuration process for configuring the voice identification feature, such as the configuration process described with respect to FIGS. 8A-8M.

In some examples, a user of a first user account cannot configure one or more settings of a second user account regardless of the permissions assigned to the first user account. By way of example, a user account having administrator permission can be permitted to configure only non-personalization settings for other user accounts.

Figure 10F:
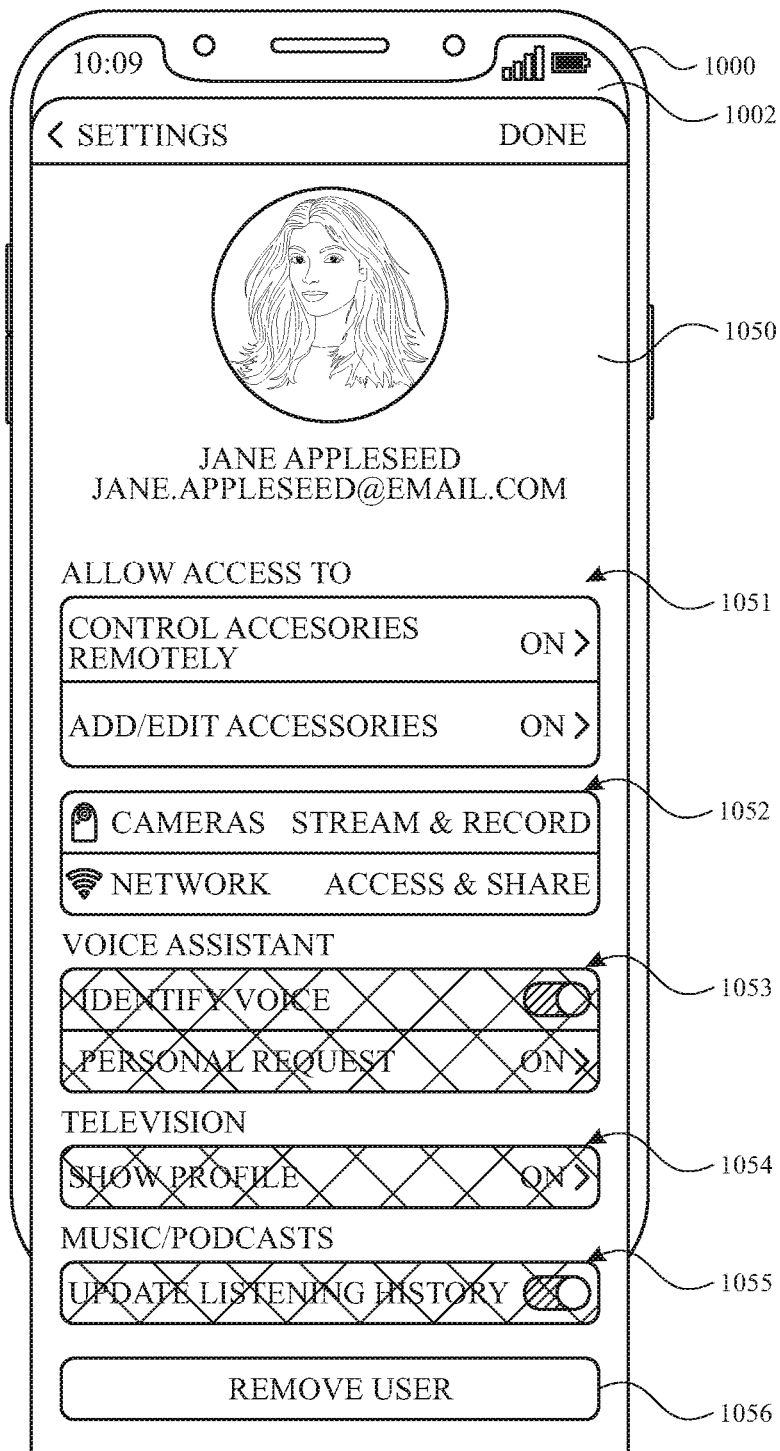

FIG. 10F illustrates a scenario in which a user of a first user account having administrator permissions (e.g., "John Appleseed") views a user account interface 1050 for a second user account of another user (e.g., "Jane Appleseed"). The user account interface 1050 can be viewed, for instance, in response to selection of a user affordance 1011B (e.g., input 1014 of FIG. 10B) corresponding to the user account. As shown, personalization settings 1053, 1054, 1055, such as those settings directed to enabling multi-user features (e.g. voice identification feature, profile feature) are shown as non-configurable, and non-personalization settings 1051, 1052, such as those directed to user permissions (e.g., remote access permissions, streaming permissions) are shown as configurable. Additionally, a user having administrator permissions further can remove the second user account from the location profile using remove affordance 1056.

Figure 10G:
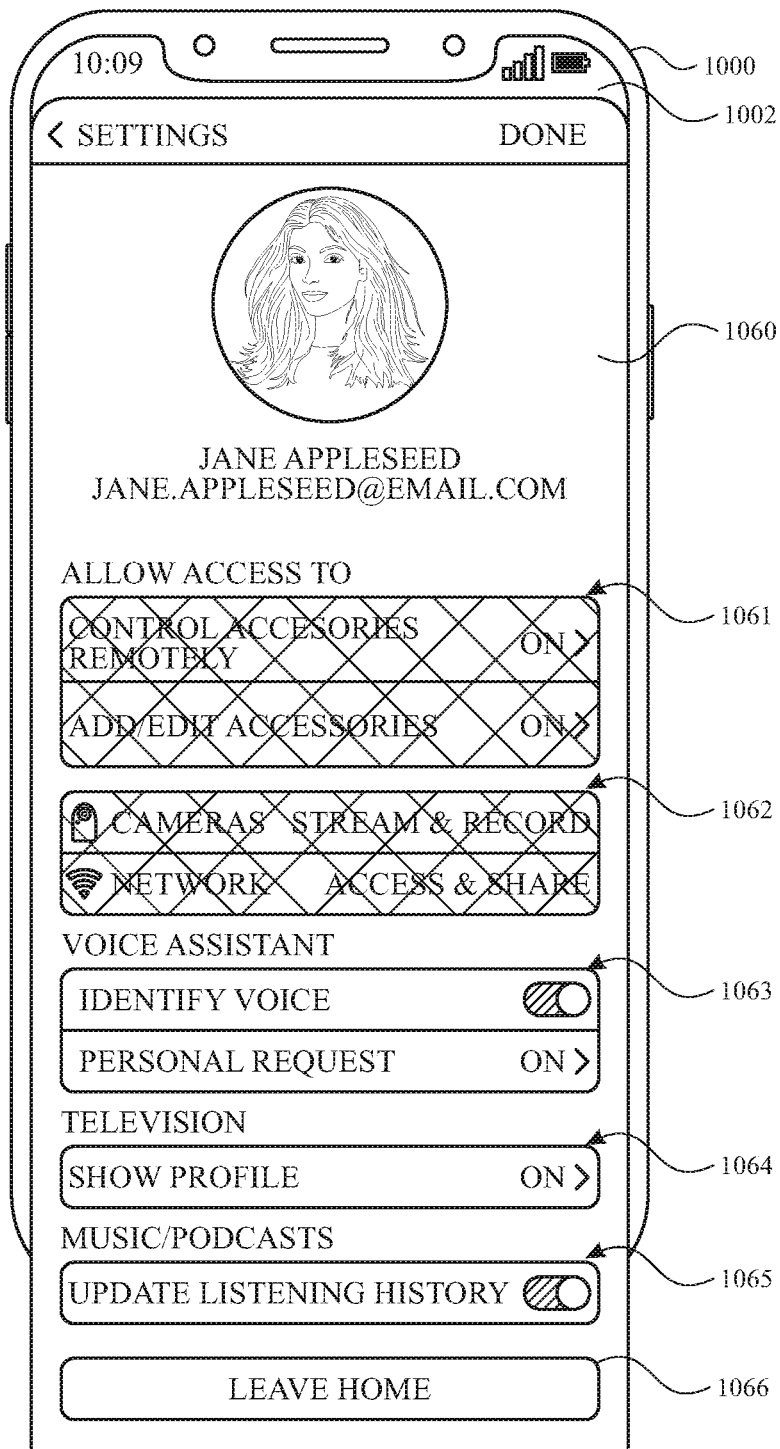
Figure 10H:
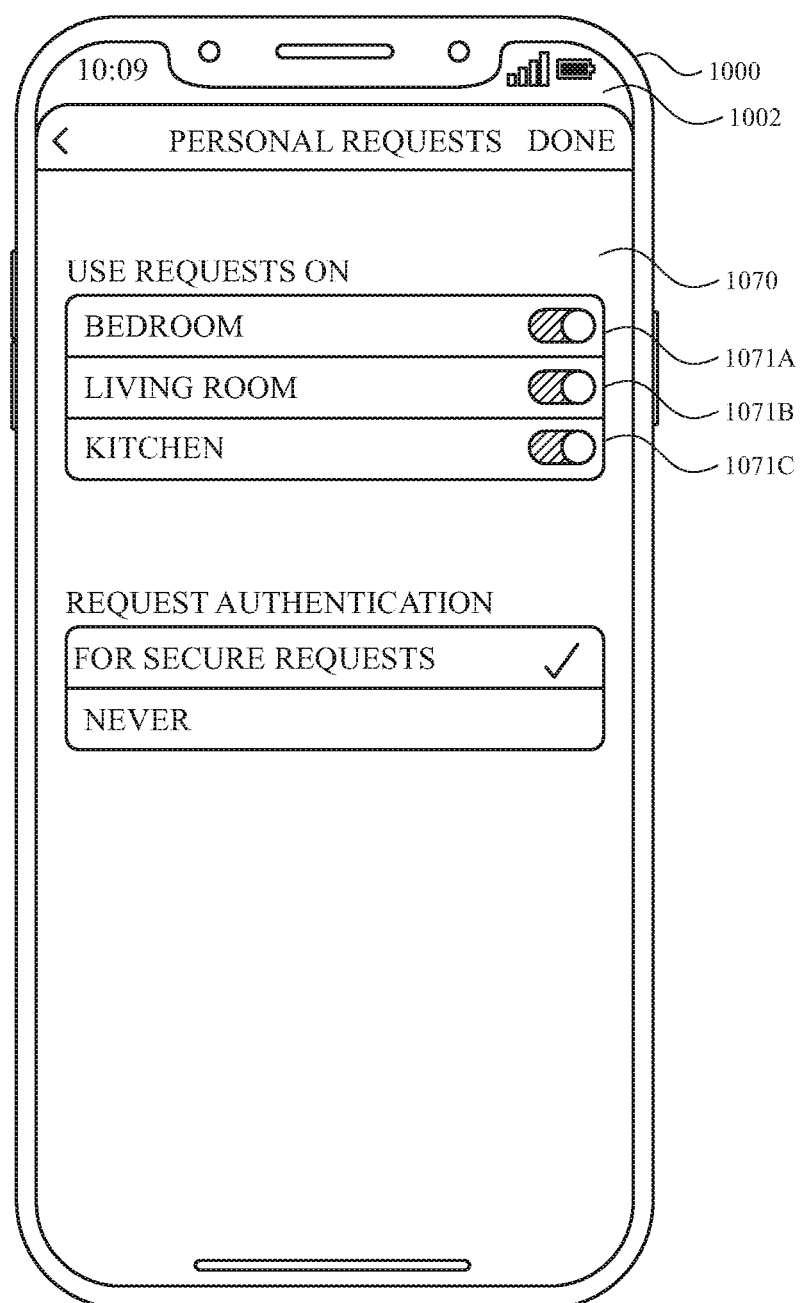
Figure 10I:
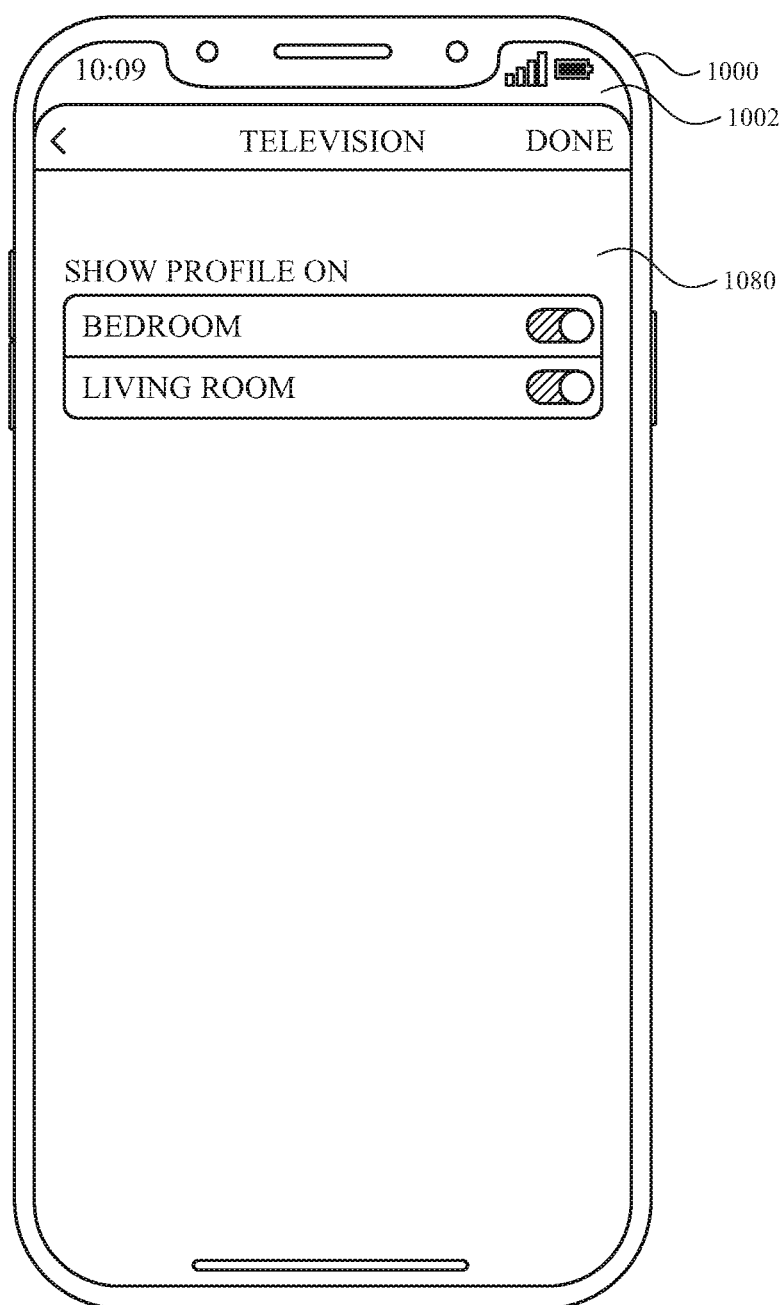
Figure 10J:
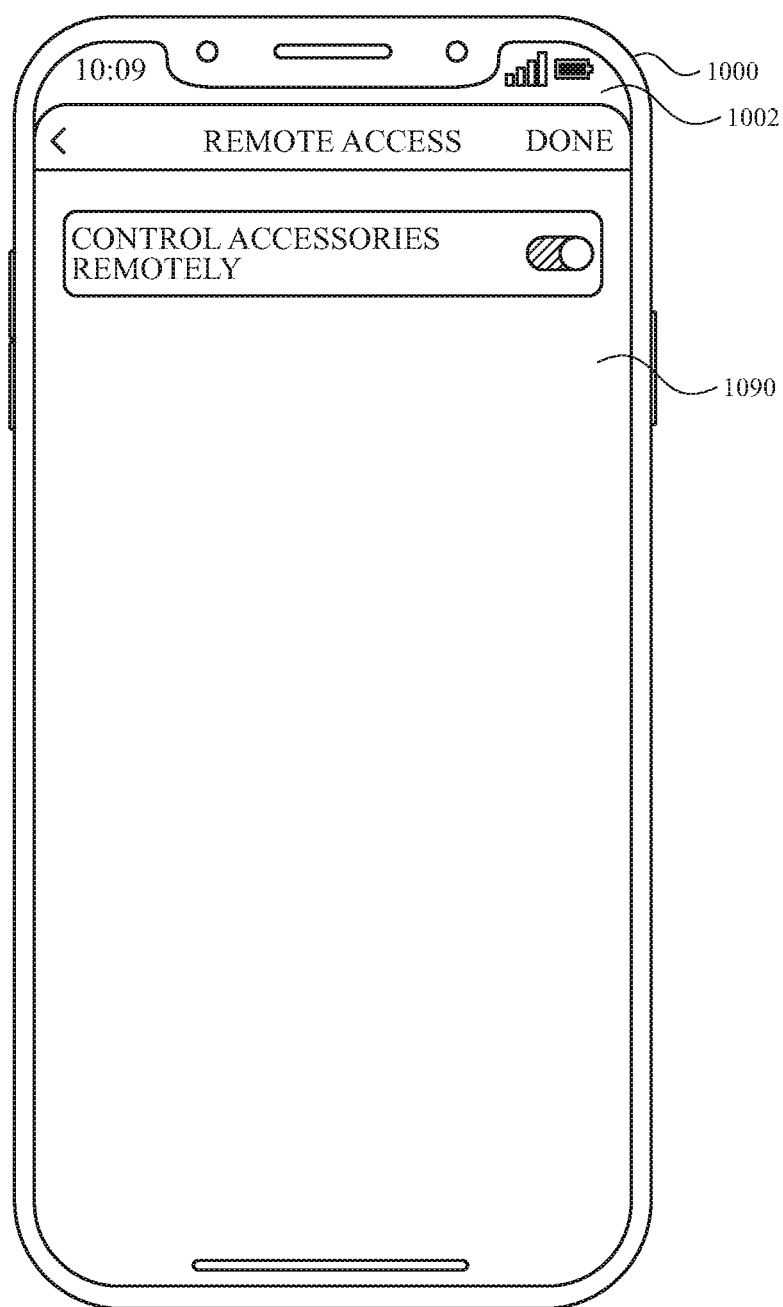
Figure 10K:
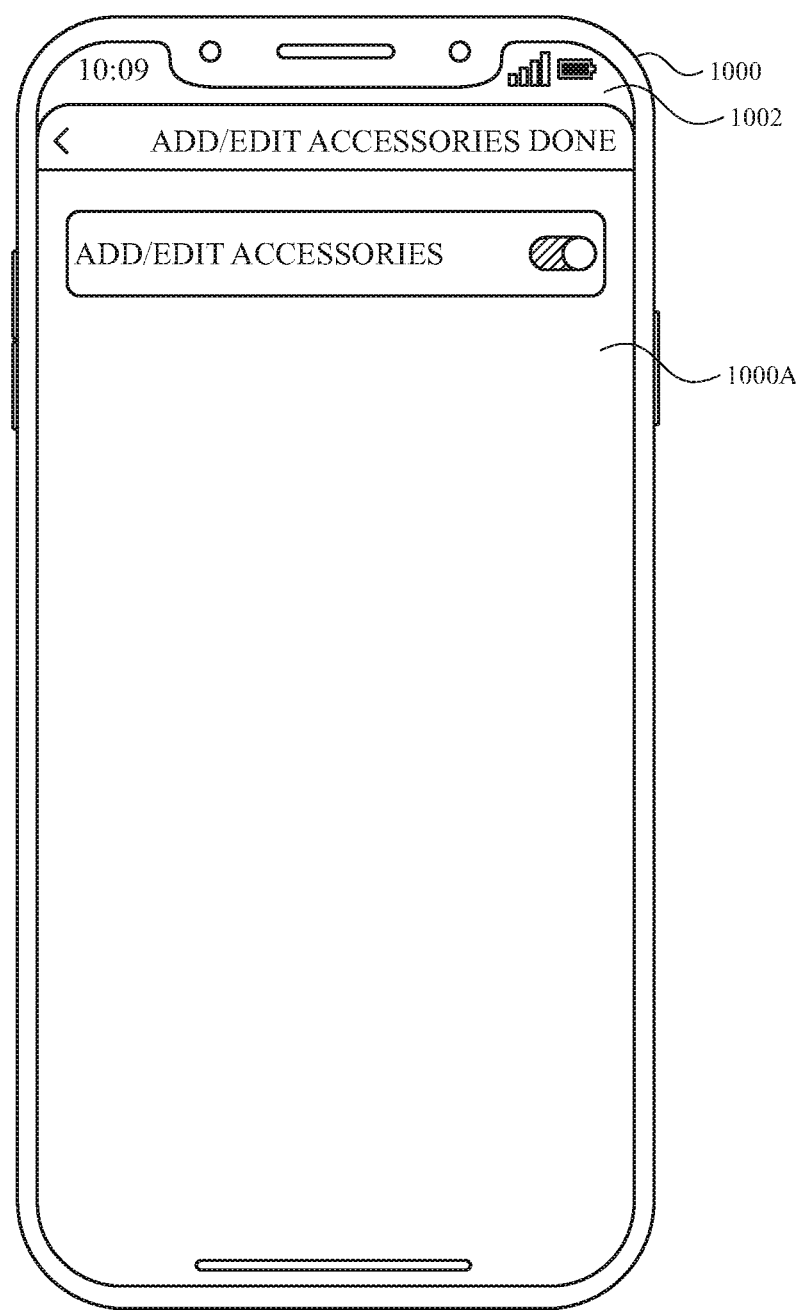
Figure 10L:
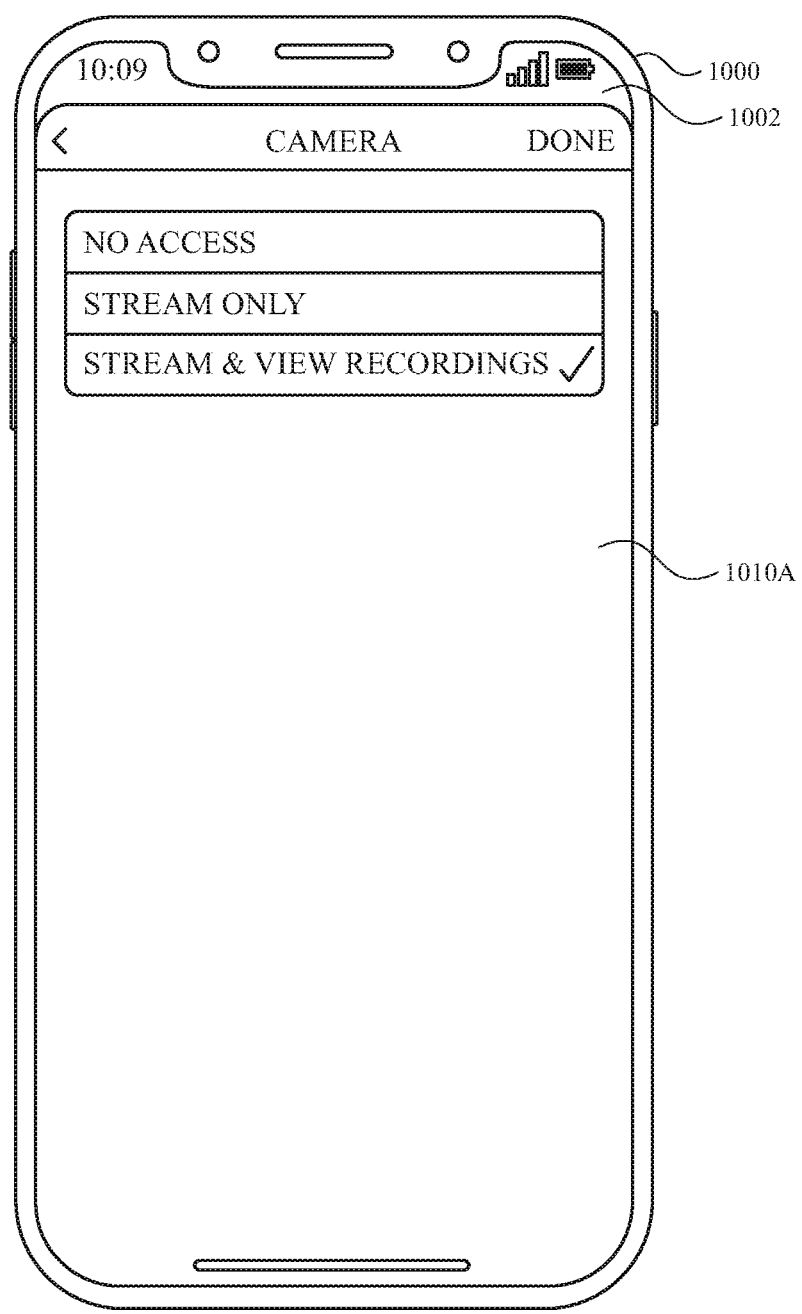
Figure 10M:
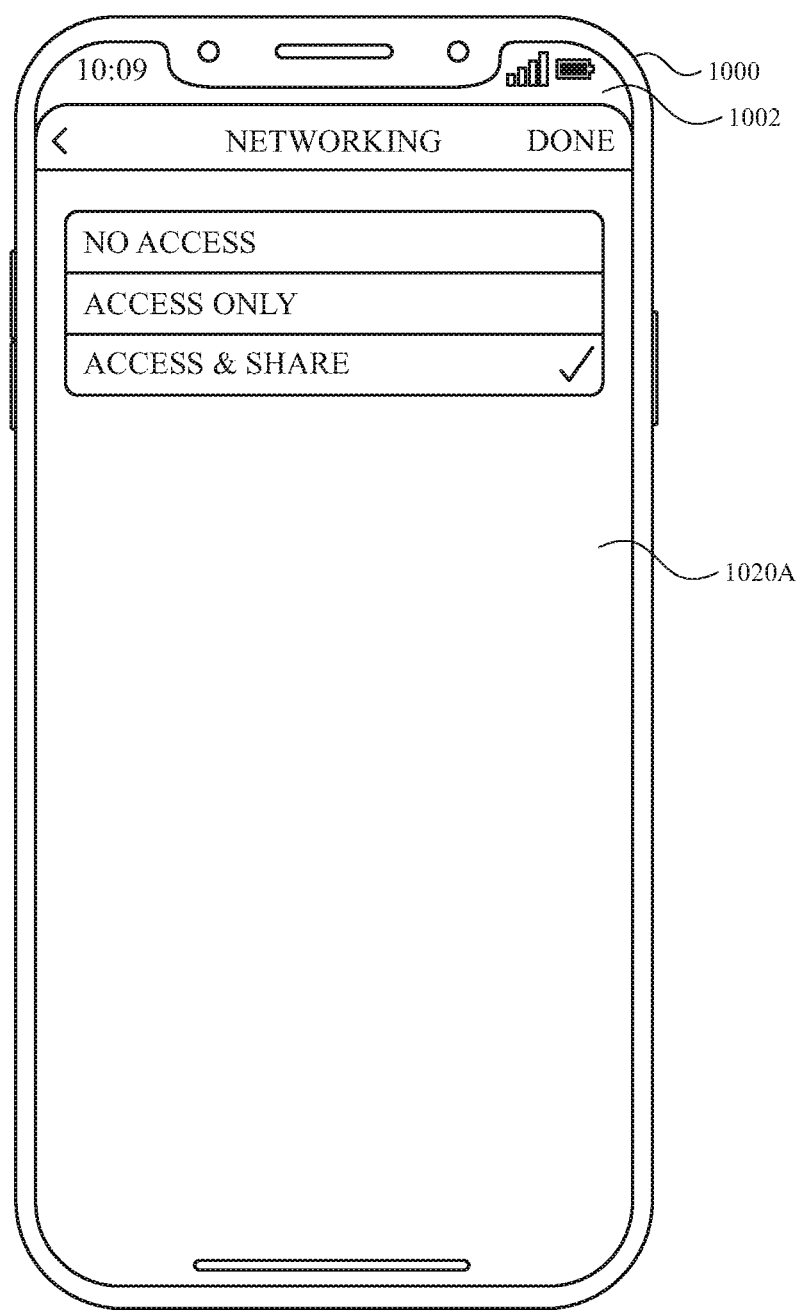

FIG. 10G illustrates a scenario in which a user associated with a user account not having administrator permissions (e.g., "Jane Appleseed") views their own user account. As shown, personalization settings 1063, 1064, 1065, such as those settings directed to enabling multi-user features (e.g. voice identification feature, profile feature) are shown as configurable (recall that these settings are personal to the user account), and non-personalization settings 1061, 1062, such as those directed to user permissions (e.g., remote access permissions, streaming permissions) are shown as non-configurable (recall that the user account does not have administrator permissions). In some examples, a user associated with a user account not having administrator permissions further can remove the user account from the location profile using remove affordance 1066.

FIG. 11 is a flow diagram illustrating a method for configuring user accounts using an electronic device (e.g., mobile device) in accordance with some embodiments. Method 1100 is performed at a device (e.g., 100, 300, 500, 580, 600) with a display device and one or more input devices. Some operations in method 1100 are, optionally, combined, the orders of some operations are, optionally, changed, and some operations are, optionally, omitted.

As described below, method 1100 provides an intuitive way for configuring user accounts using an electronic device. The method reduces the cognitive burden on a user for configuring user accounts using an electronic device, thereby creating a more efficient human-machine interface. For example, displaying a settings interface in which settings are selectively editable based on the user account associated with the settings interface and a user account associated with the electronic device allows a user to efficiently and intuitively edit settings of the settings interface. By way of example, the electronic device can allow a user to edit personalization settings only for a user account of a user and non-personalization settings if the user is an administrator. Limiting the number of editable settings in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, an electronic device receives (1102), via the one or more input devices, an input (e.g., 1014) (e.g., selection of a settings affordance).

In some embodiments, in response to receiving the input, the electronic device displays (1104), on the display device, a settings interface (e.g., 1050) for a plurality of devices (e.g., smart devices) associated with a plurality of accounts (e.g., members of a smart home) that include one or more administrator accounts (account for 1011A) and one or more non-administrator accounts (account for 1011B). In some embodiments, the electronic device (e.g., 1000) is associated (1106) with (e.g., logged into) a first account of the plurality of accounts.

In some embodiments, in accordance (1108) with the first account being an administrator account of the plurality of accounts, and in accordance with the settings interface being a settings interface for a second account different than the first account (e.g., an administrator viewing another user's page), the settings interface includes (1110) one or more settings (e.g., 1051, 1052, 1056) of a first type (e.g., non-personalization settings, such as control of camera devices, and ability to share network credentials) and one or more settings of a second type (e.g., 1053, 1054, 1055) (e.g., personalization settings, such as enabling Voice ID, personal requests, whether an account will be displayed on smart device, and listening history updating). In some embodiments, in accordance with the first account being an administrator account of the plurality of accounts, and in accordance with the settings interface being a settings interface for a second account different than the first account (e.g., an administrator viewing another user's page), the one or more settings of the first type are editable via the settings interface (1112). In some embodiments, in accordance with the first account being an administrator account of the plurality of accounts, and in accordance with the settings interface being a settings interface for a second account different than the first account (e.g., an administrator viewing another user's page), the one or more settings of the second type are not editable via the settings interface (1114). In some embodiments, in accordance (1116) with the first account being a non-administrator account of the plurality of accounts, and in accordance with the settings interface (e.g., 1060) being a settings interface for the first account (e.g., a non-administrator viewing their own settings interface), the settings interface includes one or more settings (e.g., 1063, 1064, 1065) of the second type (1118) (e.g., personalization settings). In some embodiments, in accordance with the first account being a non-administrator account of the plurality of accounts, and in accordance with the settings interface being a settings interface for the first account (e.g., a non-administrator viewing their own settings interface), the one or more settings of the second type are editable via the settings interface (1120).

In some embodiments, in accordance with the first account being a non-administrator account of the plurality of accounts, and in accordance with the settings interface being a settings interface for the first account (e.g., a non-administrator viewing their own settings interface), the settings interface includes one or more settings of the first type (1122) (e.g., non-personalization settings). In some embodiments, in accordance with the first account being a non-administrator account of the plurality of accounts, and in accordance with the settings interface being a settings interface for the first account (e.g., a non-administrator viewing their own settings interface), the one or more settings of the first type are not editable via the settings interface (1124).

In some embodiments, the one or more settings of the second type include an option (e.g., 1065) to enable updating of data (e.g., listening history) associated with the first account based on user input requests (e.g., voice input requests) to output content (e.g., to play music) that are received at one or more of the plurality of devices.

In some embodiments, the one or more settings of the second type (e.g., 1063) include an option to enable a voice identification feature on one or more of the plurality of devices.

In some embodiments, the one or more settings of the second type (e.g., 1063) include an option to enable output of private information associated with the first account in response to user input requests to output private information from the first account, received at one or more of the plurality of devices. Including an option in the settings of the second type to enable output of private information allows a user to configure a feature supported by a device such that the user can efficiently and intuitively request output of the private information from a device. Providing information in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the electronic device receives a first set of one or more inputs associated with the option to enable output of private information associated with the first account (e.g., selection of one or more devices (at an interface (e.g., 1070) displayed) subsequent receiving selection of a "Personal Requests" affordance displayed at the settings interface; or selecting the devices directly at the settings interface). In some embodiments, in response to receiving the first set of one or more inputs, the electronic device displays, on the display device, one or more of: one or more options (e.g., 1071A, 1071B, 1071C) for selecting one or more devices, of the plurality of devices, on which to enable output of private information associated with the first account, and one or more options for requiring authentication in response to user input requests to output private information from the first account.

In some embodiments, in accordance with a determination that a first feature (e.g., voice identification) (e.g., of the second type (e.g., personalization setting)) is enabled, the electronic device displays the option, to enable output of private information associated with the first account in response to user input requests to output private information from the first account. In some embodiments, in accordance with a determination that the first feature (e.g., voice identification) is disabled, the electronic device forgoes displaying the option (e.g., option is hidden, obscured, or not displayed), to enable output of private information associated with the first account in response to user input requests to output private information from the first account. For example, the option (e.g., to output private information in response to voice input) is displayed only if the first feature (e.g., a voice identification feature) is enabled.

In some embodiments, the second set of one or more inputs represents a request to enable output of private information associated with the first account in response to user input requests to output private information from the first account, received at one or more of the plurality of devices. In some embodiments, in response to detecting a second set of one or more inputs associated with the option to enable output of private information, in accordance with a determination that a second feature (e.g., voice identification) is disabled, the electronic device displays, on the display device, a prompt (e.g., 1030) to enable the second feature. For example, the prompt includes an option (e.g., 1032) (e.g., affordance) to enable the second feature (e.g., voice identification) and/or an option (e.g., 1033) to disable the first feature (e.g., output of the private information in response to requests). If the second feature is required to be enabled in order to use the first feature, such a prompt provides the user with the relevant information to make the decision about whether to disable the desired first feature or not. In some embodiments, in response to detecting a second set of one or more inputs associated with the option to enable output of private information in accordance with a determination that the second feature (e.g., voice identification) is enabled, the electronic device forgoes displaying, on the display device, the prompt to enable the second feature.

In some embodiments, the electronic device receives a third set of one or more inputs (e.g., 1034) associated with the prompt to enable the second setting. In some embodiments, in response to receiving the third set of one or more inputs associated with the prompt to enable the second setting, the electronic device initiates a process for configuring the second feature that includes displaying an interface (e.g., 1040) for configuring the second feature.

In some embodiments, the electronic device is associated with (e.g., connected to, included a group of devices that also includes) a particular type of device (e.g., a home media hub) (e.g., different than the electronic device). In some embodiments, the one or more settings of the second type include one or more of: an option (e.g., 1024A, 1064) to enable display, by the particular type of device, an indication of the first account associated with the electronic device; and an option to disable display, by the particular type of device, the indication of the first account associated with the electronic device.

In some embodiments, the group of devices includes a plurality of devices of the particular type of device. In some embodiments, the electronic device receives a fourth set of one or more inputs associated with one or more of the option to enable display of the first account and the option to disable display of the first account. In some embodiments, in response to receiving the fourth set of one or more inputs, the electronic device displays, on the display device, an interface for selecting devices of the particular type of devices of the group of devices for one or more of: enabling display of the first account on the selected devices and disabling display of the first account on the selected devices.

In some embodiments, the one or more settings of the first type include one or more options (e.g., 1027A, 1062) for controlling permission of the first account regarding one or more network connected camera devices (e.g., permission to stream camera, permission to view recorded camera stream) of the plurality of devices.

In some embodiments, the electronic device receives a fifth set of one or more inputs associated with the one or more options for controlling permission of the first account regarding the one or more network connected camera devices. In some embodiments, in response to receiving the fifth set of one or more inputs, the electronic device displays, on the display device, an interface for selecting from a plurality of levels of permission (e.g., permission to stream camera, permission to view recorded camera stream, permission to access camera stream remotely) for the first account regarding the one or more network connected camera devices.

In some embodiments, the one or more settings of the first type include one or more options (e.g., 1027B, 1062) for controlling permission of the first account regarding (e.g., access by the first account, or access by a third account of a device near the electronic device) sharing credentials for accessing a network (e.g., Wi-Fi network) associated with the plurality of devices.

In some embodiments, the electronic device receives a sixth set of one or more inputs associated with the one or more options for controlling permission of the first account regarding sharing credentials for accessing the network. In some embodiments, in response to receiving the sixth set of one or more inputs, the electronic device displays, on the display device, an interface (e.g., 1020A) for selecting from a plurality of levels of permission for sharing credentials for accessing the network (e.g., permission to access the network by the first account and a device associated it; permission of the first account to share network credentials with a third account that is not a member of the plurality of accounts). For example, the electronic device can display a prompt or other interface in response to a determination that a device associate with a non-member (e.g., of the plurality of accounts) is nearby (e.g., at a geographic location associated with the plurality of accounts, such as a user's home), the prompt including an option to cause network credentials (e.g., Wi-Fi network name and password) to be sent to the nearby non-member's device. Whether the prompt is displayed, or the credentials can be shared, can be subject to a permission of the first account.

In some embodiments, the one or more settings of the first type include one or more options (e.g., 1026A, 1051, 1061) for controlling permission of the first account regarding access to the plurality of devices when the electronic device is remote from the plurality of devices (e.g., not at a geographic location associated with the plurality of devices (e.g., location of a home); not connected to a network (e.g., Wi-Fi network) associated with the plurality of devices (e.g., that the plurality of devices are connected to or are configured to connect to).

In some embodiments, the one or more settings of the first type include one or more options (e.g., 1026B, 1051, 1061), for controlling permission of the first account to perform one or more of the following: add a device to the plurality of devices; and remove a device from the plurality of devices.

In some embodiments, the settings interface includes an affordance (e.g., 1028, 1056, 1066. In some embodiments, the electronic device receives input, via the one or more input devices, corresponding to selection of the affordance. In some embodiments, in response to receiving the input corresponding to selection (e.g., a tap) of the affordance, the electronic device causes the first account to be removed from the plurality of accounts (e.g., the affordance represents an option to allow the user to leave the plurality of accounts (e.g., the smart home)). In some embodiments, an administrator account viewing the settings interface of a non-administrator account includes an affordance that, when selected, causes the respective non-administrator account to be removed from the plurality of accounts.

Note that details of the processes described above with respect to method 1100 (e.g., FIG. 11) are also applicable in an analogous manner to the methods described below. For example, method 1100 optionally includes one or more of the characteristics of the various methods described below with reference to method 1300. For example, after a user has joined a location profile in response to an invite, one or more settings associated with a user account of the user can be configured. For brevity, these details are not repeated below.

FIGS. 12A-12G illustrate exemplary user interfaces for adding users to a location profile, in accordance with some embodiments. The user interfaces in these figures are used to illustrate the processes described below, including the processes in FIG. 13.

Figure 12A:
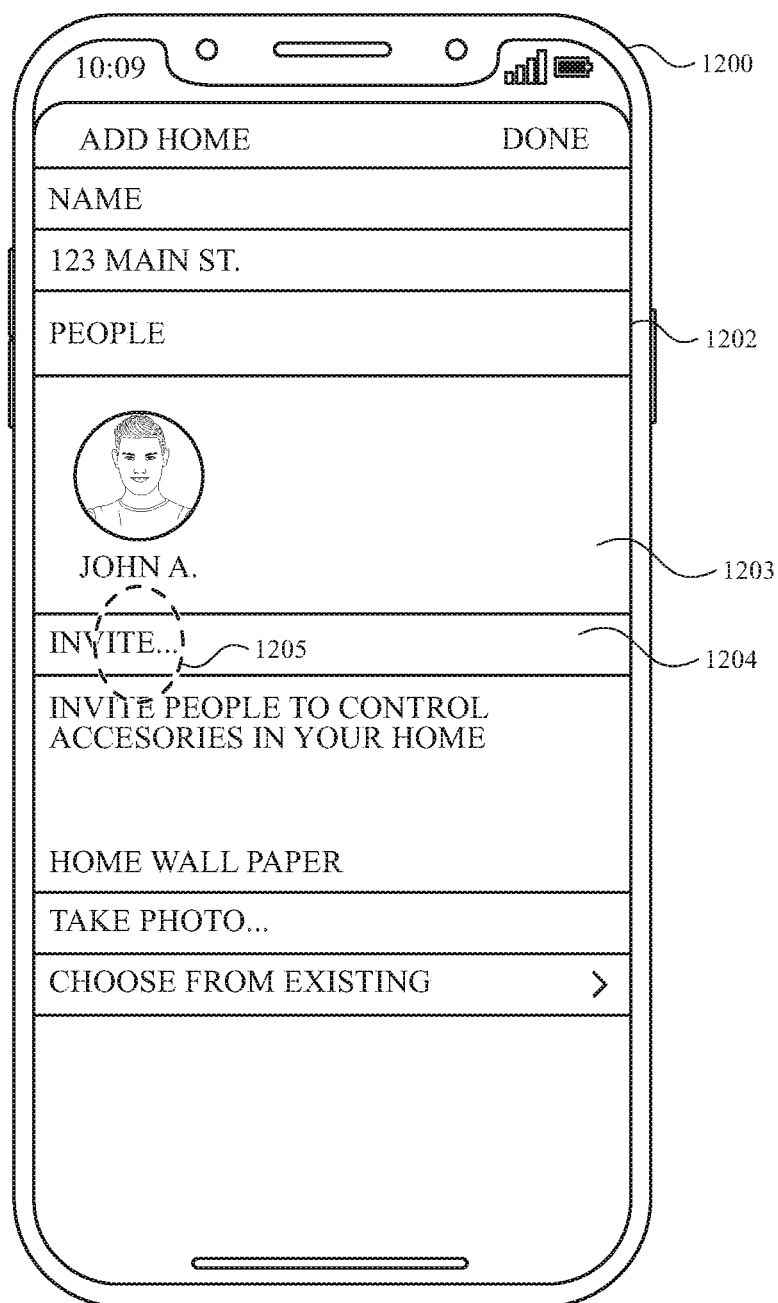
FIGS. 12A-12G illustrate exemplary user interfaces for adding users to a location profile, in accordance with some embodiments.
Figure 12B:
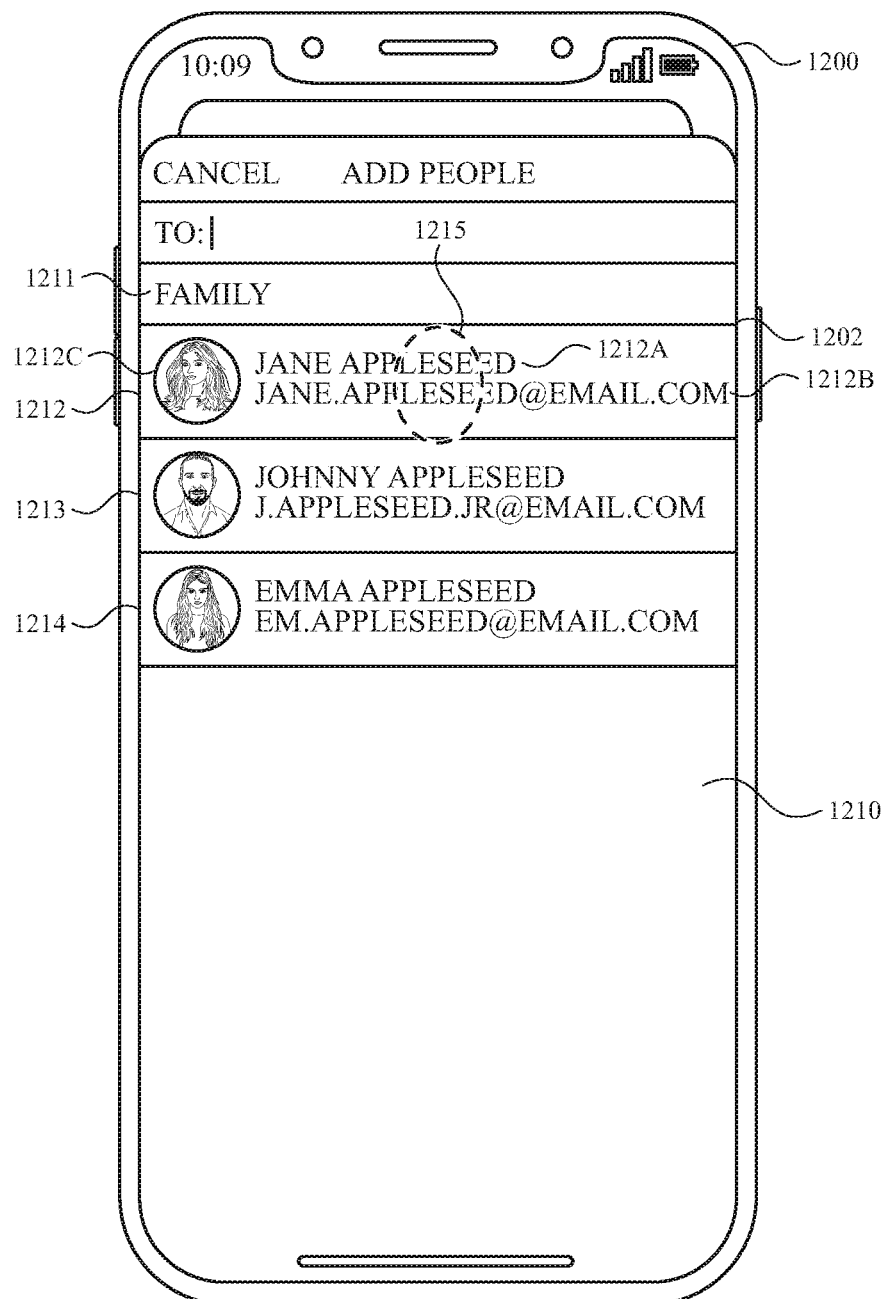
Figure 13:
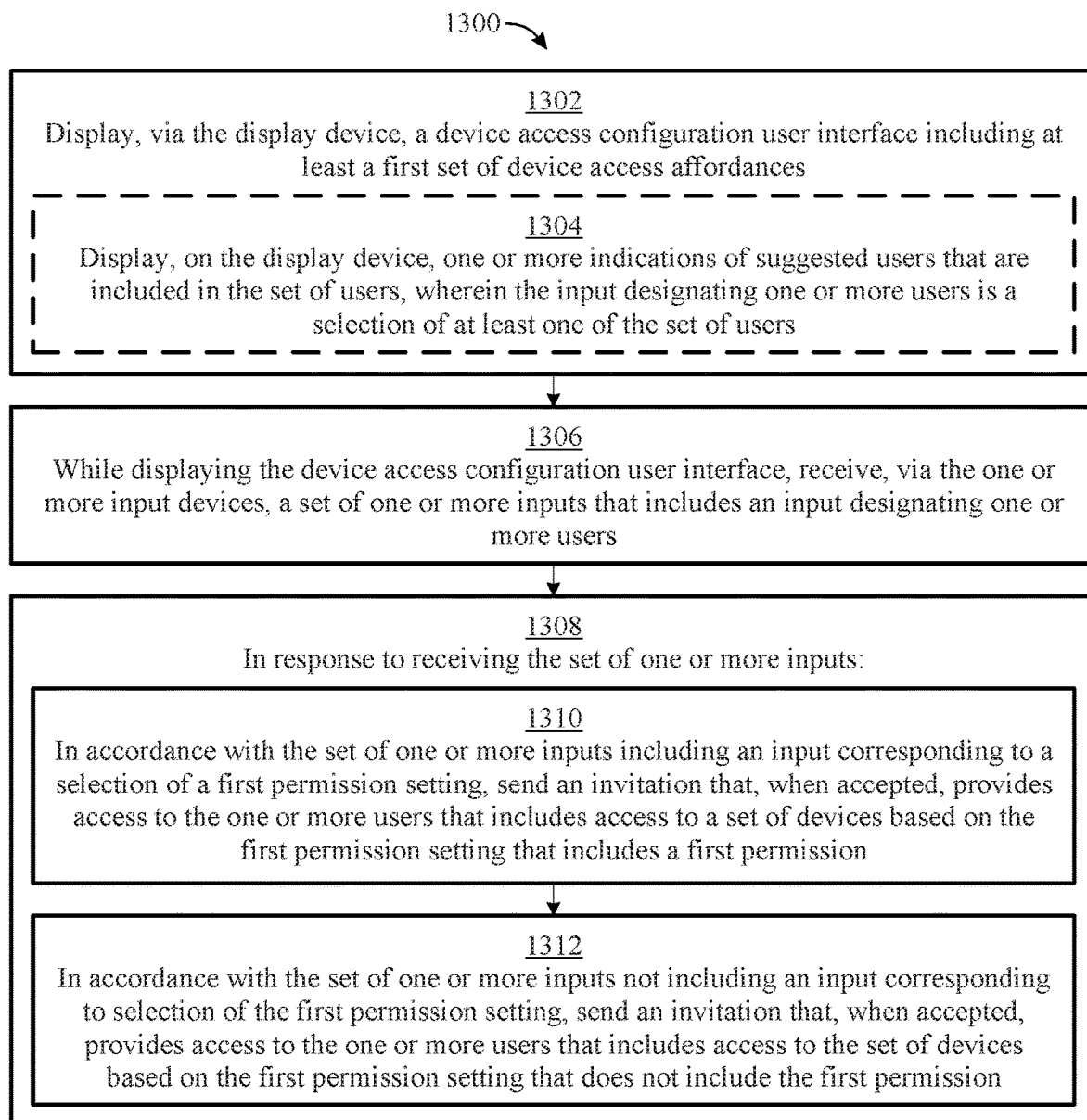
FIG. 13 is a flow diagram illustrating a process for adding users to a location profile, in accordance with some embodiments.

FIG. 12A illustrates home interface 1203 of a home control application associated with a location (e.g., "123 Main St."). Home interface 1203 includes invite affordance 1204 which, when selected, allows the user to invite other users to add their user accounts to the location profile. By way of example, while displaying the home interface 1203, the electronic device 1200 detects selection of the invite affordance 1204. As shown in FIG. 12A, selection of the invite affordance 1204 is, optionally, a tap gesture 835A. In response to selection of the invite affordance 1204, the electronic device 1200 displays (e.g., replaces display of the home interface 1203 with), on the display 1202, invite interface 1210, as shown in FIG. 12B.

Invite interface 1210 includes user group 1221, which in turn includes user affordances 1222-1224. In some examples, the user group 1221 includes a set of users (e.g., personal contacts) associated with the user of the electronic device 1200. By way of example, group 1221 can include users known to be family members of the user of the electronic device 1200. While the home interface 1210 is shown as including a single group of user accounts, in other examples one or more other groups, such as a coworker group or a close friend group, can alternatively or additionally be included in the home interface 1210. In some examples, one or more groups of the home interface 1210 can include users suggested by the electronic device.

In some examples, each of the user affordances 1212-1214 corresponds to a respective user account, which when selected, invites a user to add their user account to the location profile. Each of the user affordances 1212-1214 can, for instance, include an indicator (e.g., indicator 1212A) identifying a user (or user account) of the user affordance (e.g., user affordance 1212), user identification (e.g., user identification 1212B) indicating information associated with the user (e.g., email address for the user), and an icon (e.g., icon 1212C) which optionally shows a representation of the user's appearance. In some examples, the user identification serves as a unique identifier of the user account.

Figure 12C:
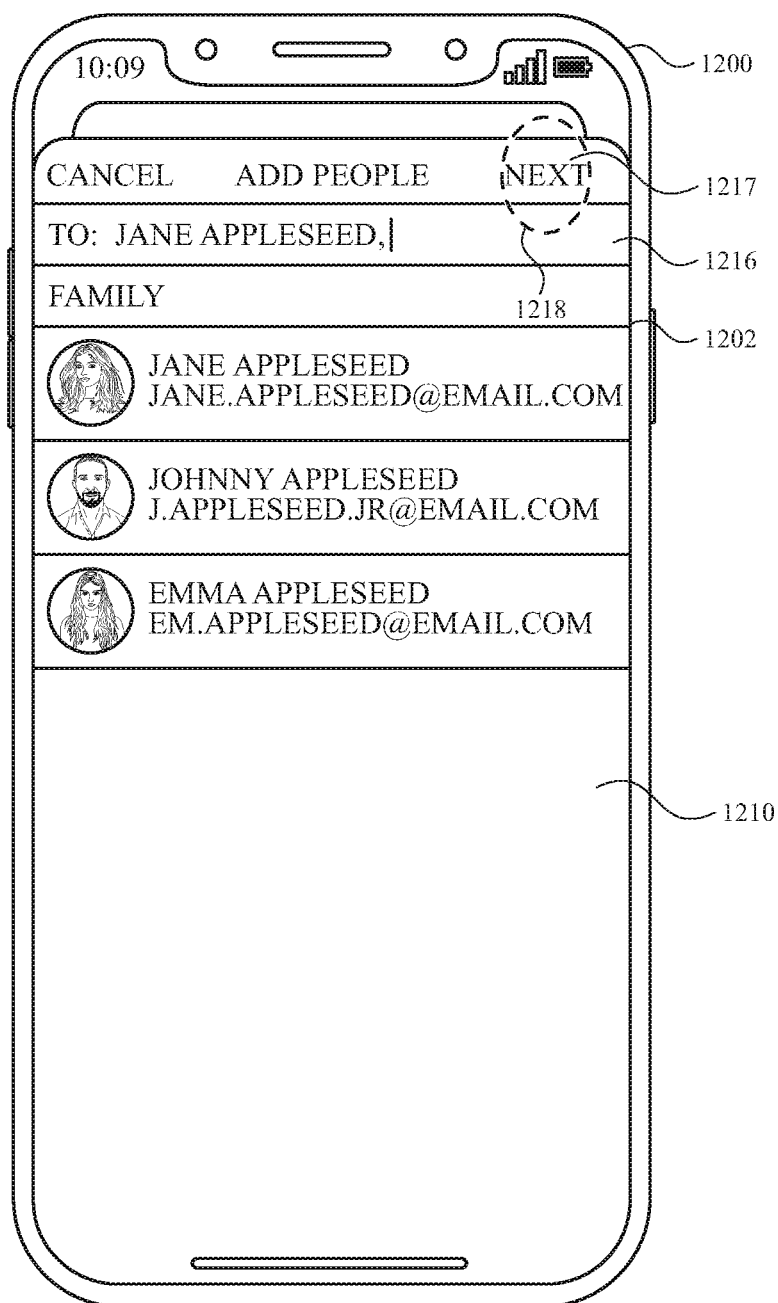
Figure 12D:
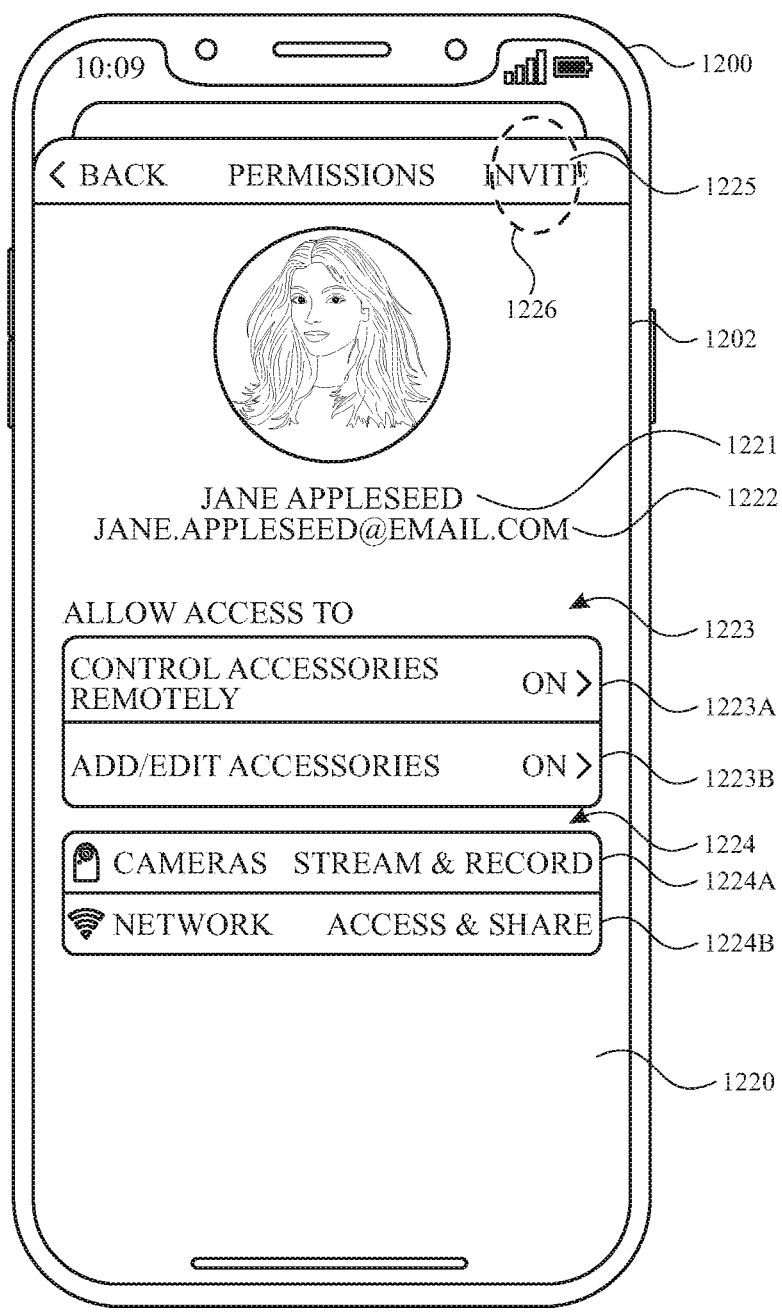

In an example operation, while displaying the home interface 1210, the electronic device 1200 detects selection of the user affordance 1212. As shown in FIG. 12B, selection of the user affordance 1212 is, optionally, a tap gesture 1215. In response to selection of the user affordance 1212, the electronic device 1200 populates an invite field 1216 with the name of the selected user, as shown in FIG. 12C. Thereafter, while displaying the invite interface 1210, the electronic device 1200 detects selection of a next affordance 1217. As shown in FIG. 12C, selection of the next affordance 1217 is, optionally, a tap gesture 1218. In response to selection of the next affordance 1217, the electronic device 1200 displays (e.g., replaces display of the home interface 1210 with), on the display 1202, invite interface 1220, as shown in FIG. 12D.

Invite interface 1220 includes user indicator 1221, user identification 1222, permissions portion 1223, and permissions portion 1224. User indicator 1221 indicates a name of a user for the user account interface 850A. User identification 1222 indicates information associated with the user (e.g., email address for the user). In some examples, the user identification 122 serves as a unique identifier of the user account.

In some examples, invite interface 1220 allows a user to view and/or configure one or more permissions of a user prior to inviting the user. For instance, permissions portion 1223 includes remote access affordance 1223A, which when selected, causes the electronic device 1200 to display one or more user interfaces (e.g., interface 1090 of FIG. 10J) through which a user can view and/or configure one or more settings associated with a remote access feature. As an example, a user can selectively enable whether a user, after being added to the location profile, has permissions to remotely control accessories. Permissions portion further includes accessories affordance 1223B, which when selected, causes the electronic device 1000 to display one or more user interfaces (e.g., interface 1000A of FIG. 10K) through which a user can view and/or configure settings for adding and/or editing devices associated with the location.

Permissions portion 1224 includes camera affordance 1224A, which when selected, causes the electronic device 1200 to display one or more user interfaces (e.g., interface 1010A of FIG. 10L) through which a user can view and/or configure settings associated with video streaming. As an example, a user can configure permissions for viewing live video, viewing recorded video, or a combination thereof. Permissions portion 1224 includes network affordance 1224B, which when selected, causes the electronic device 1000 to display one or more user interfaces (e.g., interface 1020A of FIG. 10M) through which a user can view and/or configure settings associated with network sharing. As an example, a user can select from a set of permission levels for accessing a network, sharing on a network, or a combination thereof.

While displaying the invite interface 1220, the electronic device 1200 detects selection of the invite affordance 1225. As shown in FIG. 12D, selection of the invite affordance 1225 is, optionally, a tap gesture 1226. In response to selection of the invite affordance 1225, the selected user (e.g., user "Jane Appleseed") is invited to add their user account to the location profile.

Figure 12E:
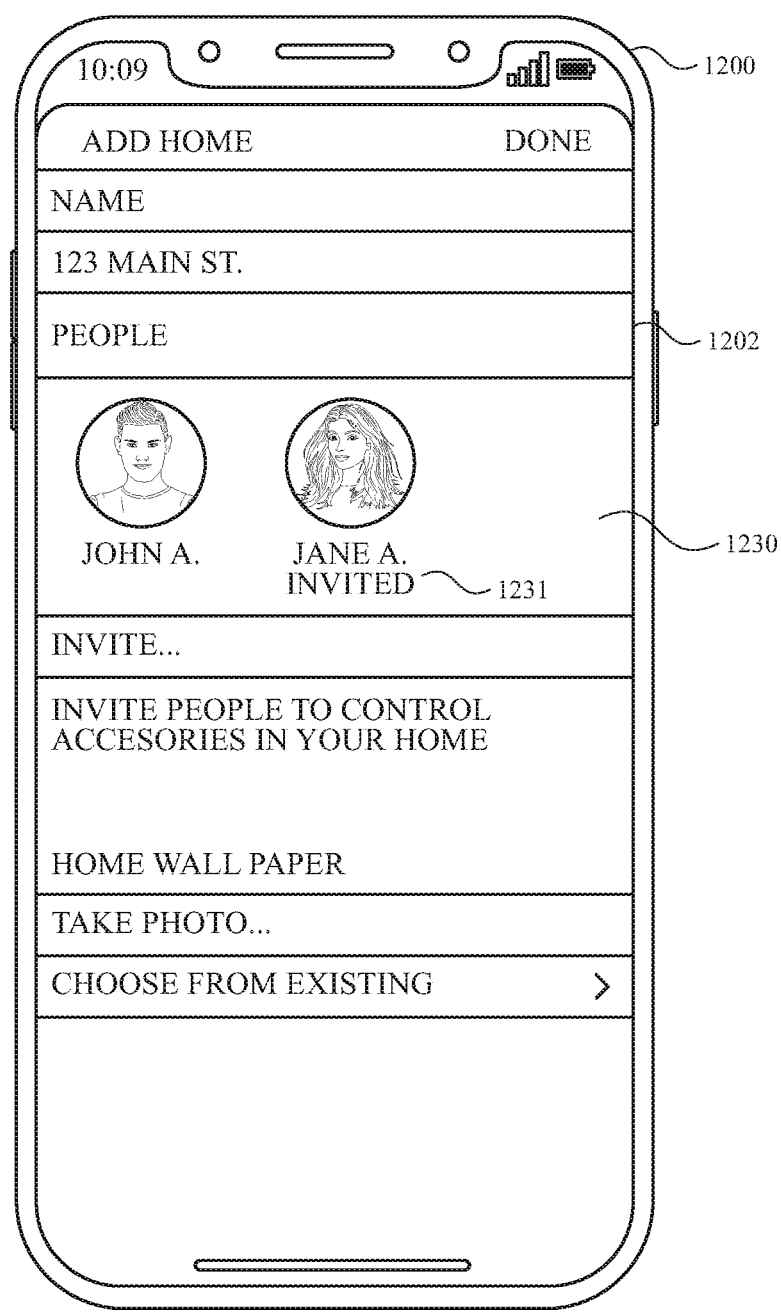

In some examples, further in response to selection of the invite affordance 1225, the electronic device displays (e.g., replaces display of the invite interface 1220 with), on the display 1202, home interface 1230, as shown in FIG. 12E. As illustrated, the home interface 1230 includes an invite indicator 1231 indicating that the invited user (e.g., Jane Appleseed") has been invited to add their user account to the location profile.

Figure 12F:
Figure 12G:
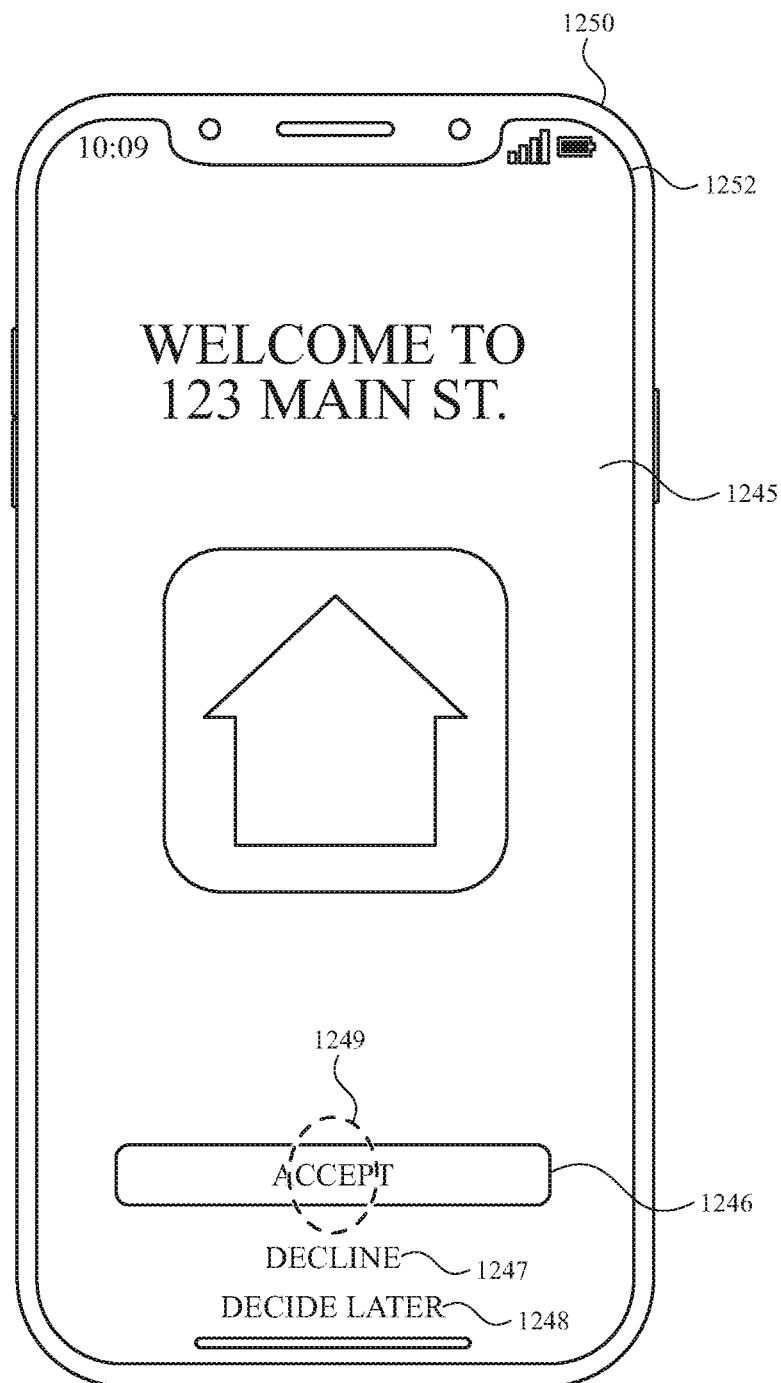

FIG. 12F illustrates a device 1250 of user invited to add their account to a location profile (e.g., "123 Main St."). In response to the invite, the electronic device 1250 displays a notification 1241 on a lock screen interface 1240. The invitation can, for instance, indicate that the user has been invited to the location profile. For example, while displaying the lock screen interface, the electronic device 1250 detects selection of the notification 1241. As shown in FIG. 12F, selection of the notification 1241 is, optionally, a tap gesture 1242. In response to selection of the notification 1241, the electronic device 1250 displays (e.g., replaces display of the home interface 1240 with), on the display 1252, acceptance interface 1245, as shown in FIG. 12G.

Acceptance interface 1245 includes acceptance affordance 1246, decline affordance 1247, and delay affordance 1248. Decline affordance 1247, when selected, indicates an intent of the invited user to decline the invitation. Accordingly, the electronic device 1250 causes one or more devices associated with the location (e.g., electronic device 1200) (or a remote server hosting the location profile) to not add the user to the location profile. Delay affordance 1248, when selected, causes the electronic device to cease display of the acceptance interface 1245 and, optionally, to redisplay (e.g., after a period of time) one or more of the notification 1241 and/or the acceptance interface 1245 if delay criteria are met. In some examples, the delay criteria include a requirement that a predetermined amount of time has elapsed since the acceptance interface 1245 was last displayed. In some examples, the delay criteria include a requirement that the user of the electronic device 1250 has opened a home control application of the electronic device 1250.

In some examples, while displaying the acceptance interface 1245, the electronic device 1200 detects selection of the acceptance interface 1245. As shown in FIG. 12G, selection of the acceptance interface 1245 is, optionally, a tap gesture 1246. In response to selection of the invite affordance 1225, the electronic device 1250 causes one or more devices associated with the location (e.g., electronic device 1200) (or a remote server hosting the location profile) to add the invited user to the location profile.

FIG. 13 is a flow diagram illustrating a method for adding users to a location profile using an electronic device (e.g., mobile device) in accordance with some embodiments. Method 1300 is performed at a device (e.g., 100, 300, 500, 580, 600) with a display device and one or more input devices. Some operations in method 1300 are, optionally, combined, the orders of some operations are, optionally, changed, and some operations are, optionally, omitted.

As described below, method 1300 provides an intuitive way for adding users to a location profile. The method reduces the cognitive burden on a user for adding users to a location profile, thereby creating a more efficient human-machine interface. For example, providing invites to user accounts in which access to a set of devices is selectively provided allows a user to configure one or more permissions for the user accounts prior to providing the invites. This reduces the need to configure user account permissions after an account has accepted an invite. In turn, this decreases the number of inputs and amount of time needed for the user to operate the electronic device (e.g., by helping the user provide proper inputs and reducing user mistakes when operating/interacting with the device), which, additionally, reduces power usage and improves battery life of the device. Example implementations of method 1300 further eliminate a risk that a user account has improper permissions after an invite has been accepted and prior to the user configuring the permission for the account.

In some embodiments, an electronic device (e.g., 1200) displays (1302), via the display device, a device access configuration user interface (e.g., 1210, 1220) including at least a first set of device access affordances (e.g., 1211, 1212, 1213, 1223A, 1223B, 1224A, 1224B) (e.g., an affordance for identifying one or more users, an affordance for selecting a permission level).

In some embodiments, while displaying the device access configuration user interface, the electronic device receives (1306), via the one or more input devices, a set of one or more inputs (e.g., 1215, 1217, 1225) that includes an input designating one or more users (e.g., using the first set of device access affordances; selection of a user; selection of multiple users and then selection of a Done/Next affordance; and/or selection of "Send Invite").

In some embodiments, in response (1308) to receiving the set of one or more inputs, in accordance with the set of one or more inputs including an input corresponding to a selection (e.g., selecting an "Invite" affordance while a default setting is selected; changing a default selection) of a first permission setting (e.g., 1223A, 1223B, 1224A, 1224B) (e.g., a non-personalization setting, such as control of particular accessories, the ability to view streams from one or more camera devices, and/or the ability to share network credentials), the electronic device sends (1310) an invitation that, when accepted, provides access to the one or more users that includes access to a set of devices (e.g., smart devices) based on the first permission setting that includes a first permission (e.g., user can view camera streams, user can share network credentials).

In some embodiments, in response (1308) to receiving the set of one or more inputs, in accordance with the set of one or more inputs not including an input corresponding to selection of the first permission setting, the electronic device sends (1310) an invitation that, when accepted, provides access to the one or more users that includes access to the set of devices based on the first permission setting that does not include the first permission (e.g., user cannot view camera streams, user cannot share network credentials).

In some embodiments, the first permission setting is a setting that controls access to the one or more network connected camera devices by the one or more users. For example, access that includes the first permission can include access to the stream of the one or more camera devices, and access that does not include the first permission does not include access to the stream of the one or more camera devices.

In some embodiments, the input corresponding to selection of the first permission setting comprises an input corresponding to selection of one of a plurality of permission levels of access to the one or more network connected camera devices by the one or more users.

In some embodiments, the set of devices are associated with (e.g., connected to) a network. In some embodiments, the first permission setting is a setting that controls permission regarding access to the network.

In some embodiments, the input corresponding to selection of the first permission setting comprises an input corresponding to selection of one of a plurality of permission levels that control permission to access the network.

In some embodiments, the set of devices includes one or more devices that can be controlled remotely (e.g., controlled by a device not directly connected to it and/or not connected to the same network). In some embodiments, the first permission setting is a setting that controls permission to remotely control the one or more devices that can be controlled remotely. For example, music can be played from a device remotely, a light can be turned on/off/dimmed, a thermostat can be adjusted, or the like.

In some embodiments, the electronic device is associated with (e.g., logged in to) a set of users (e.g., a set of accounts that share one or more services and/or storage of a cloud-based service). In some embodiments, displaying the device configuration user interface comprises displaying (1304), on the display device, one or more indications of suggested users that are included in the set of users (e.g., and that do not currently have access to the set of devices). In some embodiments, the input designating one or more users is a selection of at least one of the set of users.

Note that details of the processes described above with respect to method 1300 (e.g., FIG. 13) are also applicable in an analogous manner to the methods described above. For example, method 1300 optionally includes one or more of the characteristics of the various methods described above with reference to method 1100. For example, after a user has joined a location profile in response to an invite, one or more settings associated with a user account of the user can be configured. For brevity, these details are not repeated below.

FIGS. 14A-14F illustrate exemplary user interfaces for adding users to location profiles, in accordance with some embodiments. The user interfaces in these figures are used to illustrate the processes described below, including the processes in FIG. 15.

Figure 14A:
FIGS. 14A-14F illustrate exemplary user interfaces for adding users to location profiles, in accordance with some embodiments.
Figure 15:
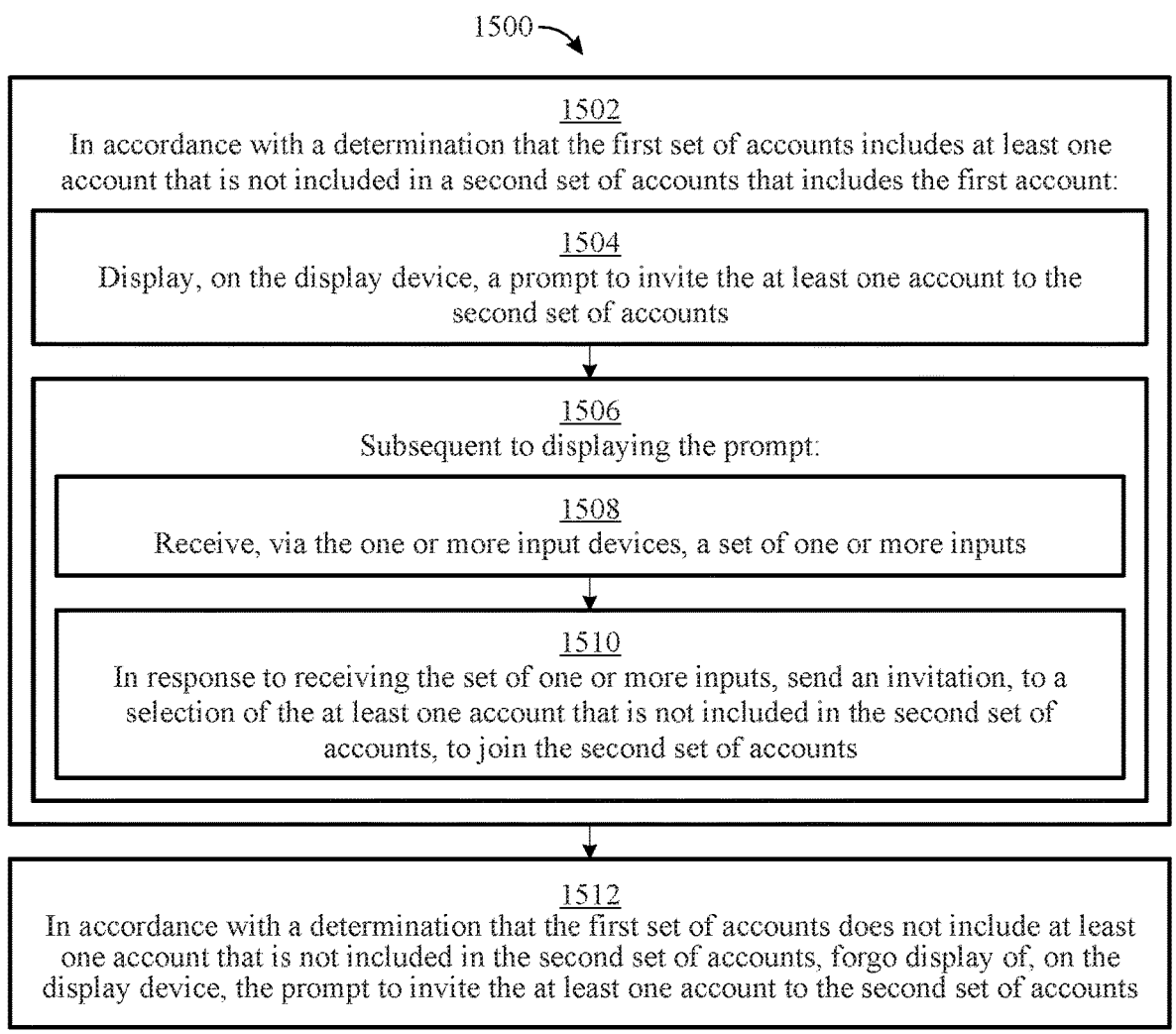
FIG. 15 is a flow diagram illustrating a process for adding users to location profiles, in accordance with some embodiments.

FIG. 14A illustrates a home screen interface 1403 displayed on display device 1402 of electronic device 1400. While displaying the home screen interface 1403, the electronic device 1400 further displays prompt interface 1404. In some examples, prompt interface 1404 is overlaid on home screen interface 1403 and/or is displayed during an initialization process for an external device. Prompt interface 1404 includes continue affordance 1405 and delay affordance 1406. Delay affordance 1406, when selected, causes the electronic device 1400 to cease display of the prompt interface 1404 and, optionally, to redisplay (e.g., after a period of time) the prompt interface 1404 if a predetermined amount of time has elapsed since the prompt interface 1404 was last displayed.

Figure 14B:
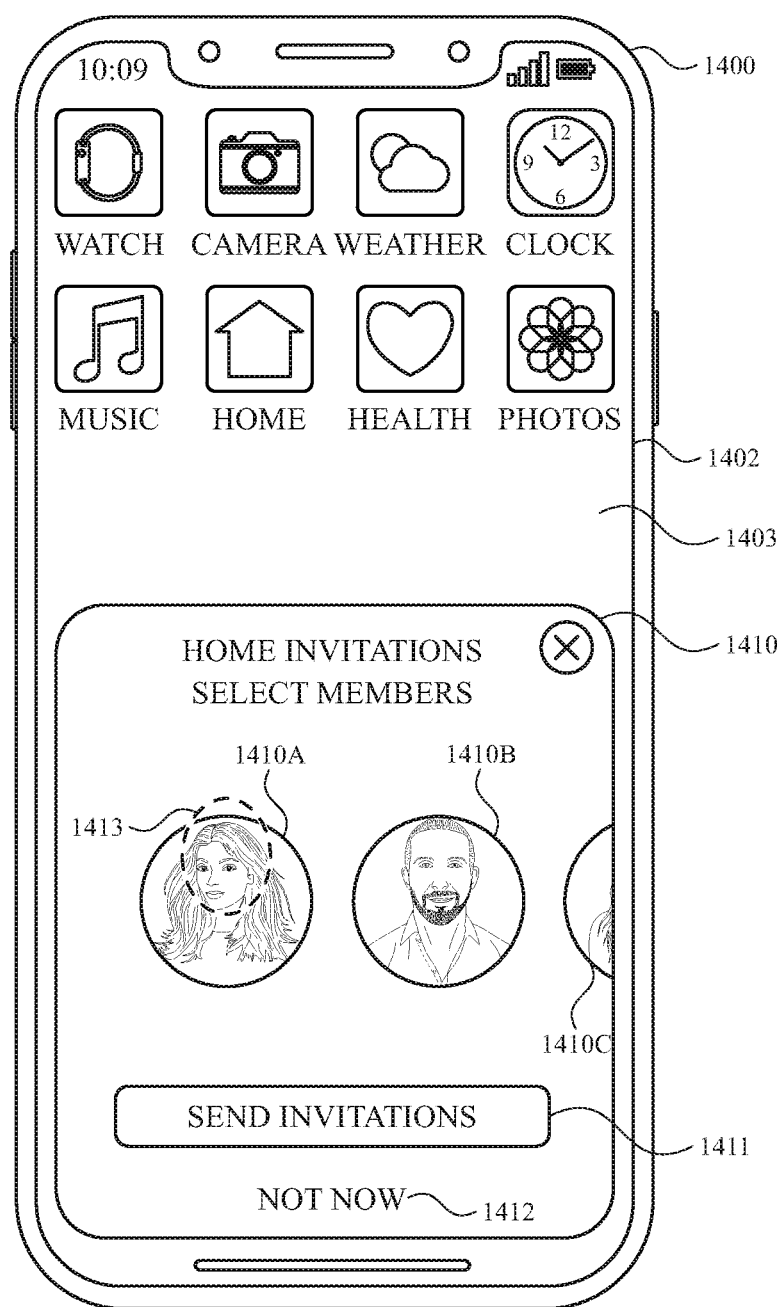

While displaying the prompt interface 1404, the electronic device 1400 detects selection of the continue affordance 1405. As shown in FIG. 14A, selection of the continue affordance 1405 is, optionally, a tap gesture 1407. In response to selection of continue affordance 1405, the electronic device 1400 displays (e.g., replaces display of the prompt interface 1404 with), on the display 1402, selection interface 1410, as shown in FIG. 14B. The selection interface 1410 includes user affordances 1410A, 1410B, 1410C, each of which corresponds to a user account in some examples. By way of example, user affordance 1410A corresponds to a user account for a user Jane Appleseed, user affordance 1410B corresponds to a user account for a user Johnny Appleseed, and user affordance 1410C corresponds to a user account for user Emma Appleseed. Selection interface 1410 further includes invite affordance 1411 and delay affordance 1412. Delay affordance 1412, when selected, causes the electronic device 1400 to cease display of the prompt interface 1410 and, optionally, to redisplay (e.g., after a period of time) prompt interface 1406 if a predetermined amount of time has elapsed since the prompt interface 1406 was last displayed.

Figure 14C:
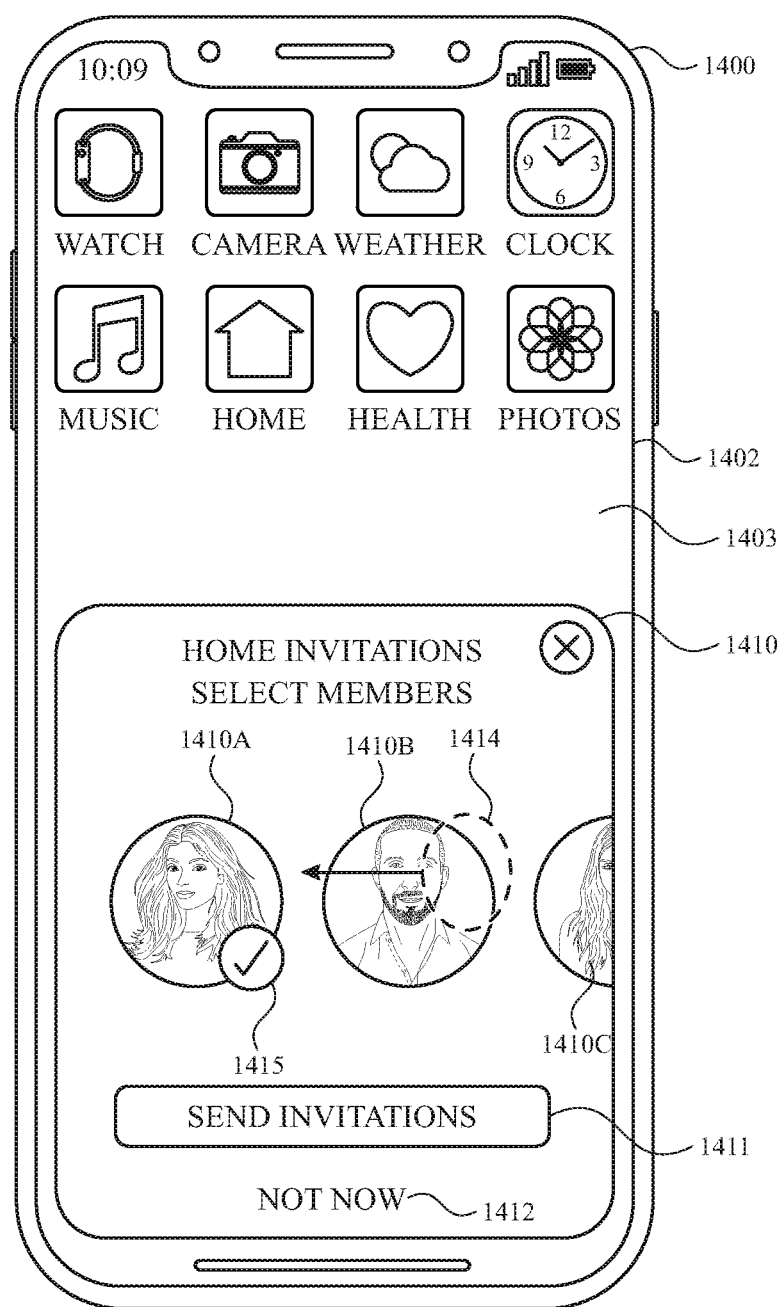

In some examples, one or more users of the selection interface 1410 can be selected. By way of example, in response to selection of a user affordance, a user corresponding to the user affordance 1410A is selected. As shown in FIG. 14C, in response to selection of the user affordance 1410A (e.g., input 1413), a selection indicator 1415 is displayed, indicating that the user associated with user affordance 1410A (e.g., "Jane Applewood") has been selected.

Figure 14D:
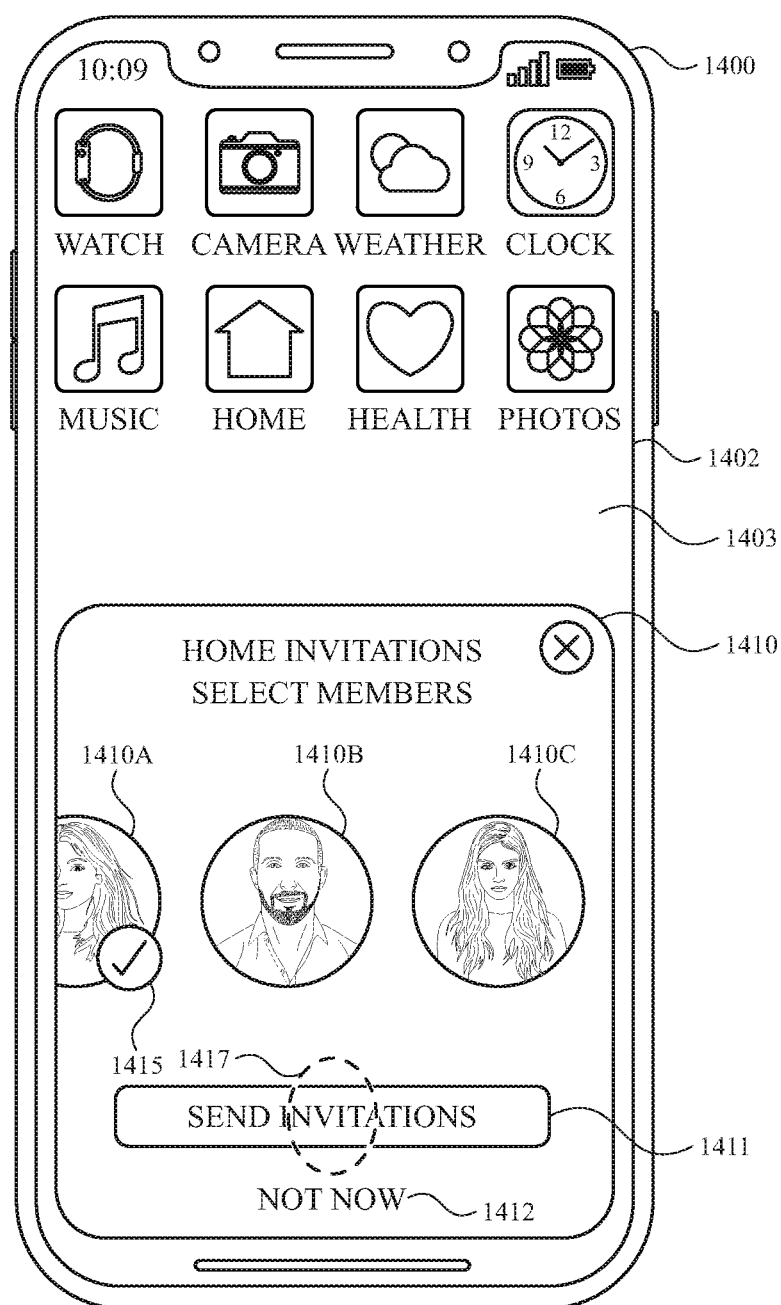

In some examples, one or more user affordances of the selection interface 1410 can be hidden (e.g., not fully displayed). User affordance 1410C of selection interface 1410, for example, is partially displayed in FIG. 14C. Accordingly, in some examples, a user can provide a set of inputs to reveal a hidden portion of the selection interface 1410 including one or more additional user affordances. As shown in FIG. 14C, in response to input (e.g., swipe gesture) 1414, the electronic device 1400 reveals a hidden portion of the selection interface 1410, as shown in FIG. 14D. As illustrated, as a result of revealing the hidden portion of the selection interface 1410, the electronic device displays user affordance 1410C.

While displaying the selection interface 1410, the electronic device detects selection of the invite affordance 1412. As shown in FIG. 14D, selection of the invite affordance 1412 is, optionally, a tap gesture 1417. In response to selection of invite affordance 1412, the electronic device 1400 invites each of the users selected in the selection interface 1410 to the location profile. In the scenario illustrated in FIG. 14D in which the user Jane Appleseed was selected, the electronic device 1400 invites user Jane Appleseed to add her user account to the location profile.

Figure 14E:
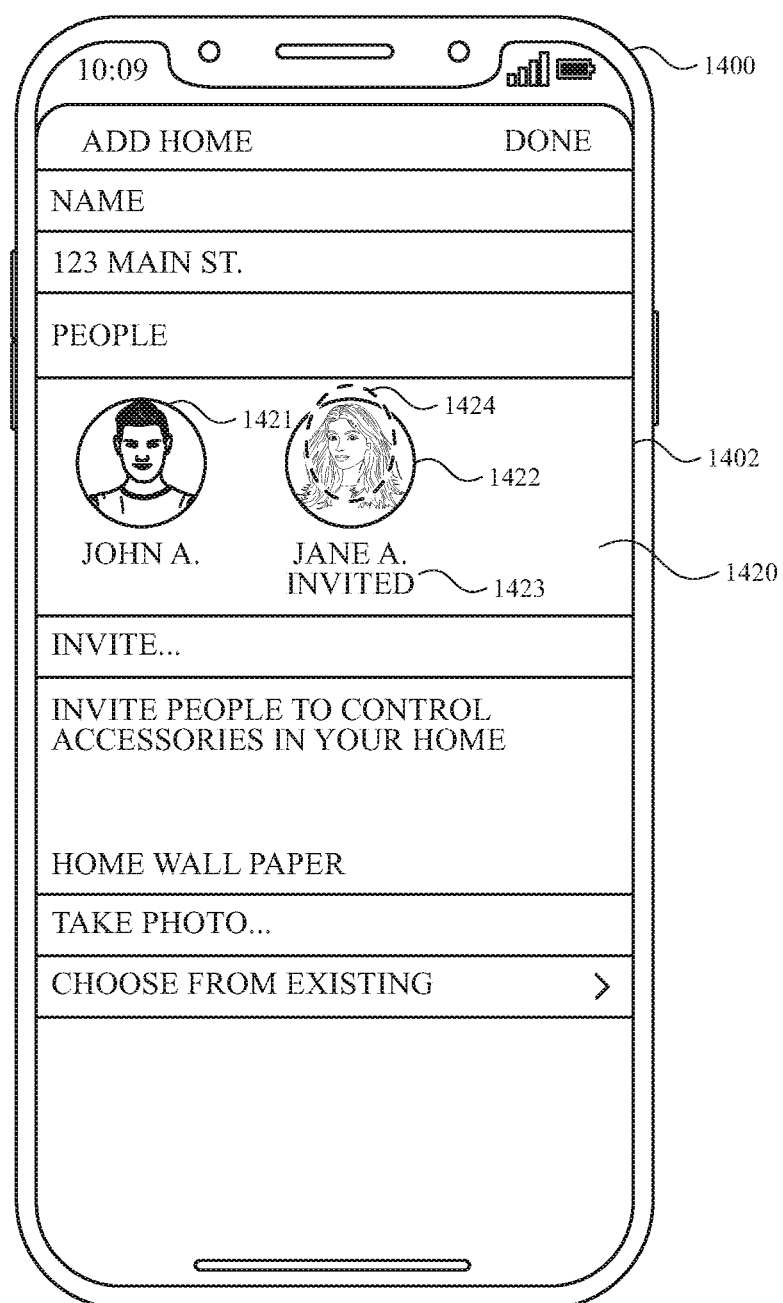
Figure 14F:
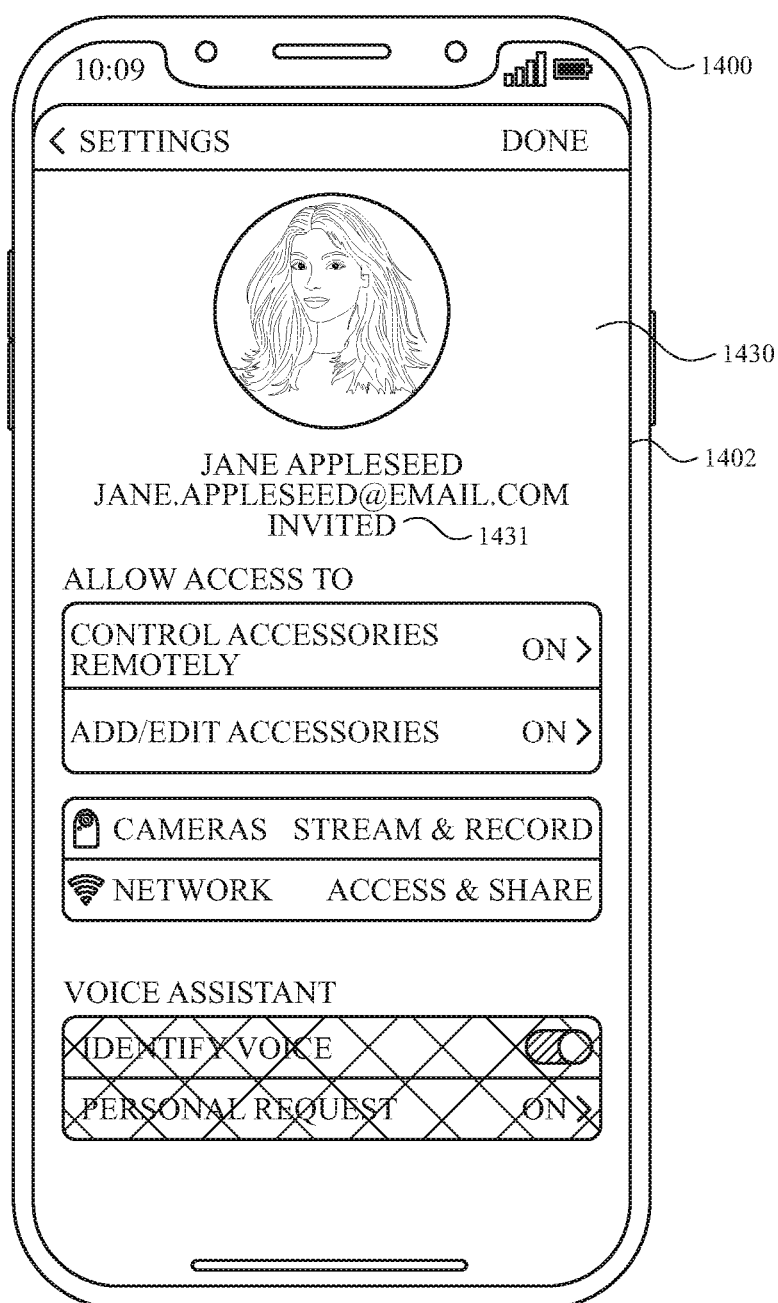

In some examples, the electronic device can identify users that have been invited to a location profile, but have not yet responded to the invite. As an example, FIG. 14E illustrates a home interface 1403 of a home control application. The home interface 1420 includes user affordances 1421 and 1422, each of which corresponds to a respective user. For example, user affordance 1421 corresponds to user John Appleseed ("John A") and user affordance 1422 corresponds to user Jane Appleseed ("Jane A"). The home interface 1420 further includes indicator 1423 indicating that the user corresponding to user affordance 1422 was invited to the location profile, for instance in response to selection of the invite affordance 1412, but has not yet responded to the invite.

While displaying the home interface 1420, the electronic device detects selection of the user affordance 1422. As shown in FIG. 14E, selection of the invite affordance 1422 is, optionally, a tap gesture 1424. In response to selection of user affordance 1422, the electronic device 1400 displays (e.g., replaces display of the home interface 1420 with), on the display 1402, user account interface 1430 for the user associated with user affordance 1422 (e.g., "Jane Appleseed"). As indicated by indicator 1431, the user Jane Appleseed has been invited to add her user account to the location profile.

FIG. 15 is a flow diagram illustrating a method for adding users to location profiles using an electronic device in accordance with some embodiments. Method 1500 is performed at a device (e.g., 100, 300, 500, 580, 600) with a display device and one or more input devices. The device is associated with a first account of a first set of accounts (e.g., a cloud-based family account) in some embodiments. Some operations in method 1500 are, optionally, combined, the orders of some operations are, optionally, changed, and some operations are, optionally, omitted.

As described below, method 1500 provides an intuitive way for adding users to location profiles. The method reduces the cognitive burden on a user for adding users to location profiles, thereby creating a more efficient human-machine interface. For example, prompting a user to invite a user account of a first set of user accounts to a second set of user accounts only if the user account is not included in the second set of user accounts allows a user to efficiently and intuitively invite users to the second set of accounts. By way of example, ensuring that the user account is not part of the second set of user accounts needlessly providing prompts to the user and/or providing invites to a set of user accounts for which a user account is already included. In turn, this decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, in accordance (1502) with a determination that the first set of accounts includes at least one account that is not included in a second set of accounts (e.g., associated with a geographic location) (e.g., members of a smart home) that includes the first account, the electronic device (e.g., 1400) displays (1504), on the display device (e.g., 1402), a prompt (e.g., 1404, 1410) to invite the at least one account to the second set of accounts.

In some embodiments, subsequent to (1506) displaying the prompt (e.g., after selecting "Invite iCloud Family", or an affordance to continue at the prompt), the electronic device receives (1508), via the one or more input devices, a set of one or more inputs (e.g., 1407, 1413, 1414, 1417).

In some embodiments, subsequent to (1506) displaying the prompt, in response to receiving the set of one or more inputs (e.g., in response to selection of "Send Invite"), the electronic device sends (1510) an invitation, to a selection of the at least one account that is not included in the second set of accounts, to join the second set of accounts.

In some embodiments, in accordance with a determination that the first set of accounts does not include at least one account that is not included in the second set of accounts, the electronic device forgoes (1512) display of, on the display device, the prompt to invite the at least one account to the second set of accounts.

In some embodiments, prior to sending the invitation, the electronic device receives, via the one or more input devices, input (e.g., 1413) (e.g., selection of an affordance) corresponding to selection of one or more representations (e.g., affordances) representing the selection of the at least one account that is not included in the second set of accounts.

In some embodiments, the electronic device displays, on the display device, an interface (e.g., 1410) (e.g., included in the prompt, or displayed after selection of an affordance at the prompt) that includes one or more affordances corresponding to the at least one account that is not included in the second set of accounts. In some embodiments, the electronic device receives, via the one or more input devices, input (e.g., 1414) associated with (e.g., a swipe at a location of) the one or more affordances. In some embodiments, in response to receiving the input associated with the one or more affordances, the electronic device navigates (e.g., scrolling, shifting, sliding) the one or more affordances to display at least one previously non-displayed affordance corresponding to the at least one account that is not included in the second set of accounts.

In some embodiments, further subsequent to displaying the prompt and subsequent to sending the invitation, the electronic device displays, on the display device, an interface (e.g., 1430) that includes one or more options for configuring one or more permissions of an account of the selection of the at least one account. In some embodiments, the electronic device receives, via the one or more input devices, input corresponding to a request to change a first permission setting for the account from a first state to a second state. In some embodiments, in response to receiving the input corresponding to the request to change the first permission setting from the first state to the second state, the electronic device causes the first permission setting for the account to change from the first state to the second state (e.g., transmitting a data to one or more devices to update stored permissions setting data).

Note that details of the processes described above with respect to method 1500 (e.g., FIG. 15) are also applicable in an analogous manner to the methods described above. For example, method 1500 optionally includes one or more of the characteristics of the various methods described above with reference to method 900. For example, after a user has joined a location profile in response to an invite, one or more settings associated with a user account of the user can be configured. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the manner in which devices provide one or more features across a group of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to intuitively process user requests using user account data in response to requests received from users of the user accounts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can configure devices not to update account data when processing requests. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and provided to users by inferring preferences based on non-personal information data or a bare minimum amount of personal information, such as the content being requested by the device associated with a user, other non-personal information available to the devices, a set of default preferences, and/or or publicly available information.

What is claimed is:

1. An electronic device, comprising:
a media output device;
one or more processors; and
memory storing one or more programs configured to be executed by the one or more processors, the one or more programs including instructions for:
  receiving a request determined based on a voice input; and
  in response to receiving the request:
    in accordance with a determination that the voice input does not match a voice profile associated with an account that is associated with the electronic device:
      in accordance with a setting of the electronic device being set to a first state, causing update of account data of a first account based on the request; and
      in accordance with the setting of the electronic device being set to a second state, forgoing causing update of the account data of the first account based on the request.

2. The electronic device of claim 1, wherein the request is a first request and the voice input is a first voice input, the one or more programs further including instructions for:
receiving a second request determined based on a second voice input, wherein the second voice input matches a voice profile associated with a second account that is associated with the electronic device, wherein the first account is different from the second account; and
in response to receiving the second request, and in accordance with a determination that the second voice input matches the voice profile associated with the second account:
  causing output, by the media output device, of second information based on the second request using the second account associated with the electronic device; and
  causing update of account data of the second account based on the second request.

3. The electronic device of claim 1, wherein causing output of information using a respective account includes accessing media using credentials associated with the respective account.

4. The electronic device of claim 1, wherein causing update of account data of a respective account includes causing update of a media profile associated with the respective account.

5. The electronic device of claim 1, the one or more programs further including instructions for:
receiving a third request determined based on a third voice input, wherein the third request is a request to output private information associated with a third account;
in response to receiving the third request:
in accordance with a determination that the third voice input matches a third voice profile associated with the third account:
causing output, by the media output device, of the private information based on the third request using the third account; and
in accordance with a determination that the third voice input does not match the third voice profile associated with the third account:
forgoing causing output, by the media output device, of the private information based on the third request using the third account associated with the electronic device.

6. The electronic device of claim 1, the one or more programs further including instructions for:
in response to receiving the request:
in accordance with a determination that the voice input does not match a voice profile associated with an account that is associated with the electronic device and prior to the setting of the electronic device being set to the first and second states, causing output, by the media output device, of first information based on the request using the first account associated with the electronic device.

7. The electronic device of claim 1, the one or more programs further including instructions for:
in response to receiving the request:
in accordance with a determination that the voice input matches a voice profile associated with an account that is associated with the electronic device:
causing output, by the media output device, of the first information based on the request using the account associated with the matching voice profile; and
causing update of account data of the account associated with the matching voice profile based on the request.

8. A computer-implemented method, comprising:
at an electronic device with a media output device:
receiving a request determined based on a voice input; and
in response to receiving the request:
in accordance with a determination that the voice input does not match a voice profile associated with an account that is associated with the electronic device:
in accordance with a setting of the electronic device being set to a first state, causing update of account data of a first account based on the request; and
in accordance with the setting of the electronic device being set to a second state, forgoing causing update of the account data of the first account based on the request.

9. The method of claim 8, wherein the request is a first request and the voice input is a first voice input, the method further comprising:
receiving a second request determined based on a second voice input, wherein the second voice input matches a voice profile associated with a second account that is associated with the electronic device, wherein the first account is different from the second account; and
in response to receiving the second request, and in accordance with a determination that the second voice input matches the voice profile associated with the second account:
causing output, by the media output device, of second information based on the second request using the second account associated with the electronic device; and
causing update of account data of the second account based on the second request.

10. The method of claim 8, wherein causing output of information using a respective account includes accessing media using credentials associated with the respective account.

11. The method of claim 8, wherein causing update of account data of a respective account includes causing update of a media profile associated with the respective account.

12. The method of claim 8, further comprising:
receiving a third request determined based on a third voice input, wherein the third request is a request to output private information associated with a third account;
in response to receiving the third request:
in accordance with a determination that the third voice input matches a third voice profile associated with the third account:
causing output, by the media output device, of the private information based on the third request using the third account; and
in accordance with a determination that the third voice input does not match the third voice profile associated with the third account:
forgoing causing output, by the media output device, of the private information based on the third request using the third account associated with the electronic device.

13. The method of claim 8, the method further comprising:
in response to receiving the request:
in accordance with a determination that the voice input does not match a voice profile associated with an account that is associated with the electronic device and prior to the setting of the electronic device being set to the first and second states, causing output, by the media output device, of first information based on the request using the first account associated with the electronic device.

14. The method of claim 8, the method further comprising:
in response to receiving the request:
in accordance with a determination that the voice input matches a voice profile associated with an account that is associated with the electronic device:
causing output, by the media output device, of the first information based on the request using the account associated with the matching voice profile; and
causing update of account data of the account associated with the matching voice profile based on the request.

15. A non-transitory computer-readable storage medium storing one or more programs configured to be executed by one or more processors of an electronic device with a media output device, the one or more programs including instructions for:

receiving a request determined based on a voice input; and in response to receiving the request:
   in accordance with a determination that the voice input does not match a voice profile associated with an account that is associated with the electronic device:
      in accordance with a setting of the electronic device being set to a first state, causing update of account data of a first account based on the request; and
      in accordance with the setting of the electronic device being set to a second state, forgoing causing update of the account data of the first account based on the request.

16. The computer-readable storage medium of claim 15, wherein the request is a first request and the voice input is a first voice input, the one or more programs further including instructions for:

receiving a second request determined based on a second voice input, wherein the second voice input matches a voice profile associated with a second account that is associated with the electronic device, wherein the first account is different from the second account; and in response to receiving the second request, and in accordance with a determination that the second voice input matches the voice profile associated with the second account:
   causing output, by the media output device, of second information based on the second request using the second account associated with the electronic device; and
   causing update of account data of the second account based on the second request.

17. The computer-readable storage medium of claim 15, wherein causing output of information using a respective account includes accessing media using credentials associated with the respective account.

18. The computer-readable storage medium of claim 15, wherein causing update of account data of a respective account includes causing update of a media profile associated with the respective account.

19. The computer-readable storage medium of claim 15, the one or more programs further including instructions for:

receiving a third request determined based on a third voice input, wherein the third request is a request to output private information associated with a third account;

in response to receiving the third request:
   in accordance with a determination that the third voice input matches a third voice profile associated with the third account:
      causing output, by the media output device, of the private information based on the third request using the third account; and
   in accordance with a determination that the third voice input does not match the third voice profile associated with the third account:
      forgoing causing output, by the media output device, of the private information based on the third request using the third account associated with the electronic device.

20. The computer-readable storage medium of claim 15, the one or more programs further including instructions for:

in response to receiving the request:
   in accordance with a determination that the voice input does not match a voice profile associated with an account that is associated with the electronic device and prior to the setting of the electronic device being set to the first and second states, causing output, by the media output device, of first information based on the request using the first account associated with the electronic device.

21. The computer readable storage medium of claim 15, the one or more programs further including instructions for:

in response to receiving the request:
   in accordance with a determination that the voice input matches a voice profile associated with an account that is associated with the electronic device:
      causing output, by the media output device, of the first information based on the request using the account associated with the matching voice profile; and
      causing update of account data of the account associated with the matching voice profile based on the request.

\* \* \* \* \*

UNITED STATES PATENT AND TRADEMARK OFFICE
CERTIFICATE OF CORRECTION

| | | |
|---|---|---|
| PATENT NO. | : 10,867,608 B1 | Page 1 of 1 |
| APPLICATION NO. | : 16/584347 | |
| DATED | : December 15, 2020 | |
| INVENTOR(S) | : Taylor G. Carrigan et al. | |

It is certified that error appears in the above-identified patent and that said Letters Patent is hereby corrected as shown below:

In the Claims

In Claim 21, Column 84, Line 29, delete "computer readable" and insert -- computer-readable --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*